United States Patent
Toba et al.

(10) Patent No.: US 12,399,449 B2
(45) Date of Patent: Aug. 26, 2025

(54) DEVELOPER CONTAINER AND MANUFACTURING METHOD FOR DEVELOPER CONTAINER

(71) Applicant: CANON KABUSHIKI KAISHA, Tokyo (JP)

(72) Inventors: Shinjiro Toba, Kanagawa (JP); Hiroshi Takarada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/731,432

(22) Filed: Jun. 3, 2024

(65) Prior Publication Data

US 2024/0319634 A1 Sep. 26, 2024

Related U.S. Application Data

(63) Continuation of application No. PCT/JP2022/042455, filed on Nov. 15, 2022.

(30) Foreign Application Priority Data

Dec. 6, 2021 (JP) ................................. 2021-198141

(51) Int. Cl.
*G03G 15/08* (2006.01)
*B65B 1/02* (2006.01)

(52) U.S. Cl.
CPC ........... *G03G 15/0874* (2013.01); *B65B 1/02* (2013.01); *G03G 15/0886* (2013.01)

(58) Field of Classification Search
CPC ........... G03G 15/0872; G03G 15/0874; G03G 15/0886

(Continued)

(56) References Cited

U.S. PATENT DOCUMENTS 7,158,736 B2  1/2007 Sato et al.
7,212,768 B2  5/2007 Numagami et al.
(Continued)

FOREIGN PATENT DOCUMENTS

JP   2006-171795 A   6/2006
JP   2007-292791 A   11/2007
(Continued)

OTHER PUBLICATIONS

Co-Pending U.S. Appl. No. 18/675,292, filed May 28, 2024.
(Continued)

*Primary Examiner* — Hoan H Tran
(74) *Attorney, Agent, or Firm* — Venable LLP

(57) ABSTRACT

A developer container includes a container member, a connector member attached to the container member, and a discharge path forming member connected to the container member and to discharge a developer from the container member. The connector member includes an inserted portion, and an engaged portion. The discharge path forming member includes an insertion portion inserted into the inserted portion, and an engaging portion provided correspondingly to the engaged portion. The engaged portion and engaging portion come to a state of mutual engagement by a relative rotation between the connector member and the discharge path forming member about a predetermined rotation axis, in a state where the insertion portion is inserted into the inserted portion. In the engaged state, the engaged portion and engaging portion restrict a relative movement of the connector member and the discharge path forming member in the direction of the rotation axis.

19 Claims, 36 Drawing Sheets

(58) Field of Classification Search
USPC .................................................. 399/252, 258
See application file for complete search history.

(56) References Cited

U.S. PATENT DOCUMENTS

| | | | |
|---|---|---|---|
| 7,248,810 | B2 | 7/2007 | Miyabe et al. |
| 7,349,657 | B2 | 3/2008 | Sato et al. |
| 7,412,193 | B2 | 8/2008 | Sato et al. |
| 7,860,433 | B2 | 12/2010 | Toba et al. |
| 7,894,733 | B2 | 2/2011 | Tanabe et al. |
| 7,953,340 | B2 | 5/2011 | Tanabe et al. |
| 8,103,196 | B2 * | 1/2012 | Koshimori ......... G03G 15/0886 399/258 |
| 8,213,831 | B2 | 7/2012 | Toba et al. |
| 8,301,054 | B2 | 10/2012 | Tanabe et al. |
| 8,712,284 | B2 | 4/2014 | Toba et al. |
| 9,213,266 | B2 | 12/2015 | Toba et al. |
| 9,304,488 | B2 | 4/2016 | Toba et al. |
| 9,423,720 | B2 * | 8/2016 | Hosokawa ......... G03G 15/0872 |
| 9,733,612 | B2 | 8/2017 | Toba et al. |
| 10,353,339 | B2 | 7/2019 | Koishi et al. |
| 11,774,881 | B2 | 10/2023 | Sato et al. |
| 11,829,100 | B2 | 11/2023 | Fukui et al. |
| 12,066,785 | B2 | 8/2024 | Sugimoto et al. |
| 2003/0081969 | A1 | 5/2003 | Muramatsu et al. |
| 2013/0039678 | A1 | 2/2013 | Yoshida et al. |
| 2023/0176496 | A1 | 6/2023 | Fujino et al. |
| 2023/0205129 | A1 | 6/2023 | Suetsugu et al. |
| 2023/0400792 | A1 | 12/2023 | Sato et al. |
| 2024/0036513 | A1 | 2/2024 | Fukui et al. |

FOREIGN PATENT DOCUMENTS

| | | |
|---|---|---|
| JP | 2012-163808 A | 8/2012 |
| JP | 2020-154300 A | 9/2020 |

OTHER PUBLICATIONS

Co-Pending U.S. Appl. No. 18/768,295, filed Jul. 10, 2024.
Co-Pending U.S. Appl. No. 18/806,982, filed Aug. 16, 2024.
Co-Pending U.S. Appl. No. 18/815,906, filed Aug. 27, 2024.
International Search Report and Written Opinion for International Patent Application No. PCT/JP2022/042455.

* cited by examiner

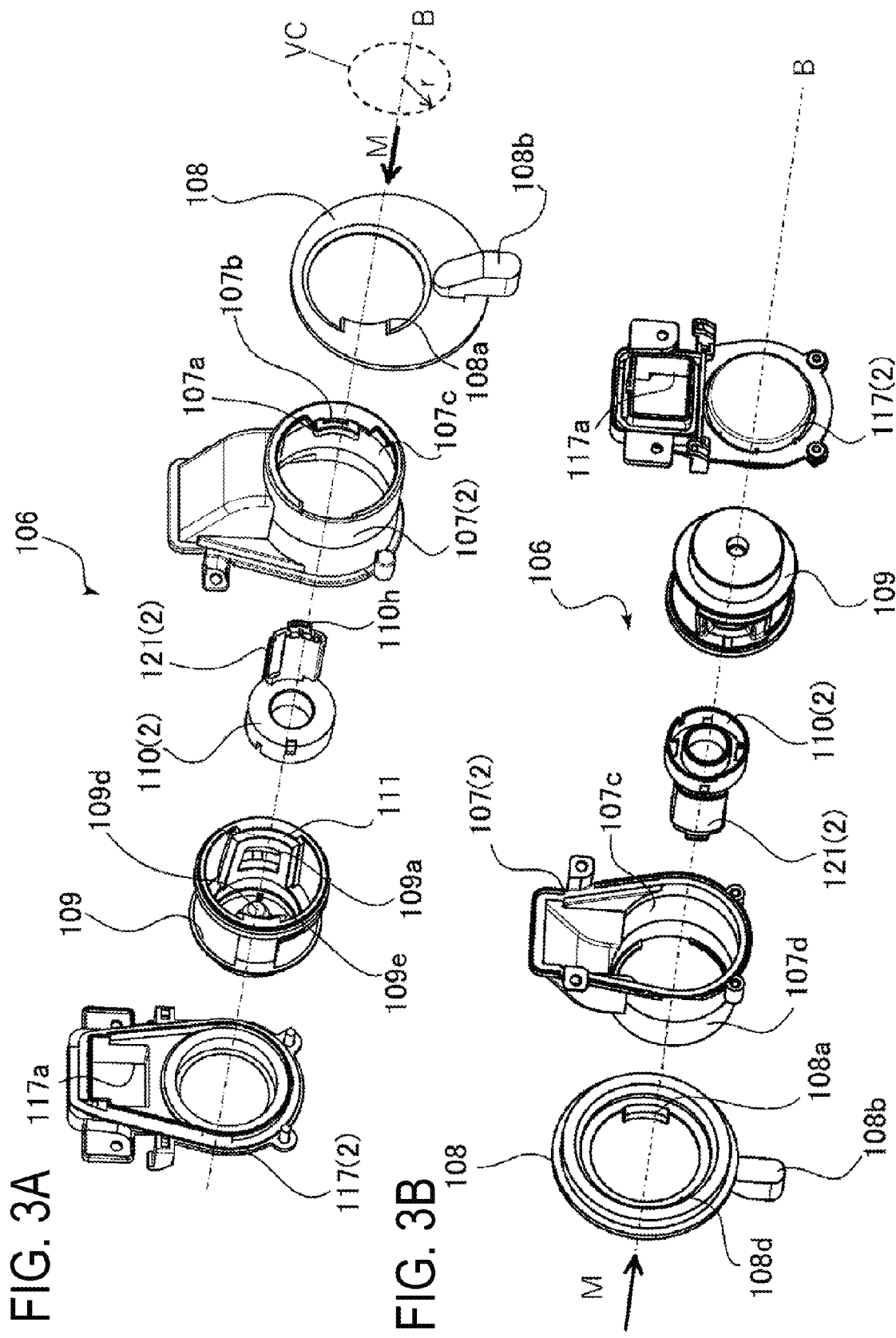

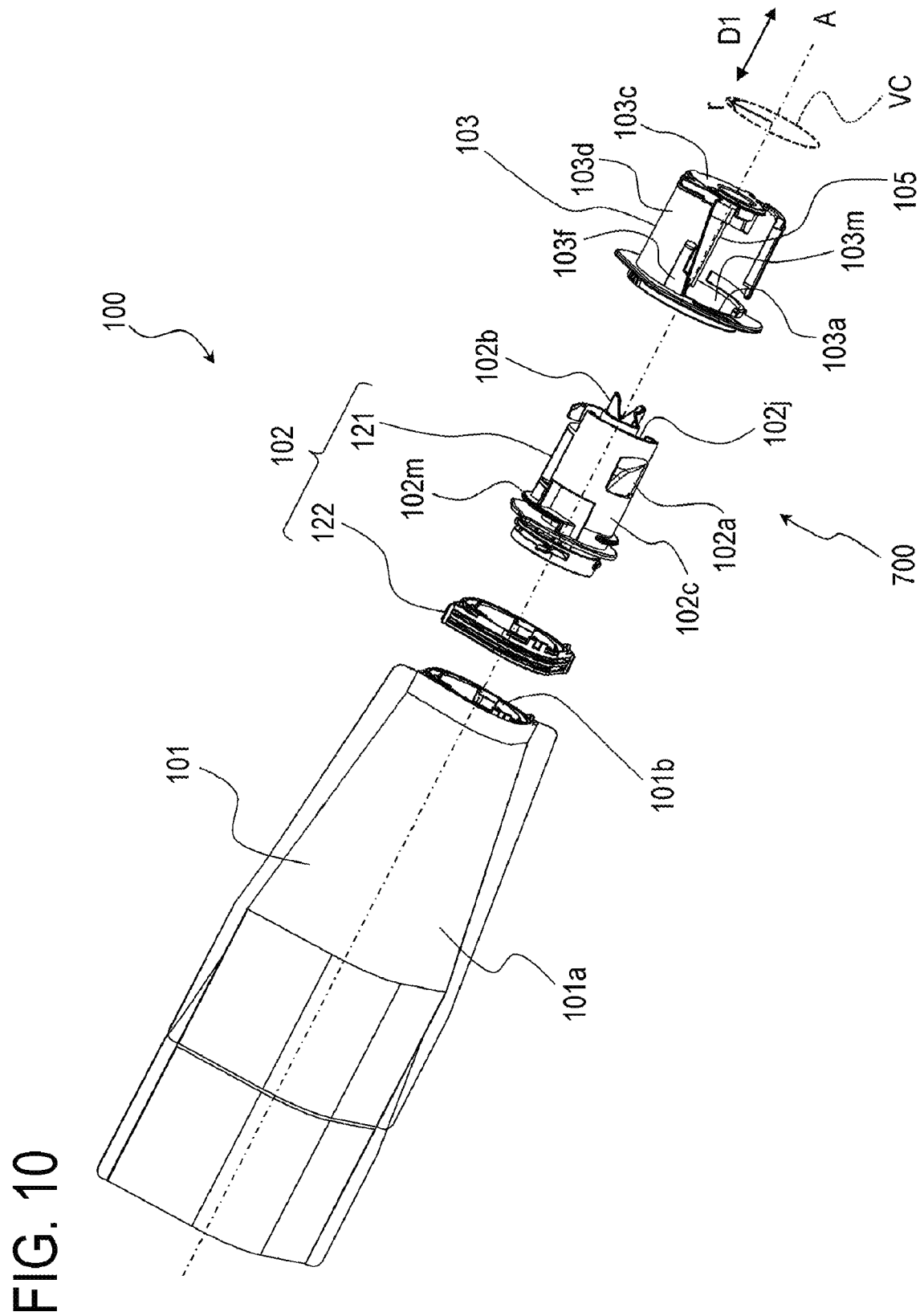

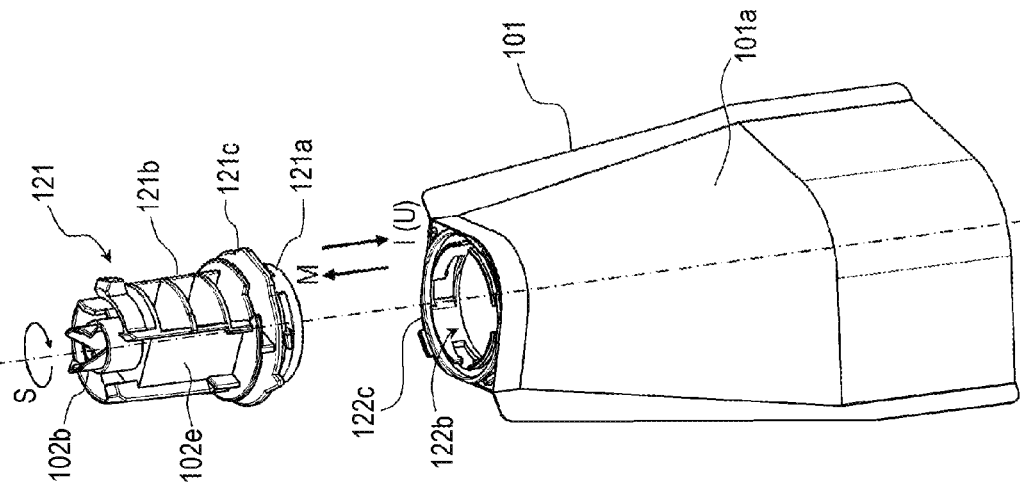
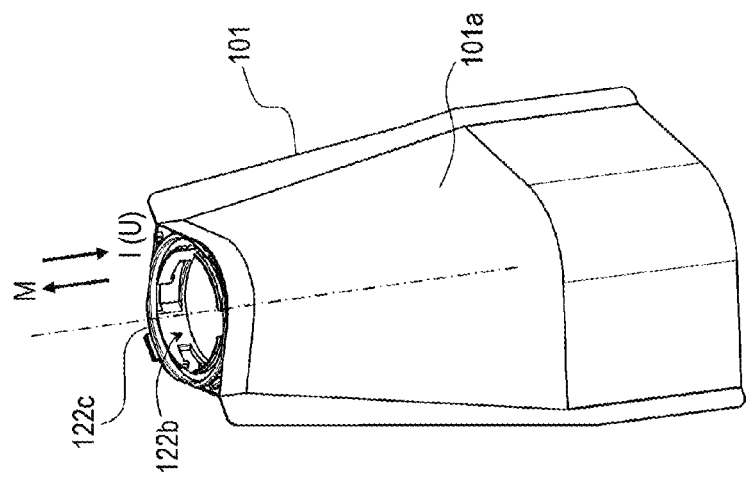
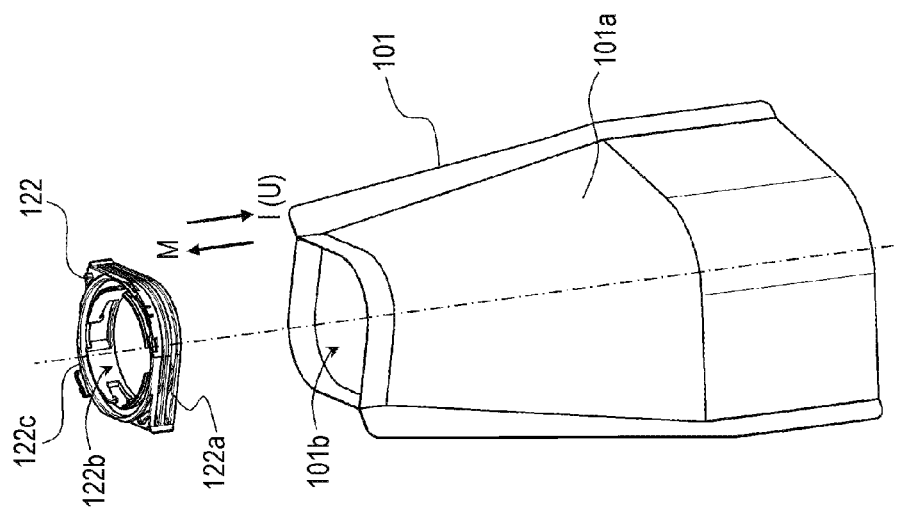

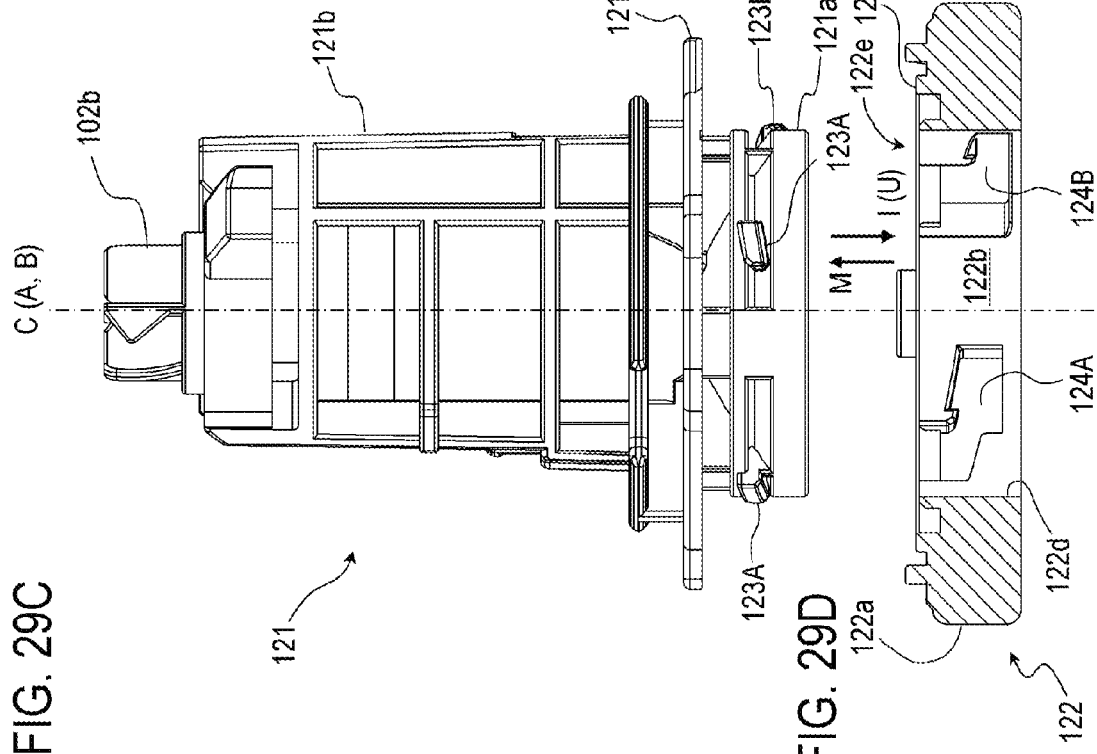
FIG. 29A
FIG. 29B
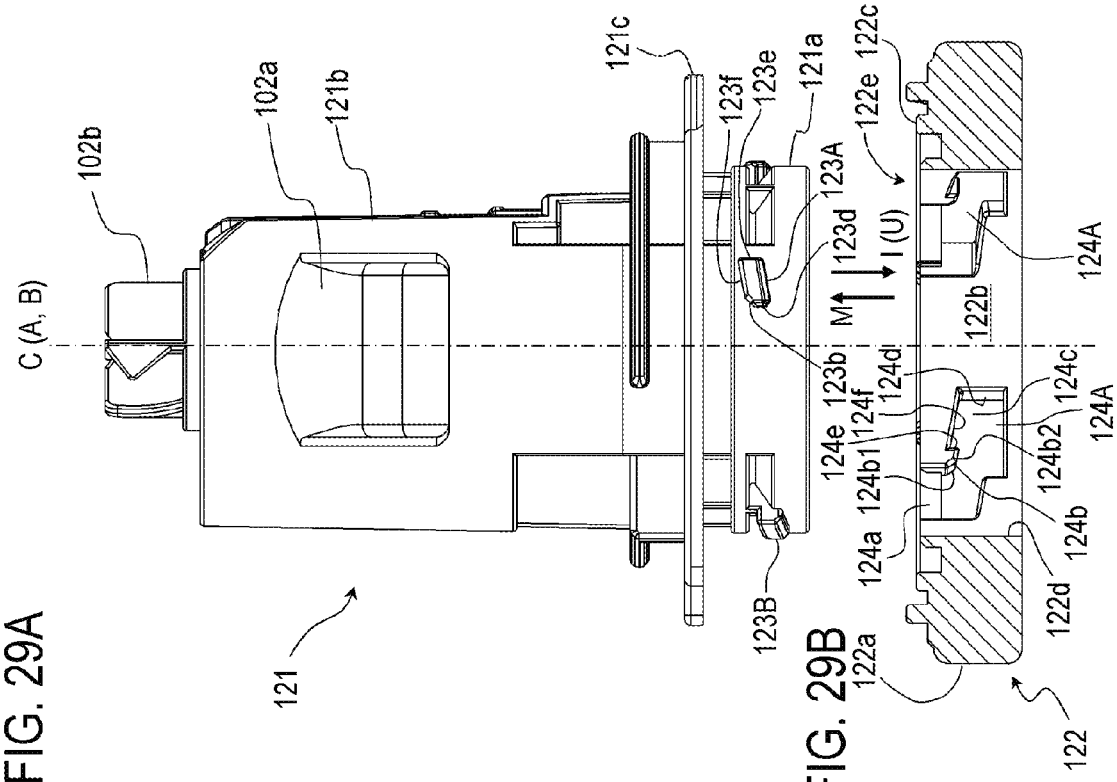
FIG. 29C
FIG. 29D

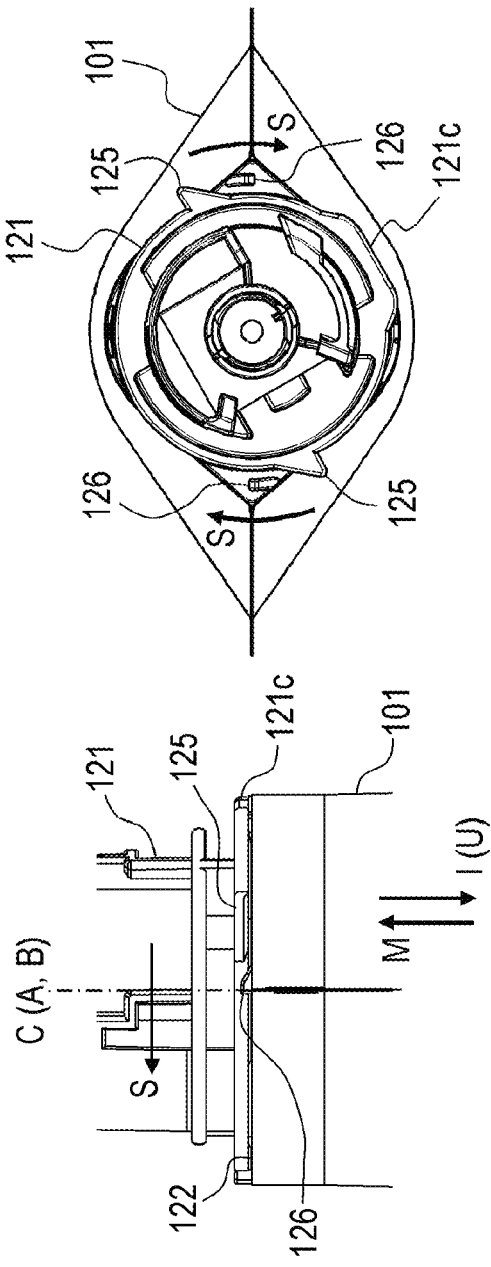
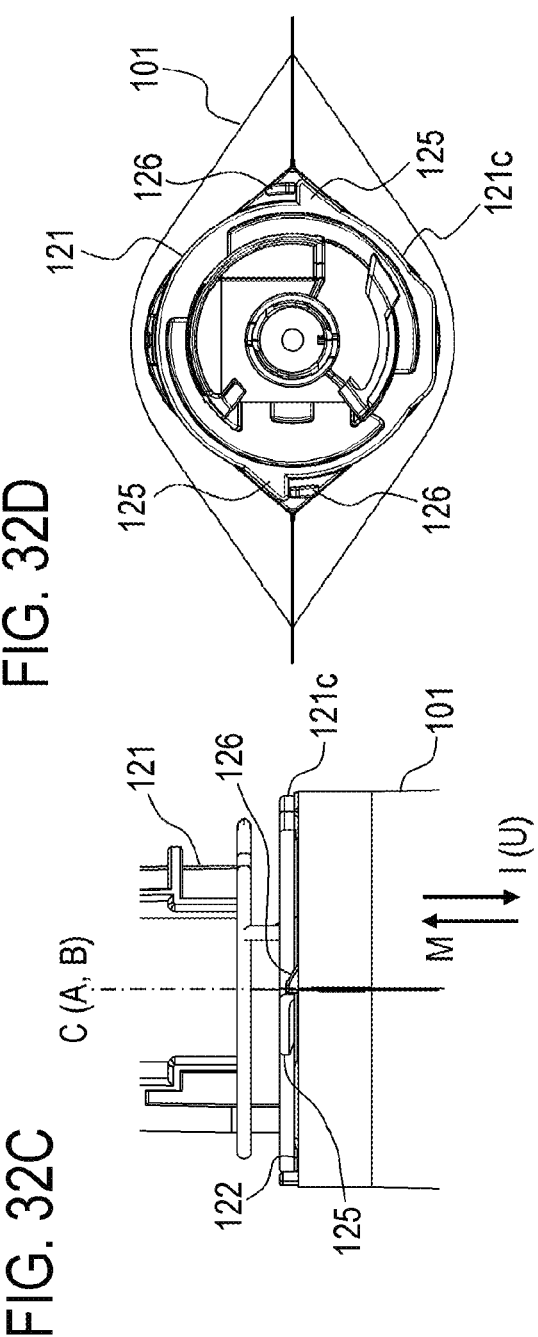

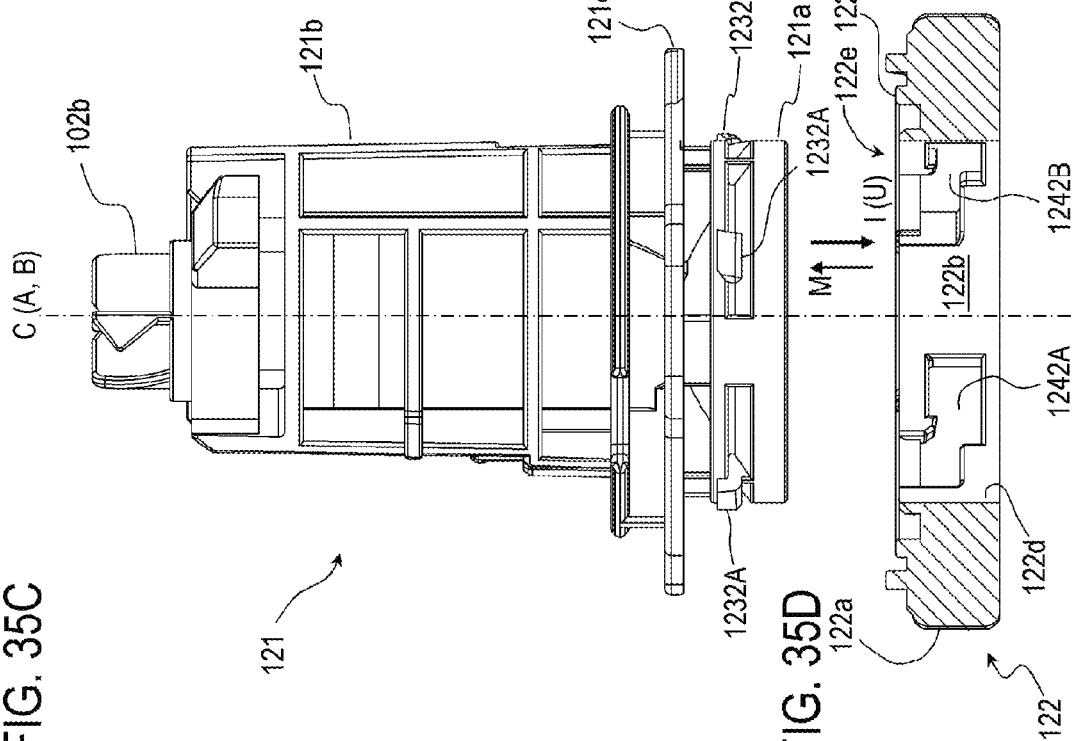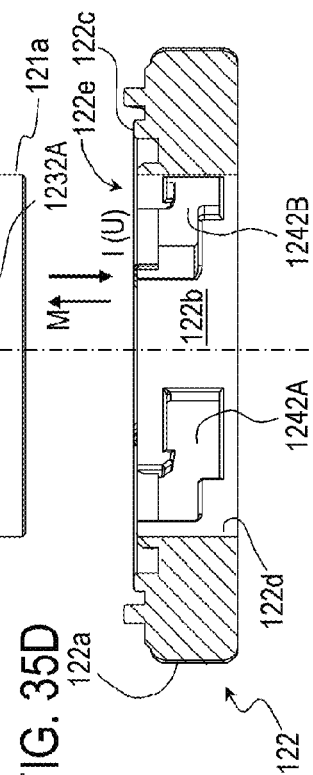
FIG. 35A
FIG. 35C
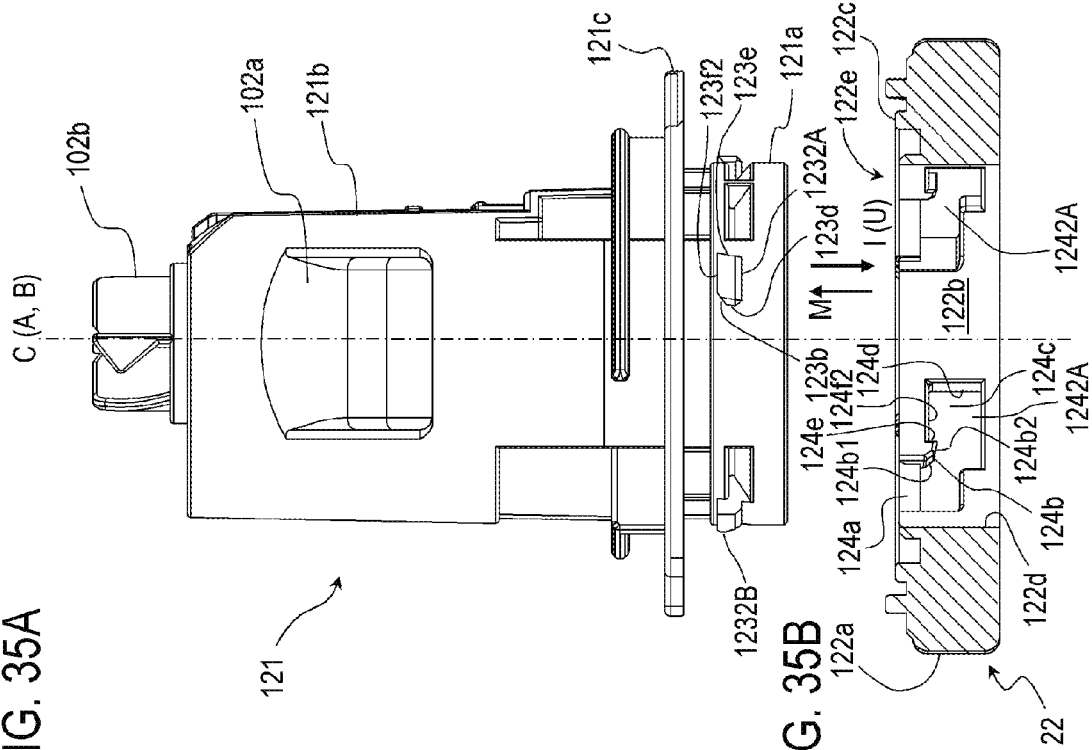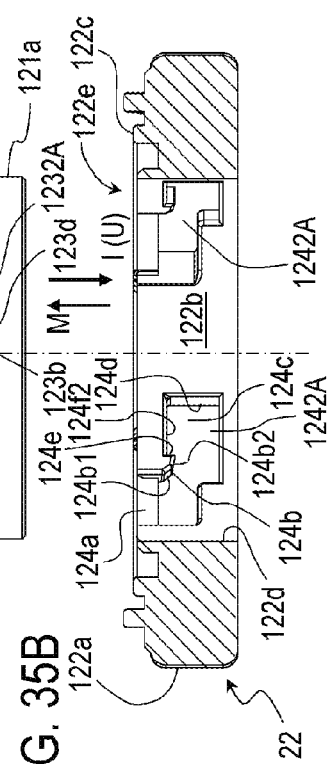
FIG. 35B
FIG. 35D

DEVELOPER CONTAINER AND MANUFACTURING METHOD FOR DEVELOPER CONTAINER

CROSS-REFERENCE TO RELATED APPLICATIONS

This application is a Continuation of International Patent Application No. PCT/JP2022/042455, filed Nov. 15, 2022, which claims the benefit of Japanese Patent Applications No. 2021-198141, filed Dec. 6, 2021, which is hereby incorporated by reference herein in their entirety.

BACKGROUND OF THE INVENTION

Field of the Invention

The present invention relates to a developer container for use in an image forming apparatus that forms images on recording materials.

Background Art

A configuration for suppling developer to a developer container in a main body of an electrophotographic image forming apparatus is known, in which a refill pack as the developer container is attached to the main body of the apparatus, and toner as the developer is supplied from the refill pack to a container portion of the main body of the apparatus (PTL 1). A known refill pack configuration includes a flexible container member (pouch) having an opening portion, to which a discharge path forming member forming a discharge path for discharging the toner is welded, with a shutter that opens and closes a discharge port of the discharge path forming member being assembled thereto.

During the manufacture of the refill pack configuration described above, the pouch could be filled with the toner after welding the discharge path forming member to the opening portion of the pouch through the discharge path formed in the discharge path forming member, for example. However, in some cases, depending on the structure of the discharge port (e.g., opening width), it may not be easy to fill the toner, or it may be difficult to ensure the efficiency of the toner filling operation. Namely, there is some room for improving the efficiency of filling the pouch with toner while maintaining the airtightness of the pouch containing the toner.

An object of the present invention is to provide a technique that can improve the ease of assembly of developer containers while suppressing developer leakage from the container.

CITATION LIST

Patent Literature

PTL 1 Japanese Patent Application Publication No. 2020-154300

SUMMARY OF THE INVENTION

To achieve the above object, a developer container according to the present invention includes:
a container member including a container portion containing a developer, and an opening portion that opens the container portion;
a connector member attached to the opening portion; and
a discharge path forming member connected to the container member via the connector member and forming a discharge path for discharging the developer from the container portion,
the connector member including an inserted portion having a through hole extending therethrough, and an engaged portion,
the discharge path forming member including an insertion portion inserted into the through hole of the inserted portion, and an engaging portion provided correspondingly to the engaged portion,
the engaged portion and the engaging portion being configured
to come to a mutually engaged state through a process in which at least one of the connector member and the discharge path forming member is elastically deformed by a relative rotation between the connector member and the discharge path forming member about a predetermined rotation axis as a center axis, in a state where the insertion portion is inserted into the inserted portion, and
to restrict, in the engaged state, a relative movement of the connector member and the discharge path forming member in a direction of the rotation axis.

To achieve the above object, a manufacturing method for a developer container of the present invention is
a method of manufacturing a developer container that contains a developer to be supplied to a main body of an image forming apparatus,
the developer container including:
a container member including a container portion containing a developer, and an opening portion that opens the container portion;
a connector member attached to the opening portion; and
a discharge path forming member connected to the container member via the connector member and forming a discharge path for discharging a developer from the container portion,
the connector member including an inserted portion having a through hole extending therethrough, and an engaged portion,
the discharge path forming member including an insertion portion inserted into the through hole of the inserted portion, and an engaging portion provided correspondingly to the engaged portion,
the engaged portion and the engaging portion being configured
to come to a mutually engaged state through a process in which at least one of the connector member and the discharge path forming member is elastically deformed by a relative rotation between the connector member and the discharge path forming member about a predetermined rotation axis as a center axis, in a state where the insertion portion is inserted into the inserted portion, and
to restrict, in the engaged state, a relative movement of the connector member and the discharge path forming member in a direction of the rotation axis, the method including:
a first assembling step of attaching the connector member to the connector member;
a filling step of filling the container portion with the developer; and
a second assembling step of connecting the discharge path forming member to the container member via the connector member.

To achieve the above object, a developer container according to the present invention includes:
- a container portion having an opening portion at one end thereof and containing developer;
- a nozzle having an engaging portion, and a discharge port aligned with the container portion in a predetermined direction for discharging the developer contained in the container portion; and
- a coupling member having an engaged portion that engages with the engaging portion, and attached to the opening portion, and coupling the nozzle and the container portion,
- the engaged portion including a first restricting portion and a second restricting portion,
- the engaging portion being configured to move, in a case where the nozzle is moved in an intersecting direction intersecting the predetermined direction relative to the coupling member, from a first position to a second position in the intersecting direction relative to the engaged portion,
- the first position being a position where the nozzle is allowed to move in the predetermined direction relative to the coupling member,
- the second position being a position where the first restricting portion restricts a movement of the nozzle in the predetermined direction relative to the coupling member, and where the second restricting portion restricts a movement of the engaging portion relative to the engaged portion from the second position to the first position in the intersecting direction.

Further features of the present invention will become apparent from the following description of exemplary embodiments with reference to the attached drawings.

BRIEF DESCRIPTION OF THE DRAWINGS

FIG. 3A is an exploded perspective view of a mounting portion, and FIG. 3B is an exploded perspective view of the mounting portion seen from a different direction than in FIG. 3A.

FIG. 10 is an exploded perspective view illustrating the toner pack when the pack-side shutter is in the covering position.

FIG. 27A is a perspective view of a pouch and the connector member separate from each other before the connector member is joined to the pouch, FIG. 27B is a perspective view after the connector member has been joined to the pouch, and FIG. 27C is a perspective view illustrating a state of the pouch ready to be filled with the toner, with the connector member joined thereto.

FIG. 29A is a side view illustrating one side of the nozzle body where a discharge port is provided, FIG. 29B is a cross-sectional view of the connector member including the rotation axis of relative rotation between the nozzle body and connector member, FIG. 29C is a side view illustrating the opposite side from the side shown in FIG. 29A of the nozzle body, and FIG. 29D is a cross-sectional view of the connector member including the rotation axis of relative rotation between the nozzle body and connector member.

FIG. 32A is an enlarged side view of the pouch and nozzle illustrating a state of a second engagement structure (an outer engaging protrusion of the nozzle body and an engaged protrusion of the connector member) when the nozzle body is in the fully inserted position, and FIG. 32B is a view (bottom view) of the pouch and nozzle shown in FIG. 32A seen in the insertion direction, FIG. 32C is an enlarged side view of the pouch and nozzle assembly illustrating a state of the second engagement structure (outer engaging protrusion of the nozzle body and engaged protrusion of the connector member) when the nozzle body is in the fully engaged position, and FIG. 32D is a view (bottom view) of the pouch and nozzle assembly shown in FIG. 32C seen in the insertion direction.

FIG. 35A is a side view illustrating one side of the nozzle body where the discharge port is provided in a variation example, and FIG. 35B is a cross-sectional view of the connector member including the rotation axis of relative rotation between the nozzle body and connector member, FIG. 35C is a side view illustrating the opposite side from the side shown in FIG. 35A of the nozzle body in the variation example, and FIG. 35D is a cross-sectional view of the connector member including the rotation axis of relative rotation between the nozzle body and connector member.

DESCRIPTION OF THE EMBODIMENTS

The embodiment of the present disclosure will be illustratively described with respect to the following examples of embodiment. It should be noted that the configurations disclosed in the following examples, e.g., functions, materials, shapes of components, and their relative arrangements, are examples in the forms associated with the claims, and are not intended to limit the scope of the claims to the configurations disclosed in these examples. The issues resolved by the configurations disclosed in the following examples, or effects or advantages achieved by the disclosed configurations are not intended to limit the scope of the claims.

Embodiment 1

Hereinafter, an electrophotographic image forming apparatus according to Embodiment 1 of the present disclosure is described with reference to the drawings. An electrophotographic image forming apparatus (hereinafter, image forming apparatus) is an apparatus that uses electrophotographic image forming techniques to form images on recording materials. Examples of image forming apparatus include a copier, facsimile, printer (e.g., laser beam printer, LED printer), and multifunction machine consolidating all these functionalities (multifunction printer).

Figure 1A:
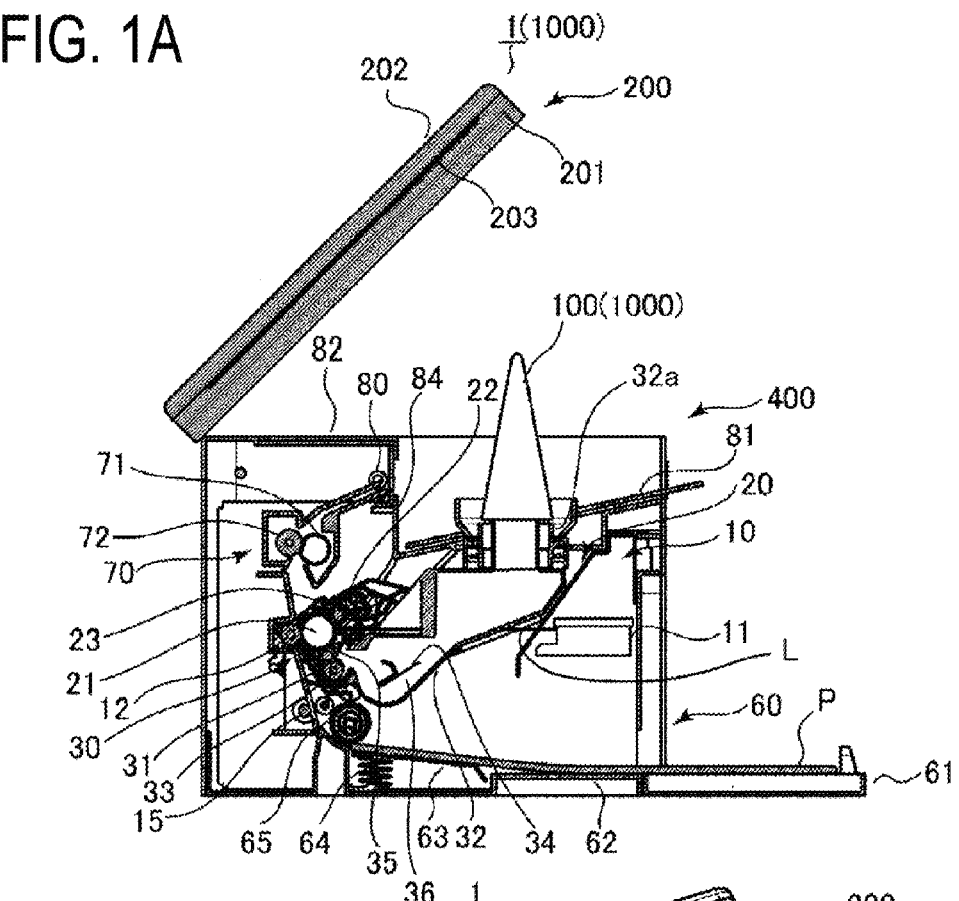
FIG. 1A is a schematic view illustrating an image forming apparatus according to a first embodiment.
Figure 1B:
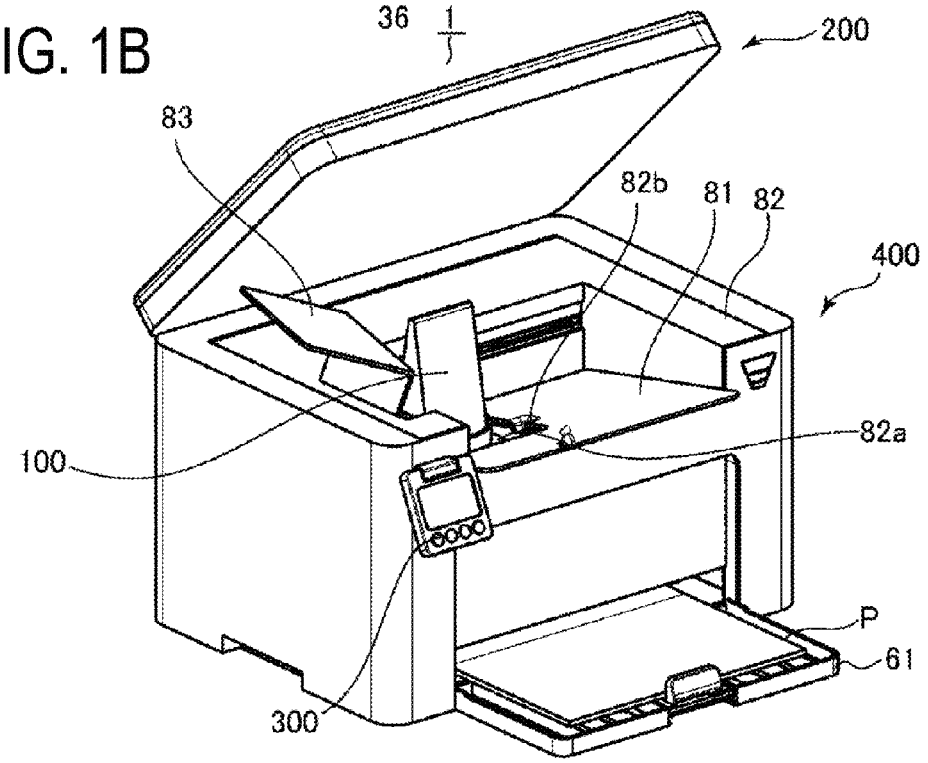
FIG. 1B is a perspective view illustrating the image forming apparatus.
Figure 2:
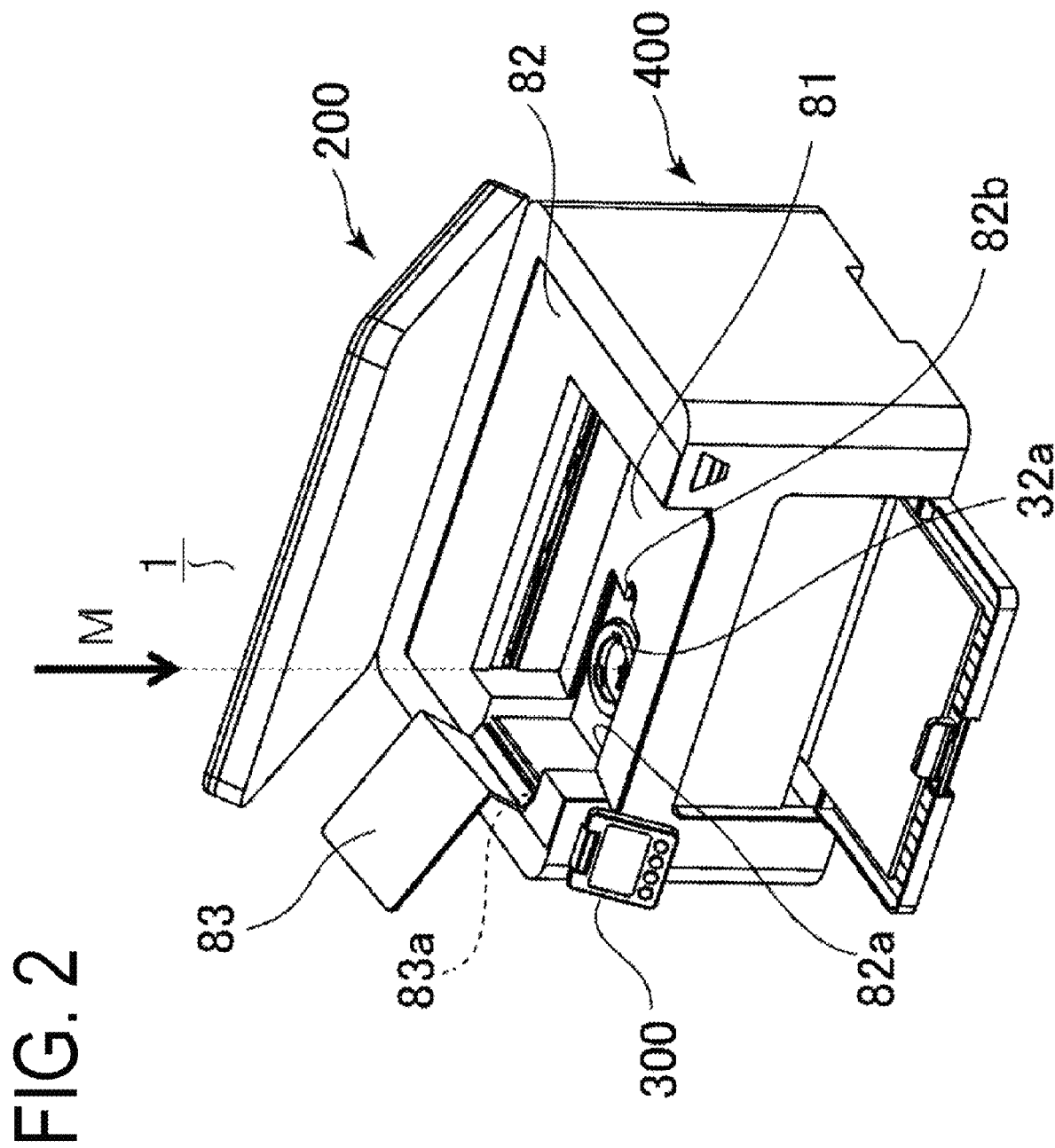
FIG. 2 is a perspective view illustrating an opening/closing member and a refill port.

FIG. 1A is a schematic view illustrating a configuration of the image forming apparatus 1 according to this embodiment. FIG. 1B is a perspective view illustrating the configuration of the image forming apparatus 1. FIG. 2 is a perspective view illustrating an opening/closing member 83 and a refill port 32a.

The image forming apparatus 1 is a monochrome printer that forms images on recording materials P based on image information input from an external device. Recording materials P include various different sheet materials, e.g., paper such as ordinary paper and heavy paper, plastic films such as overhead projector sheet, and irregular-shape sheets such as envelops and index paper, and fabrics.

[Overall Configuration]

The image forming apparatus 1 includes, as shown in FIG. 1A and FIG. 1B, an apparatus body 400, a reading apparatus 200 supported on the apparatus body 400 so as to be openable and closable, and an operation portion 300 attached to an external surface of the apparatus body 400. The apparatus body 400 includes an image forming portion 10 that forms a toner image on a recording material, a paper feed portion 60 that feeds the recording material to the image forming portion 10, a fixing portion 70 that fixes the toner image formed in the image forming portion 10 on the recording material, and a pair of discharge rollers 80.

The image forming portion 10 includes a scanner unit 11, an electrophotographic processing unit 20, and a transfer roller 12 that transfers the toner image formed on a photosensitive drum 21 of the processing unit 20 onto the recording material. The processing unit 20 includes the photosensitive drum 21, a charging roller 22 disposed near the photosensitive drum 21, a pre-exposure apparatus 23, and a developing apparatus 30 that includes a developing roller 31.

The photosensitive drum 21 is a photosensitive member in a cylindrical form. The photosensitive drum 21 in this embodiment has a photosensitive layer made of an organic photosensitive materiel having negative chargeability on a drum-like substrate made of aluminum. The photosensitive drum 21 is rotated at a predetermined processing speed by a motor in a predetermined direction (clockwise in the drawing).

The charging roller 22 contacts the photosensitive drum 21 with a predetermined pressure and forms a charging portion. A charging voltage of a desired level is applied to the charging roller 22 by a high voltage charging power supply, to charge the surface of the photosensitive drum 21 uniformly to a predetermined potential. In this embodiment, the photosensitive drum 21 is charged to a negative polarity by the charging roller 22. The pre-exposure apparatus 23 reduces the surface potential of the photosensitive drum 21 before the charging portion to ensure a stable discharge in the charging portion.

The scanner unit 11 projects a laser beam corresponding to image information input from an external device or reading apparatus 200 to the photosensitive drum 21 using a polygon mirror to scan and expose the surface of the photosensitive drum 21. An electrostatic latent image corresponding to the image information is formed on the surface of the photosensitive drum 21 by this exposure. The scanner unit 11 is not limited to a laser scanner device. For example, an LED exposure apparatus having LED array of multiple LEDs aligned along a longitudinal direction of the photosensitive drum 21, for example, may be adopted.

The developing apparatus 30 includes the developing roller 31 that carries the developer, a developer container 32 that is the casing of the developing apparatus 30, and a supply roller 33 adapted to supply the developer to the developing roller 31. The developing roller 31 and supply roller 33 are rotatably supported by the developer container 32. The developing roller 31 is disposed in an opening portion of the developer container 32 such as to face the photosensitive drum 21. The supply roller 33 is in contact with and rotatable relative to the developing roller 31, so that the toner, which is the content stored in the developer container 32, is applied on the surface of the developing roller 31 by the supply roller 33. In a configuration in which the toner can be sufficiently supplied to the developing roller 31, the supply roller 33 need not necessarily be provided.

The developing apparatus 30 of this embodiment uses a contact development system as the developing method. Namely, a toner layer carried on the developing roller 31 comes into contact with the photosensitive drum 21 in a developing portion (developing region) where the photosensitive drum 21 faces the developing roller 31. A development voltage is applied to the developing roller 31 by a high voltage development power supply. With the development voltage applied, the toner carried on the developing roller 31 is transferred from the developing roller 31 to the drum surface in accordance with the surface potential distribution of the photosensitive drum 21. The electrostatic latent image is thus developed into a toner image. This embodiment adopts a reversal development method. Namely, the toner image is formed by the toner adhering to a surface region of the photosensitive drum 21 where the charge has decayed by the exposure in the exposure process, after being charged in the charging process.

This embodiment uses a toner having a particle size of 6 [μm], its standard polarity when charged being negative. This embodiment adopts a polymerized toner produced by a polymerization method as one example. The toner in this embodiment is a type known as a nonmagnetic mono-component developer, i.e., the toner does not contain magnetic components, and is carried on the developing roller 31 mainly by an intermolecular force or electrostatic force (image force). Mono-component developer that contains a magnetic component may also be used. Some mono-component developers contain, other than the toner particles, additives (e.g., wax or fine silica particle) for adjusting the fluidity or chargeability of the toner. A dual-component developer composed of a nonmagnetic toner and a magnetic carrier may also be used as the developer. In the case where a magnetic developer is used, a cylindrical developing sleeve with a magnet disposed inside, for example, is used as a developer carrying member.

The developer container 32 is provided with a container portion 36 that contains the toner, and an agitation member 34 disposed inside the container portion 36. The agitation member 34 is rotated, driven by a motor (not shown), to agitate the toner inside the developer container 32, as well as to feed the toner to the developing roller 31 and supply roller 33. The agitation member 34 also serves the function of keeping the toner inside the developer container uniform, by circulating the toner that was not used in the development process and scraped off from the developing roller 31. The agitation member 34 is not limited to the rotary type. For example, a rocking type agitation member may be adopted.

A developing blade 35, which restricts the amount of toner carried on the developing roller 31, is provided in the opening portion of the developer container 32 where the developing roller 31 is disposed. As the developing roller 31 rotates, the toner supplied to the surface of the developing roller 31 is uniformly distributed in a thin layer and negatively charged by triboelectric charging as the toner passes through the area opposite the developing blade 35.

The paper feed portion 60 includes, as shown in FIG. 1A and FIG. 1B, a front door 61 supported on the apparatus body 400 so as to be openable and closable, a tray portion 62, a middle plate 63, a tray spring 64, and a pick-up roller 65. The tray portion 62 forms the bottom surface of a recording material storage space that is revealed when the front door 61 is opened. The middle plate 63 is supported on the tray portion 62 such as to be lifted up and down. The tray spring 64 urges the middle plate 63 upward to press the recording material P stacked on the middle plate 63 against the pick-up roller 65. When closed on the apparatus body 400, the front door 61 closes the recording material storage space. When open relative to the apparatus body 400, the front door supports the recording material P together with the tray portion 62 and middle plate 63.

The fixing portion 70 is a heat fixing type that fixes images by heating and melting the toner on the recording material. The fixing portion 70 includes a fixing film 71, a fixing heater such as a ceramic heater for heating the fixing film 71, a thermistor for measuring the temperature of the fixing heater, and a pressure roller 72 for making pressure contact with the fixing film 71.

Next, an image forming operation of the image forming apparatus 1 is described. An input of an image formation command to the image forming apparatus 1 initiates the image forming process by the image forming portion 10 based on the image information input from an external computer connected to the image forming apparatus 1, or from the reading apparatus 200. The scanner unit 11 projects a laser beam to the photosensitive drum 21 in accordance with the input image information. The photosensitive drum 21 at this time is already charged by the charging roller 22, so that an electrostatic latent image is formed on the photosensitive drum 21 by the laser beam irradiation. The developing roller 31 then develops this electrostatic latent image and thus a toner image is formed on the photosensitive drum 21.

In parallel with the above image forming process, the pick-up roller 65 in the paper feed portion 60 rolls out the recording material P supported on the front door 61, tray portion 62, and middle plate 63. The recording material P, fed to a pair of registration rollers 15 by the pick-up roller 65, abuts on the nip of the registration roller pair 15, whereby any skew is corrected. The pair of registration rollers 15 is driven in sync with the transfer timing of the toner image, to convey the recording material P toward a transfer nip formed by the transfer roller 12 and the photosensitive drum 21.

A transfer voltage is applied to the transfer roller 12 by a high voltage transfer power supply, so that the toner image carried on the photosensitive drum 21 is transferred onto the recording material P as it is conveyed by the pair of registration rollers 15. The recording material P onto which the toner image has been transferred is conveyed to the fixing portion 70, where the toner image is heated and pressed as the recording material passes through a nip portion between the fixing film 71 and the pressure roller 72 of the fixing portion 70. The heat and pressure melt the toner particles, which then adhere, and the toner image is thus fixed to the recording material P. The recording material P, after passing through the fixing portion 70, is expelled from the image forming apparatus 1 (to the outside) by a pair of discharge rollers 80, and stacked on a discharge tray 81 formed in a top part of the apparatus body 400.

The discharge tray 81 is inclined upward toward downstream in the discharge direction of the recording material. The recording material expelled onto the discharge tray 81 slides down on the discharge tray 81, whereby the rear edges are aligned by a restricting surface 84.

The reading apparatus 200 includes a reading unit 201 containing a reading portion (not shown) inside, and a pressing plate 202 supported on the reading unit 201 so as to be openable and closable. A document glass 203, which transmits the light emitted from the reading portion, and on which a document is placed, is provided on the upper surface of the reading unit 201.

For an image of a document to be read by the reading apparatus 200, the user places the document on the document glass 203, with the pressing plate 202 open. The pressing plate 202, when shut, prevents misalignment of the document on the document glass 203. A read command is output to the image forming apparatus 1 by an operation performed to the operation portion 300, for example. The reading operation is started with the reading portion inside the reading unit 201 moving back and forth in a sub-scanning direction, i.e., left and right direction, with the operation portion 300 of the image forming apparatus 1 positioned in the front. The reading portion reads the image of the document by photoelectric conversion, i.e., by emitting light from a light-emitting portion to the document and receiving the light reflected from the document by a light-receiving portion. Hereinafter, the front and back direction, left and right direction, and up and down direction are defined relative to the operation portion 300 facing the front.

A top cover 82 is provided in an upper part of the apparatus body 400. The discharge tray 81 is formed on the upper surface of the top cover 82. An opening/closing member 83 is supported on the top cover 82 rotatably about a rotation shaft 83*a* extending in the front and back direction to open and close, as shown in FIG. 1B and FIG. 2. An opening portion 82*a* that opens upward is formed in the discharge tray 81 of the top cover 82.

The opening/closing member 83 is configured to be movable between a closed position where it covers the refill port 32*a* so as not to allow attachment of a toner pack 100 to the developer container 32, and an open position where it exposes the refill port 32*a* to allow the toner pack 100 to be attached to the developer container 32. With the opening/closing member 83 being in the open position, the toner pack 100 is moved in the mounting direction M toward the refill port 32*a*, and attached to the refill port 32*a*.

In the closed position, the opening/closing member 83 serves as a part of the discharge tray 81. The opening/closing member 83 and opening portion 82*a* are formed on the left side of the discharge tray 81. The opening/closing member 83 is opened to the left by hooking a finger in a groove 82*b* provided in the top cover 82. The opening/closing member 83 is substantially in the form of letter L conforming to the shape of the top cover 82.

The opening portion 82*a* of the discharge tray 81 is opened to expose the refill port 32*a* formed at the top of the developer container 32 for suppling the toner. The user can access the refill port 32*a* by opening the opening/closing member 83. This embodiment adopts a direct refill system that allows the user to supply the toner from the toner pack 100 filled with refill toner (see FIG. 1A and FIG. 1B) to the developing apparatus 30, with the developing apparatus 30 being mounted in the image forming apparatus 1. The toner pack 100 is at least partly exposed to the outside when attached to a mounting portion 106 of the image forming apparatus 1 (see FIG. 17A and FIG. 17B).

This system offers better usability because it obviates the need to take the processing unit 20 out of the apparatus body 400 and to replace it with a new one, when the processing unit 20 runs low on the toner. This system also allows the developer container 32 to be refilled with toner more inexpensively than replacing the entire processing unit 20. The direct refill system also enables cost reduction as compared to replacing only the developing apparatus 30 of the processing unit 20, because there is no need to replace various rollers and gears. The image forming apparatus 1 and the toner pack 100 configure an image forming system 1000.

[Mounting Portion]

Figure 4A:
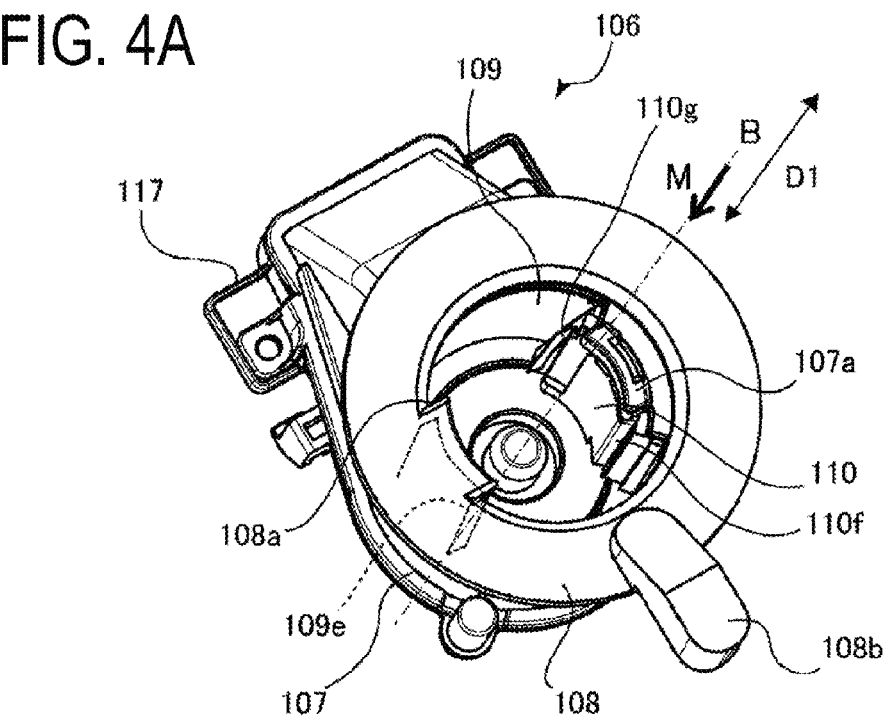
FIG. 4A is a perspective view illustrating an outer view of the mounting portion when the operation lever is in a closed position.
Figure 4B:
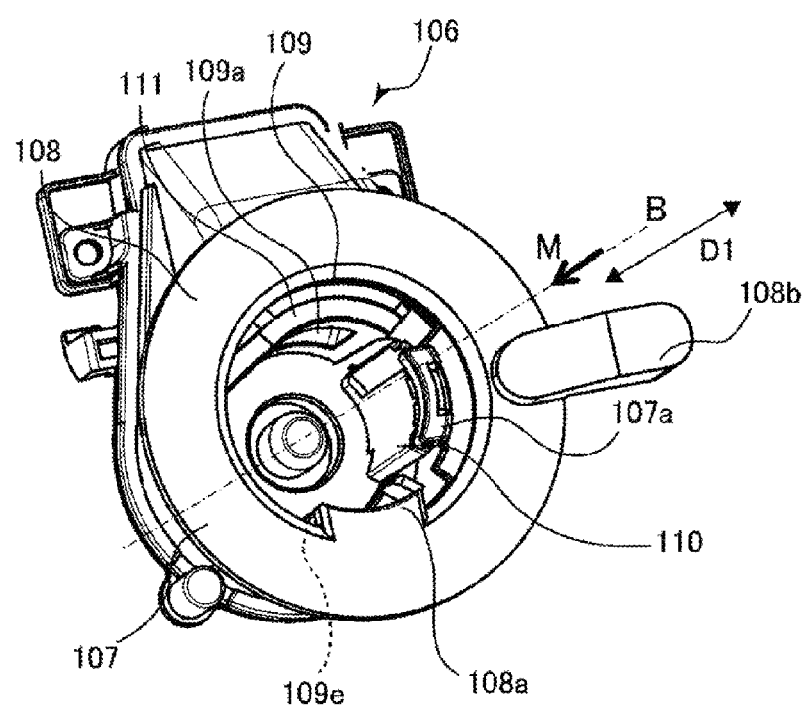
FIG. 4B is a perspective view illustrating an outer view of the mounting portion when the operation lever is in an open position.
Figure 5A:
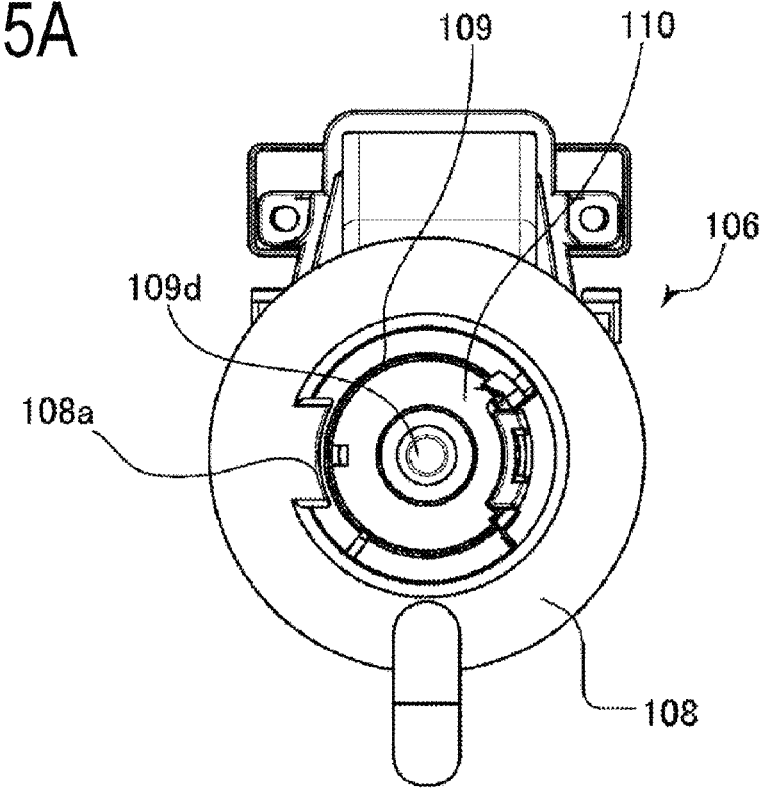
FIG. 5A is a plan view illustrating an outer view of the mounting portion when the operation lever is in a closed position.
Figure 5B:
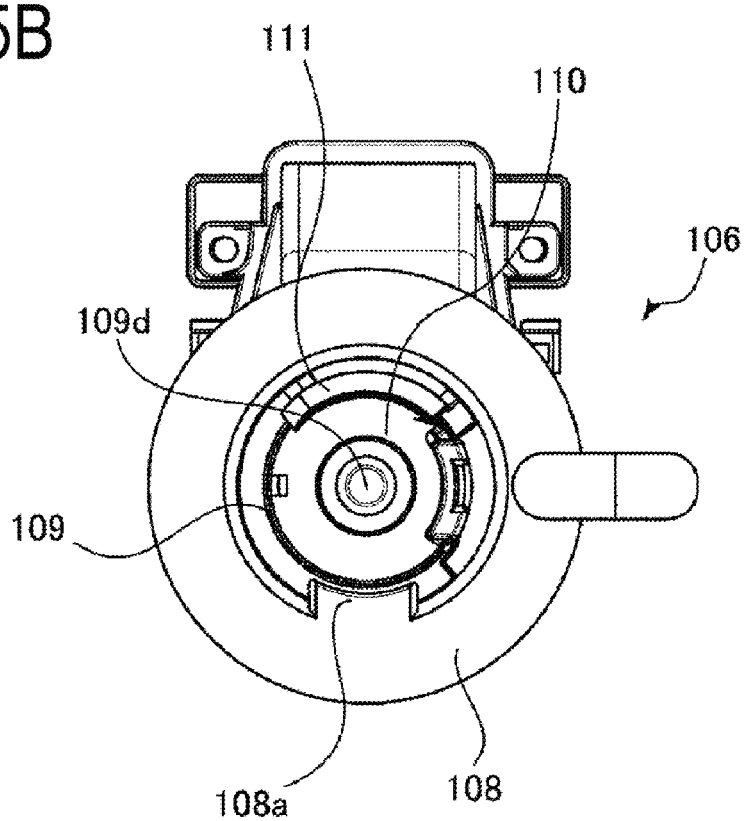
FIG. 5B is a plan view illustrating an outer view of the mounting portion when the operation lever is in an open position.

Next, the configuration of the mounting portion 106 where the toner pack 100 is attached is described with reference to FIG. 3A to FIG. 8B. In this embodiment, the mounting portion 106 is a unit including the refill port 32a, provided to the image forming apparatus 1 (see FIG. 2) for allowing attachment of the toner pack 100. FIG. 3A is an exploded perspective view of the mounting portion 106. FIG. 3B is an exploded perspective view of the mounting portion 106 seen from a different direction than in FIG. 3A. FIG. 4A is a perspective view illustrating an outer view of the mounting portion 106 when the operation lever 108 is in a closed position, and FIG. 5A is a view of the mounting portion 106 seen from the mounting direction M when the operation lever 108 is in the closed position. FIG. 4B is a perspective view illustrating an outer view of the mounting portion 106 when the operation lever 108 is in an open position, and FIG. 5B is a view of the mounting portion 106 seen from the mounting direction M when the operation lever 108 is in the open position.

Figure 6A:
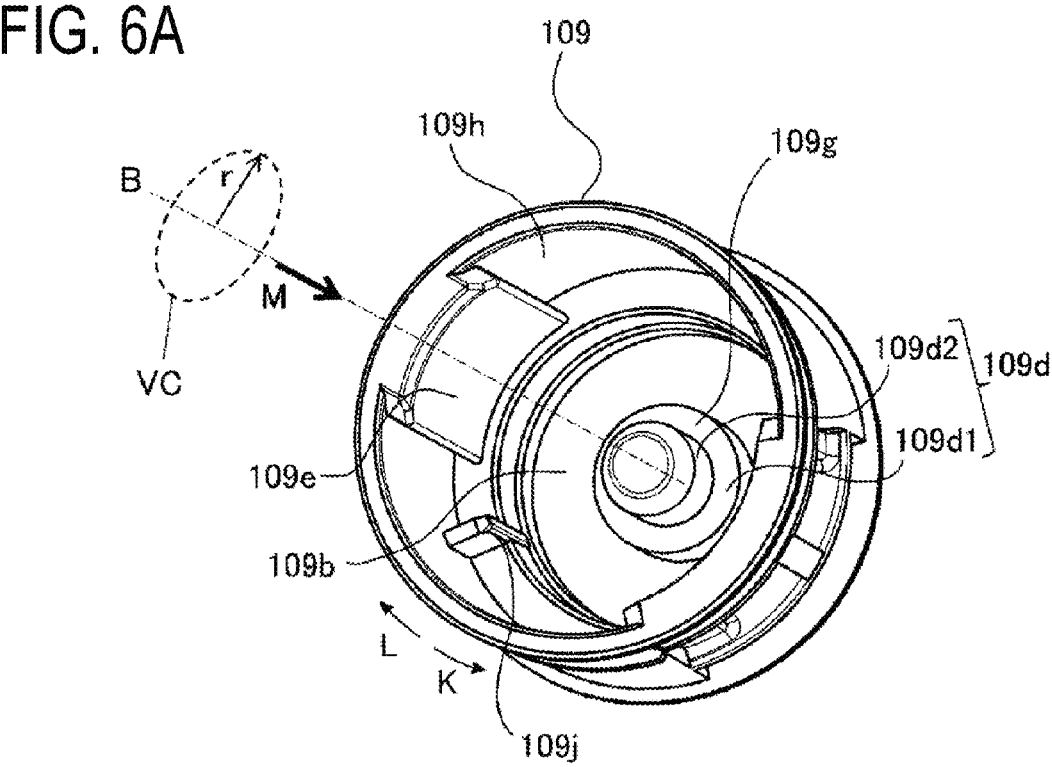
FIG. 6A is a perspective view of an apparatus-side shutter seen from upstream in the mounting direction.
Figure 6B:
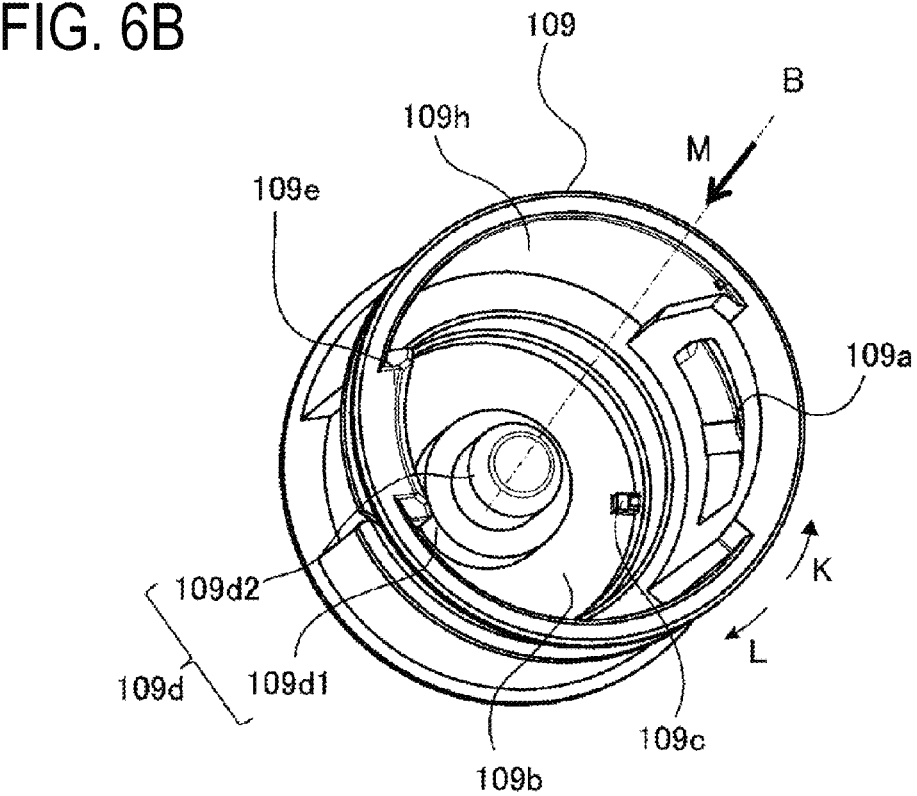
FIG. 6B is a perspective view of the apparatus-side shutter seen from a different point of view than in FIG. 6A.
Figure 7A:
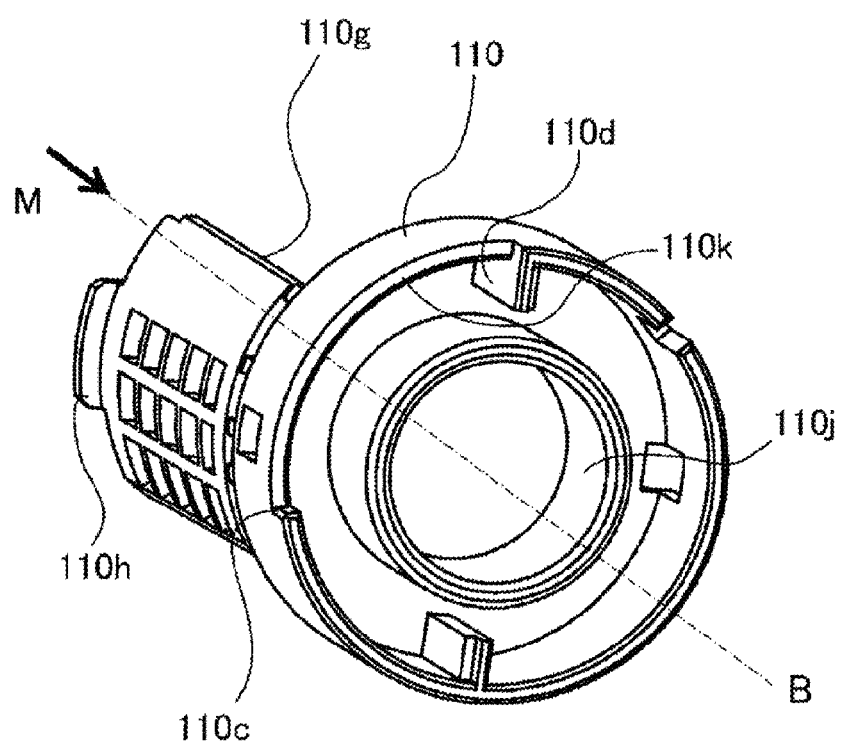
FIG. 7A is a perspective view of a cover seen from downstream in the mounting direction.
Figure 7B:
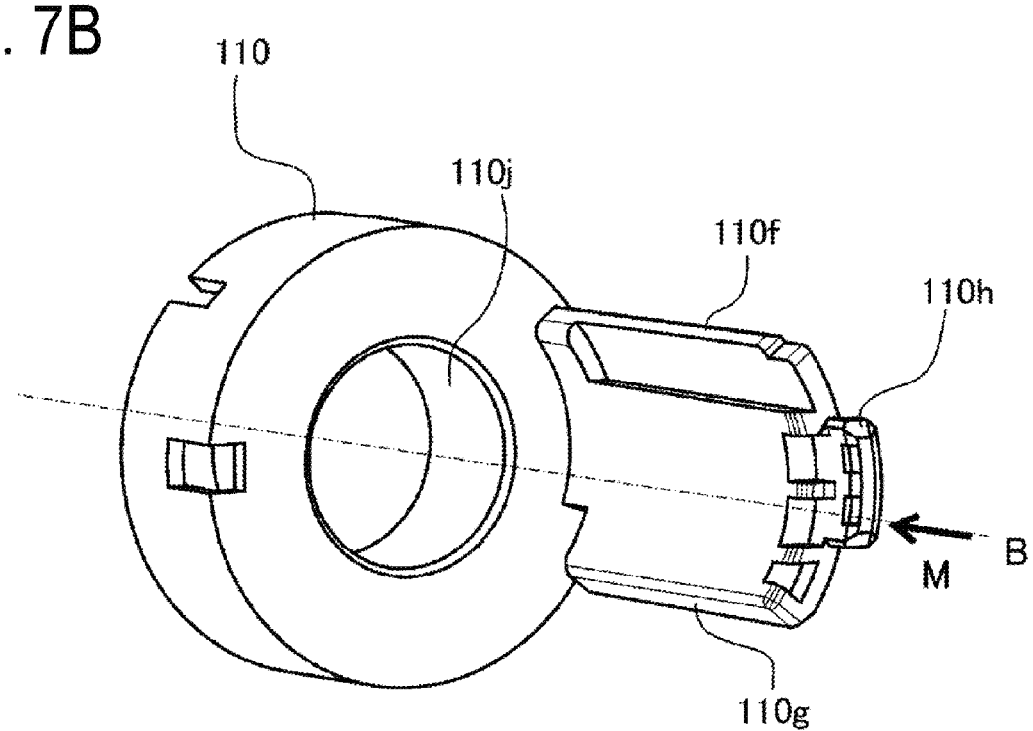
FIG. 7B is a perspective view of the cover seen from upstream in the mounting direction M.
Figure 8A:
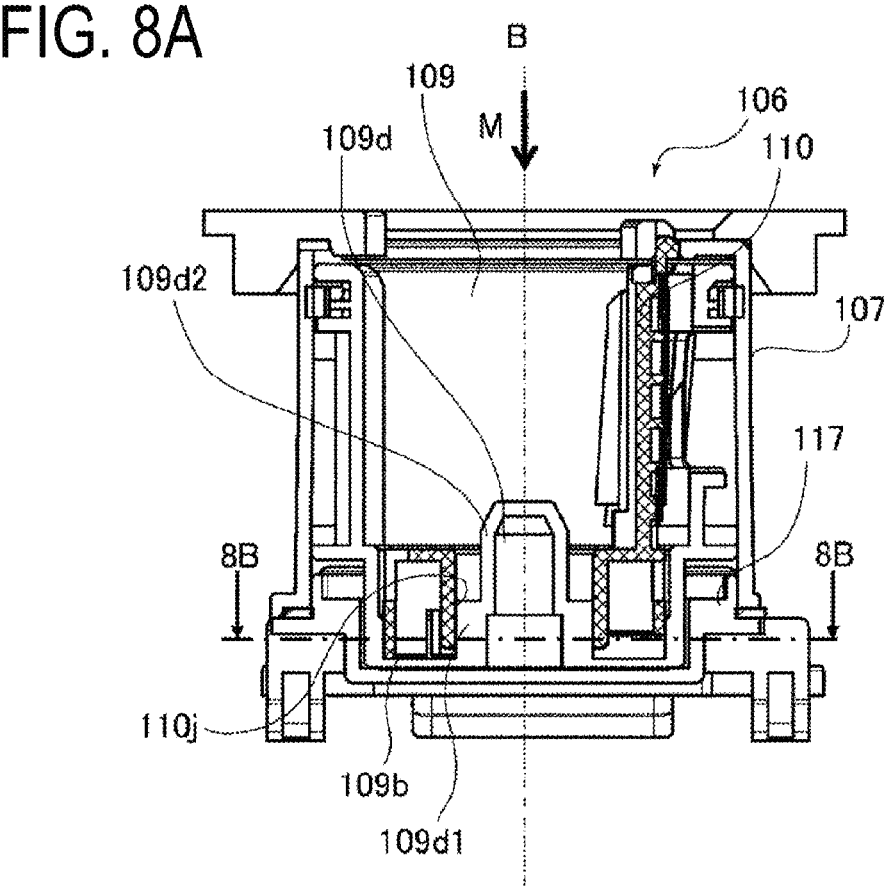
FIG. 8A is a cross-sectional view illustrating the mounting portion.
Figure 8B:
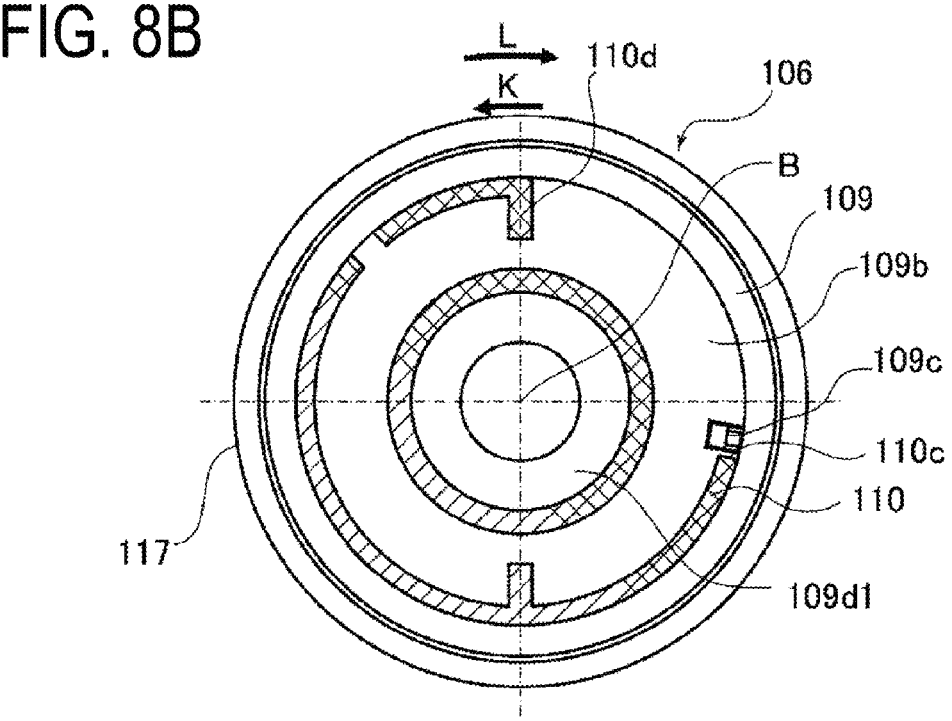
FIG. 8B is a cross-sectional view illustrating section 8B-8B of FIG. 8A.

FIG. 6A is a perspective view of an apparatus-side shutter 109 seen from upstream in the mounting direction M. FIG. 6B is a perspective view of the apparatus-side shutter 109 seen from a different point of view than in FIG. 6A. FIG. 7A is a perspective view of a cover 110 seen from downstream in the mounting direction M. FIG. 7B is a perspective view of the cover 110 seen from upstream in the mounting direction M. FIG. 8A is a cross-sectional view illustrating the mounting portion 106. FIG. 8B is a cross-sectional view illustrating section 8B-8B of FIG. 8A.

As shown in FIG. 3A to FIG. 4B, the mounting portion 106 includes a body base portion 2. The body base portion 2 includes a first frame 107, a second frame 117, and a cover 110. The cover 110 and second frame 117 are fixed to the first frame 107. As shown in FIG. 7A and FIG. 7B, the cover 110 has an engaged portion 110h that engages with an engaging portion 107b of a positioning portion 107a of the first frame 107 so as not to rotate about a rotation axis B relative to the first frame 107. A notch 110k is formed downstream of the cover 110 in the mounting direction M, i.e., on the bottom side. The notch 110k has a first restricting surface 110c and a second restricting surface 110d. The first restricting surface 110c and second restricting surface 110d are formed opposite each other in the circumferential direction around the rotation axis B.

The first frame 107, cover 110, and second frame 117 may be in one piece instead of separate parts. As shown in FIG. 3A and FIG. 3B, the second frame 117 is formed with an apparatus-side opening 117a. The apparatus-side opening 117a communicates with the container portion 36 of the developer container 32 (see FIG. 1A).

The operation lever 108 and apparatus-side shutter 109 are each mounted to the body base portion 2 such as to be rotatable about the rotation axis B. The first frame 107 is provided with the positioning portion 107a. The positioning portion 107a protrudes inwards more than the inner circumferential surface 107c around the rotation axis B of the first frame 107 in the radial direction r of a virtual circle VC around the rotation axis B.

The operation lever 108 as a part to be operated is provided with a drive-transmitting portion 108a and an operation portion 108b. The user can turn the operation lever 108 about the rotation axis B relative to the body base portion 2 by operating the operation portion 108b. As shown in FIG. 3A, the drive-transmitting portion 108a is a protrusion inwardly protruding more than the inner circumferential surface around the rotation axis B of the operation lever 108 in the radial direction r of the virtual circle VC around the rotation axis B.

The apparatus-side shutter 109 that is the shutter in the main body includes an inner circumferential surface 109h, an inlet port 109a formed in the inner circumferential surface 109h for receiving the toner from the toner pack 100, and a bottom surface 109b, as shown in FIG. 6A and FIG. 6B. The apparatus-side shutter 109 further includes a center boss 109d formed on the bottom surface 109b, a pack contact surface 109g, a restriction rib 109c, and a drive transmitted portion 109e provided on the inner circumferential surface 109h. The drive transmitted portion 109e is a protrusion inwardly protruding in the radial direction r of the virtual circle VC around the rotation axis B, as shown in FIG. 6A. An apparatus-side seal 111 is bonded around the inlet port 109a on the inner circumferential surface 109h (see FIG. 4B).

The apparatus-side shutter 109 is configured to assume a covering position as a second covering position and an open position as a second open position relative to the body base portion 2. More specifically, the apparatus-side shutter 109 rotates in the direction of arrow K from the covering position to the open position, and rotates in the direction of arrow L from the open position to the covering position, as shown in FIG. 6A and FIG. 6B. These directions of arrow K and arrow L are the same as the directions of arrow K and arrow L of a pack-side shutter 103 shown in FIG. 11A. The inlet port 109a is covered by the apparatus-side seal 111 and cover 110 when the apparatus-side shutter 109 is in the covering position, and the inlet port 109a is opened, or not covered by the cover 110, in the open position. Namely, the inlet port 109a does not communicate with the apparatus-side opening 117a of the second frame 117 when the apparatus-side shutter 109 is in the covering position, and communicates with the apparatus-side opening 117a of the second frame 117 when the apparatus-side shutter 109 is in the covering position.

The apparatus-side shutter 109 is in the covering position in FIG. 4A and FIG. 5A. At this time, the inlet port 109a of the apparatus-side shutter 109 does not communicate with the apparatus-side opening 117a of the second frame 117. The apparatus-side shutter 109 is in the open position in FIG. 4B and FIG. 5B. At this time, the inlet port 109a of the apparatus-side shutter 109 communicates with the apparatus-side opening 117a of the second frame 117. The apparatus-side shutter 109 moving to the open position allows the toner to be replenished (supplied) from the toner pack 100 to the container portion 36 of the developer container 32 through the inlet port 109a.

The operation lever 108 is not linked to the apparatus-side shutter 109 such as to transmit a drive force. Therefore, if manipulated without the toner pack 100 being attached, the operation lever 108 does not cause the apparatus-side shutter 109 to rotate.

As shown in FIG. 8A and FIG. 8B, the apparatus-side shutter 109 is configured to be rotatable about the center boss 109d, with a large-diameter portion 109d1 of the center boss 109d fitting into a cylindrical portion 110j of the cover 110. The restriction rib 109c provided on the bottom surface 109b of the apparatus-side shutter 109 is located between the first restricting surface 110c and the second restricting surface 110d of the cover 110. Therefore, the apparatus-side shutter 109 is rotatable only in the movable range of the restriction rib 109c between the first restricting surface 110c and the second restricting surface 110*d*. In other words, the rotation of the apparatus-side shutter 109 is restricted to the range between the covering position and open position by the first restricting surface 110*c* and the second restricting surface 110*d* of the cover 110. For example, when the restriction rib 109*c* is in contact with the first restricting surface 110*c* as shown in FIG. 8B, the apparatus-side shutter 109 located in the covering position cannot rotate in the direction of arrow L, i.e., in the opposite direction from the direction toward the open position.

[Toner Pack Configuration]

Figure 9A:
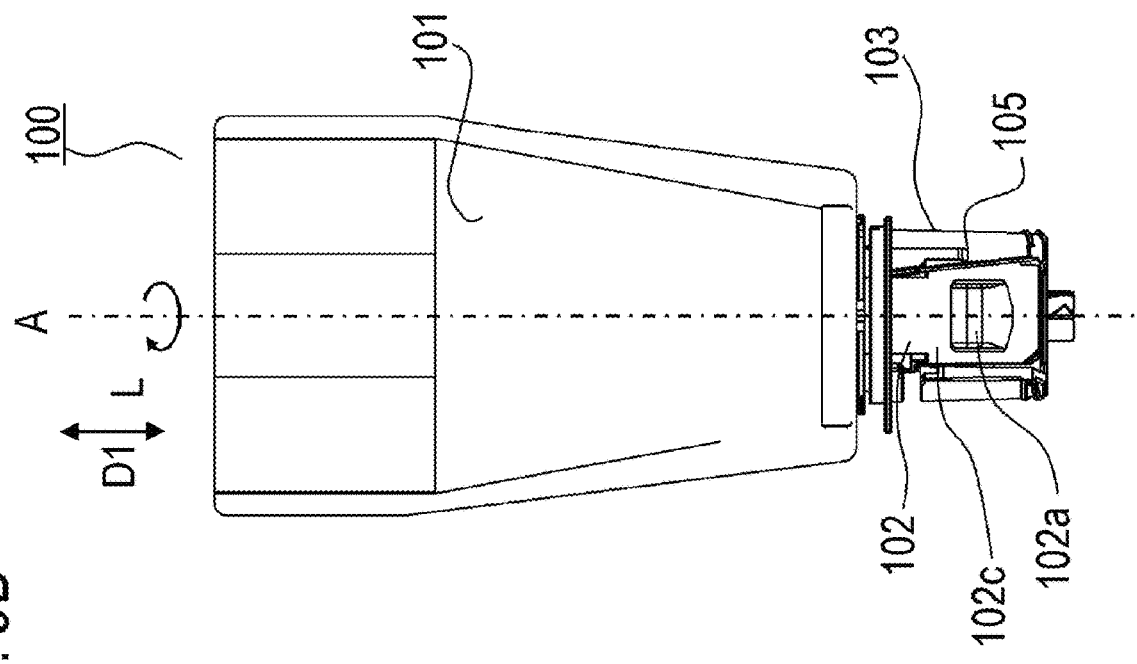
FIG. 9A is a side view of a toner pack when the pack-side shutter is in a covering position.
Figure 9B:
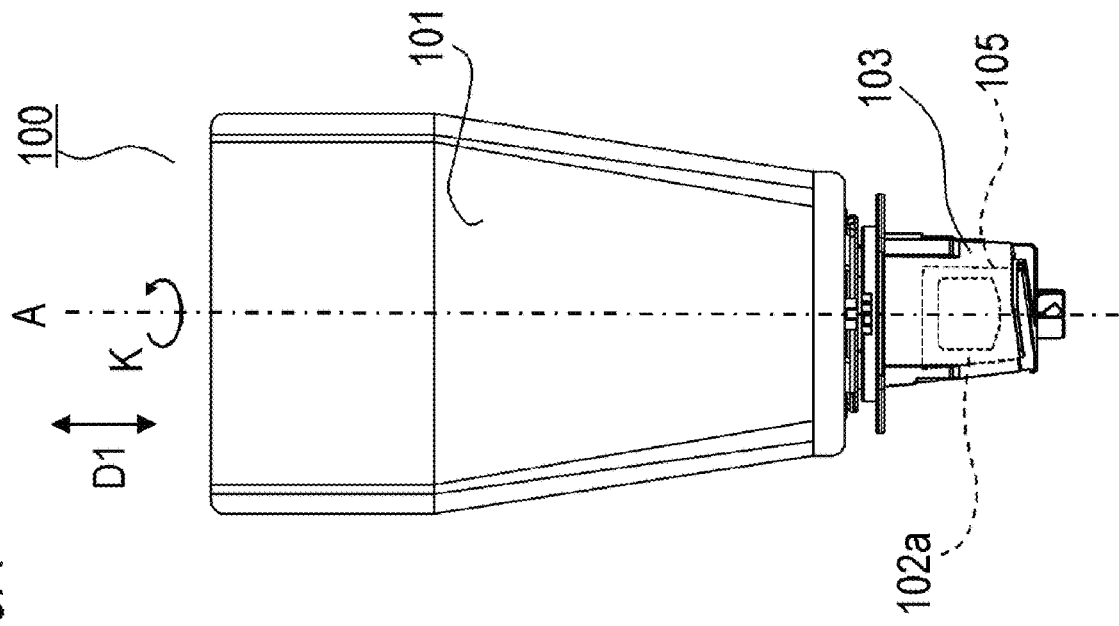
FIG. 9B is a side view of the toner pack when the pack-side shutter is in an open position.

Next, a basic configuration of the toner pack 100 is described with reference to FIG. 9A to FIG. 10. The toner pack 100 is attached to the mounting portion 106 described above. FIG. 9A is a side view of the toner pack 100 when the pack-side shutter 103 is in a covering position. FIG. 9B is a side view of the toner pack 100 when the pack-side shutter 103 is in an open position. FIG. 10 is an exploded perspective view of the toner pack 100 when the pack-side shutter 103 is in the open position.

The toner pack 100 includes a pouch 101 containing toner, a nozzle 102 joined to the pouch 101, and the pack-side shutter 103, as shown in FIG. 9A to FIG. 10. The nozzle 102 and pack-side shutter 103 are connected to the pouch 101, and form a mounted portion 700 attached to the mounting portion 106.

The pouch 101 as a container member has flexibility. The pouch is provided at one end of the toner pack 100 in the axial direction D1 that is the direction of a rotation axis A of the pack-side shutter 103. The rotation axis A coincides with the rotation axis B of the apparatus-side shutter 109 when the toner pack 100 is attached to the mounting portion 106. Hereinafter, the axial direction of the rotation axis A and rotation axis B will both be referred to as axial direction D1. The nozzle 102 and pack-side shutter 103 are provided at the other end of the toner pack 100 in the axial direction D1. The pouch 101 is formed by a lamination process from a flexible polypropylene sheet into a bag shape with one end open, for example. The pouch 101 may be a resin bottle, or paper or plastic container.

The pouch 101 as a container member includes a container portion 101*a* containing the toner, and an opening portion 101*b* that opens the container portion 101*a*. The nozzle 102 is joined to the opening portion 101*b* of the pouch 101 such that the container portion 101*a* of the pouch 101 communicates with the outside of the toner pack 100 only through a toner discharge path (see FIG. 23B) formed by the nozzle 102. The nozzle 102 is formed by a nozzle body 121, which is a discharge path forming member, forming a discharge path for the toner to be discharged from the container portion 101*a* of the pouch 101, and a connector member (coupling member) 122 for attaching the nozzle body 121 to the pouch 101. The connector member 122 is joined to the opening portion 101*b* of the pouch 101. The joining method is not limited to a particular method. Examples of joining methods include the use of various adhesives such as a hot-melt adhesive, or joining by heat-bonding the pouch 101 to the outer periphery of the connector member 122. The nozzle 102 is joined to the pouch 101 by the nozzle body 121 engaging with the connector member 122. The engagement structure between the nozzle body 121 and the connector member 122 will be described in detail later.

The nozzle 102 has an outer surface extending along the rotation axis A, and a side face 102*c* as a first outer surface. In the side face 102*c* are provided a discharge port 102*a* configured to communicate with the inside of the pouch 101, and a recessed portion 102*e*. The recessed portion 102*e* is provided at a different position than that of the discharge port 102*a* in the rotating direction of the pack-side shutter 103. The pouch is configured such that the toner contained in the pouch 101 is discharged to the outside of the toner pack 100 through the discharge port 102*a* when the volume of the pouch 101 is reduced by the user squeezing the pouch 101. Namely, the nozzle 102 has a passage 102*g* inside (see FIG. 23B) as the discharge path for the toner (content) to pass through toward the discharge port 102*a*.

The pack-side shutter 103 as a shutter is disposed on the outer side of the side face 102*c* of the nozzle 102. The pack-side shutter 103 is rotatable about the rotation axis A extending along the axial direction D1, and has an opening 103*a*. Specifically, an inner circumferential surface 103*m* of the pack-side shutter 103 is slidably supported on an annular rib 102*m* of the nozzle 102. The pack-side shutter 103 is provided on the outer side of the side face 102*c* in the radial direction r of the virtual circle VC around the rotation axis A. The side face 102*c* has an arcuate surface that is a curved surface outwardly convex in the radial direction r. The pack-side shutter 103 has an inner surface, i.e., opposite the side face 102*c*, which is a curved surface conforming to the side face 102*c* of the nozzle 102, where a substantially rectangular pack-side seal 105 is attached.

The pack-side shutter 103 is configured to be rotatable about the rotation axis A between a covering position where the pack-side seal 105 covers the discharge port 102*a* of the nozzle 102 (position shown in FIG. 9A) and an open position where the seal opens the discharge port 102*a* (position shown in FIG. 9B). When the pack-side shutter 103 is in the open position, the opening 103*a* in the pack-side shutter 103 exposes the discharge port 102*a* of the nozzle 102.

When the pack-side shutter 103 located in the covering position as a first covering position shown in FIG. 9A is rotated about the rotation axis A in the direction of arrow K, the pack-side shutter 103 reaches the open position as a first open position shown in FIG. 9B. Conversely, when the pack-side shutter 103 located in the open position is rotated in the direction of arrow L, the pack-side shutter 103 reaches the covering position. Namely, the direction of arrow K as a first rotating direction is the direction from the covering position to the open position around the rotation axis A. The direction of arrow L as a second rotating direction is the direction from the open position to the covering position around the rotation axis A. The pack-side shutter 103 makes frictional contact with the side face 102*c* of the nozzle 102 via the pack-side seal 105 during the rotating motion of the pack-side shutter 103.

Figure 11A:
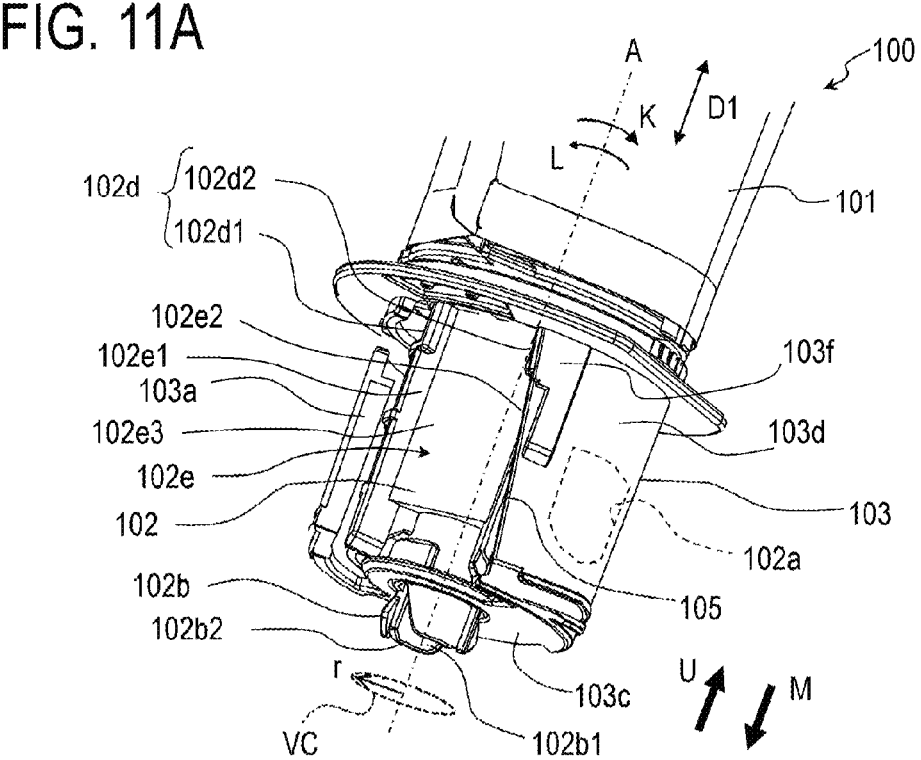
FIG. 11A is an enlarged perspective view illustrating the vicinity of a nozzle when the pack-side shutter is in the covering position.
Figure 11B:
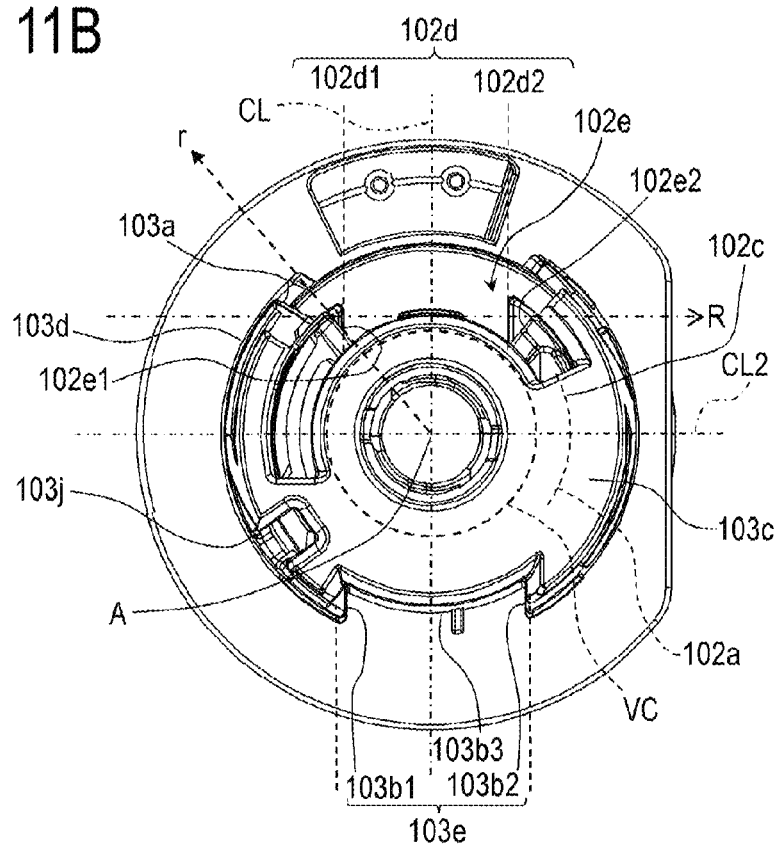
FIG. 11B is a view of the toner pack seen in a removal direction.
Figure 12A:
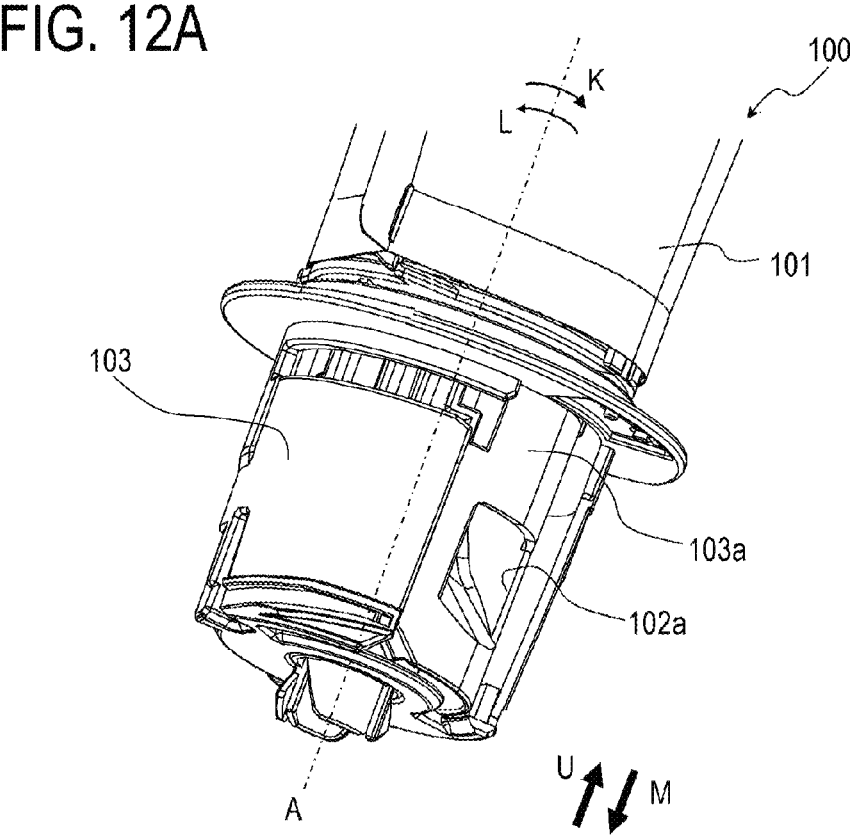
FIG. 12A is an enlarged perspective view illustrating the vicinity of the nozzle when the pack-side shutter is in the open position.
Figure 12B:
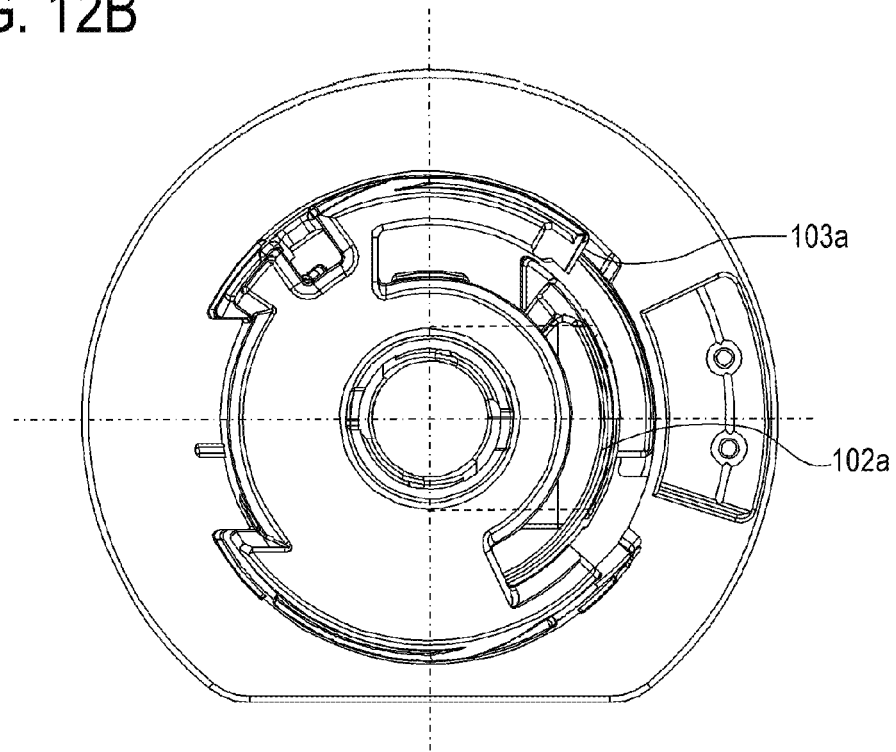
FIG. 12B is a view of the toner pack seen in the removal direction U.
Figure 13:
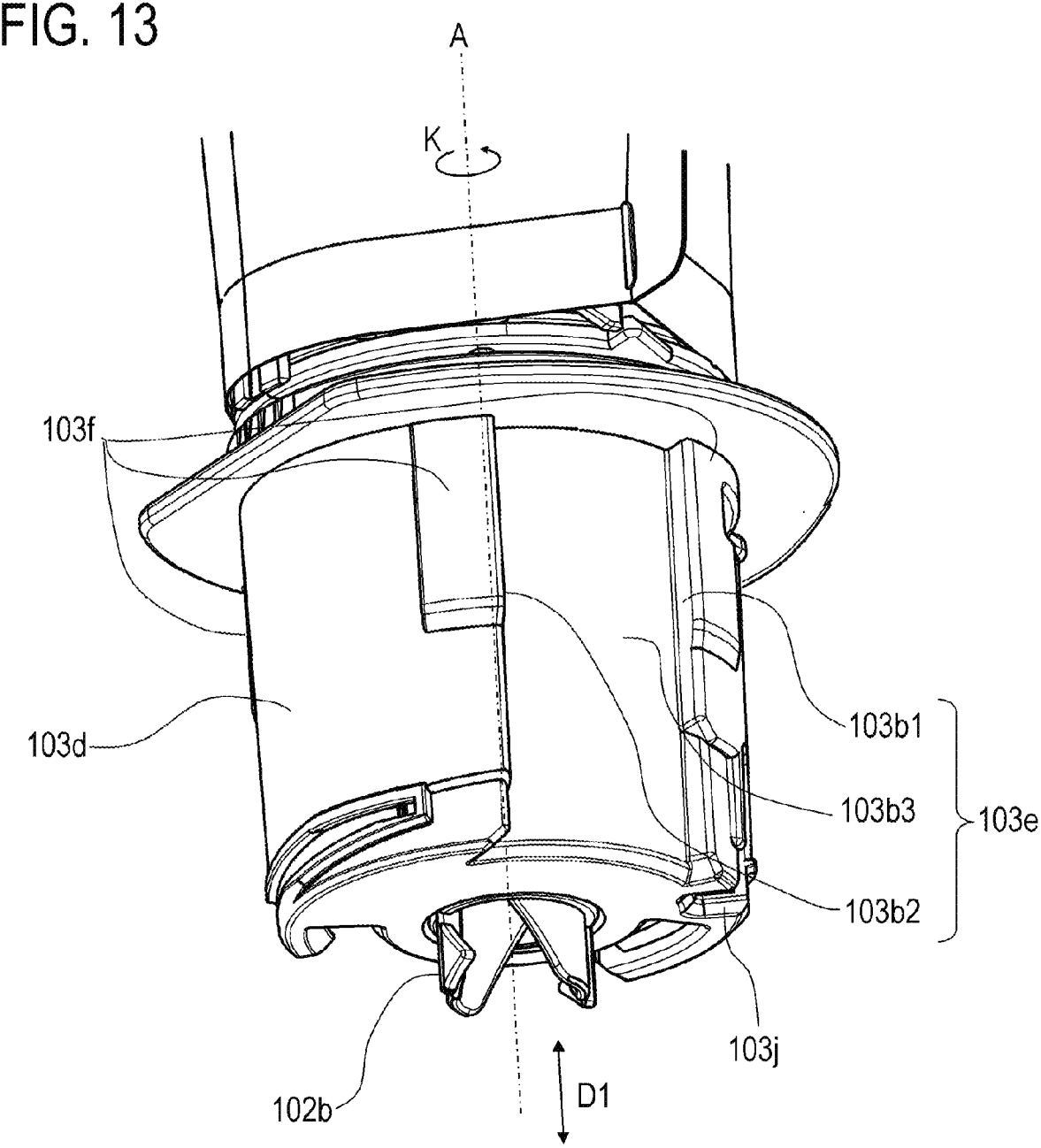
FIG. 13 is an enlarged perspective view illustrating the vicinity of the nozzle.
Figure 14:
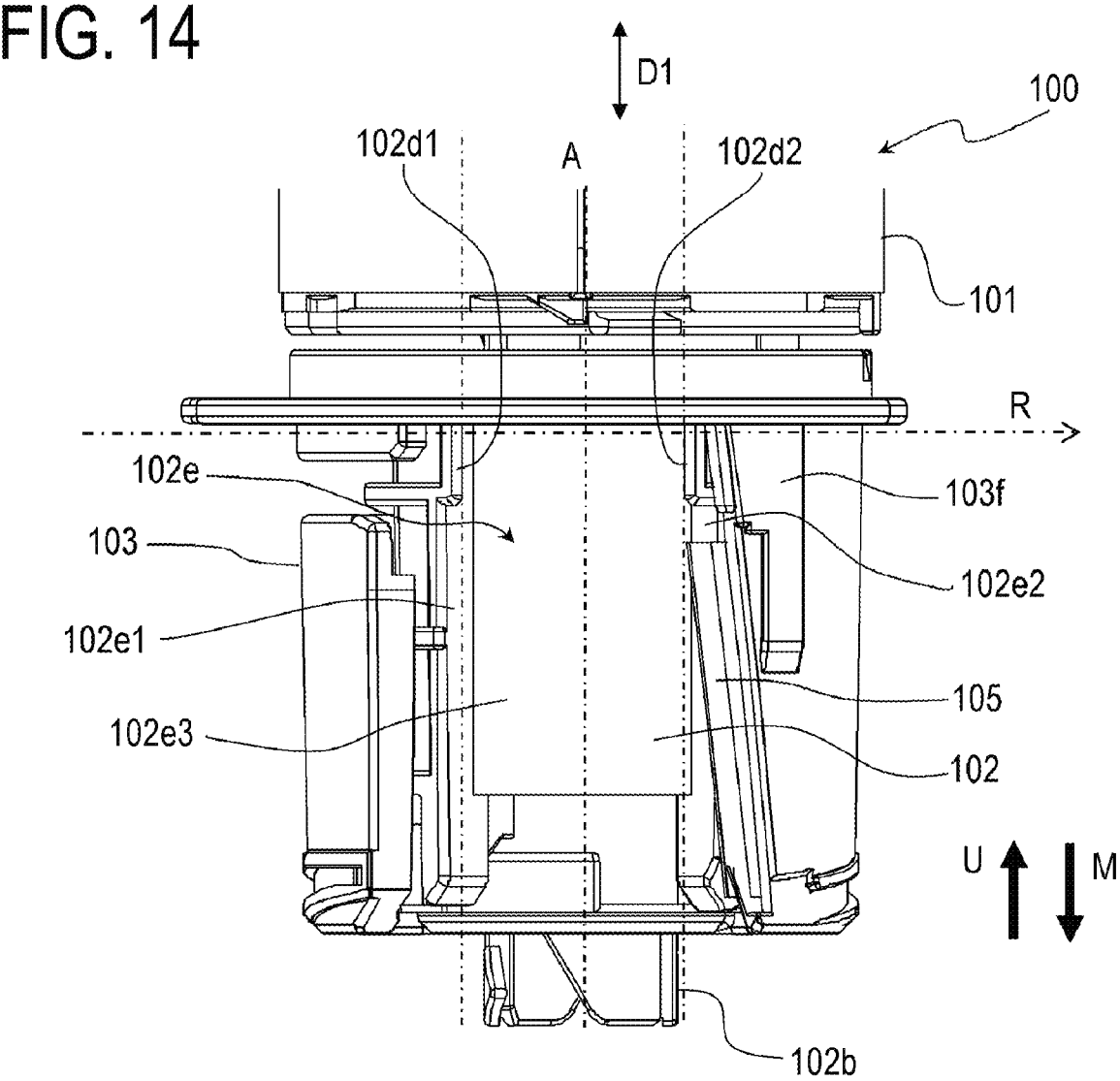
FIG. 14 is a side view illustrating the nozzle and the pack-side shutter.

Next, the detailed configurations of the nozzle 102 and the pack-side shutter 103 are described with reference to FIG. 11A to FIG. 14. FIG. 11A is an enlarged perspective view illustrating the vicinity of the nozzle 102 when the pack-side shutter 103 is in the covering position. FIG. 11B is a view when the toner pack 100 is seen in a removal direction U in FIG. 11A. FIG. 12A is an enlarged perspective view illustrating the vicinity of the nozzle 102 when the pack-side shutter 103 is in the open position. FIG. 12B is a view when the toner pack 100 is seen in the removal direction U in FIG. 12A. FIG. 13 is an enlarged perspective view illustrating the vicinity of the nozzle 102. FIG. 14 is a side view illustrating the nozzle 102 and the pack-side shutter 103. The removal direction U is the opposite direction from the mounting direction M; it is the direction in which the toner pack 100 moves when removed from the mounting portion 106.

As shown in FIG. 11A and FIG. 11B, the nozzle 102 has a positioned portion 102*d* with surfaces 102*d*1 and 102*d*2 spaced apart and aligned in the direction of arrow R, and extending in a direction intersecting the direction of arrow R. As shown in FIG. 11B, the surfaces 102*d*1 and 102*d*2 in this embodiment extend in a direction perpendicular to the direction of arrow R, and are parallel to each other. Namely, the direction of arrow R in this embodiment is the direction of normal line of the surfaces 102*d*1 and 102*d*2. The positioned portion 102*d* engages with the positioning portion 107*a* of the first frame 107 (FIG. 4A) when the toner pack 100 is attached to the mounting portion 106. This determines the position of the nozzle 102 relative to the first frame 107 (body base portion 2) in the direction of arrow R (in the rotating direction around the rotation axis A). In FIG. 11B, a line CL1 passing through the center between the surface 102*d*1 and surface 102*d*2 aligned in the direction of arrow R and extending perpendicularly to the direction of arrow R is shifted by about 90° from a line CL2 passing through the rotation axis A and the center of the discharge port 102*a*.

As shown in FIG. 11A and FIG. 14, along the direction of the rotation axis A, a surface 102*e*1 and a surface 102*e*2 are provided downstream in the mounting direction M of the surface 102*d*1 and surface 102*d*2, respectively. The surface 102*e*1 and surface 102*e*2 extend in the radial direction r of the virtual circle VC around the rotation axis A, as shown in FIG. 11B. Note, the extending direction of the surface 102*e*1 and surface 102*e*2 is not limited to this example, and may be set in any direction as long as they do not interfere with the positioning portion 107*a* of the first frame 107.

As shown in FIG. 14, a side face 102*e*3 is provided between the surface 102*d*1 and the surface 102*d*2, and between the surface 102*e*1 and the surface 102*e*2 in the direction of arrow R. The side face 102*e*3 is set back inward from the side face 102*c* in the radial direction r. The surfaces 102*d*1, 102*d*2, 102*e*1, and 102*e*2, and side face 102*e*3 together form the recessed portion 102*e*.

The surface 102*d*1 and surface 102*d*2 need not necessarily be parallel as in this embodiment. For example, the surface 102*d*1 and surface 102*d*2 may be surfaces extending in the radial direction r of the virtual circle VC around the rotation axis A. In this case, the direction of arrow R will be the tangential direction of the virtual circle VC, and the line CL1 perpendicular to the direction of arrow R can be set at any angle relative to the line CL2.

As shown in FIG. 11A and FIG. 11B, when viewed in a direction perpendicular to the axial direction D1 of the rotation axis A, the opening 103*a* is provided in the side face 103*d* of the pack-side shutter 103. As shown in FIG. 11A, when the pack-side shutter 103 is in the covering position, the recessed portion 102*e* of the nozzle 102 is at least partly exposed from the opening 103*a*. This is to allow the surface 102*d*1 and surface 102*d*2 of the recessed portion 102*e*, i.e., the positioned portion 102*d*, to engage with the positioning portion 107*a*, when the toner pack 100 is attached to the mounting portion 106, with the pack-side shutter 103 located in the covering position.

As shown in FIG. 11B, the pack-side shutter 103 is further provided with a drive transmitted portion 103*e* on the opposite side of the rotation axis A from the opening 103*a*. The drive transmitted portion 103*e* is on the opposite side of the rotation axis A from the recessed portion 102*e* of the nozzle 102 when the pack-side shutter 103 is located in the covering position. The drive transmitted portion 103*e* includes surfaces 103*b*1 and 103*b*2, and a side face 103*b*3, and can engage with the drive-transmitting portion 108*a* of the operation lever 108 to be described later. The surface 103*b*1 and surface 103*b*2 both extend in a direction perpendicular to the direction of arrow R. FIG. 13 is an enlarged perspective view of the vicinity of the pack-side shutter 103 when viewed from the side with the drive transmitted portion 103*e*. Between the surfaces 103*b*1 and 103*b*2 is provided the side face 103*b*3 that is set back inward from the side face 103*d* in the radial direction r.

A protruded portion 102*b* of the nozzle 102 is described with reference to FIG. 11A to FIG. 14. The toner pack 100 is oriented such that the second end of the toner pack 100 (nozzle 102 side) is positioned below the first end (pouch 101 side) as shown in FIG. 9A and FIG. 9(*b*). Put differently, the toner pack 100 is oriented such that the nozzle 102 is positioned at least partly below the pouch 101, with the rotation axis A being parallel to the vertical direction. The toner pack 100 is oriented this way when attached to the mounting portion 106 of the image forming apparatus 1. The mounting direction M at this time is downward, and the removal direction U upward, in FIG. 11A and FIG. 12A.

The pack-side shutter 103 has an end face 103*c* as a shutter end face, which is a lower end face in the vertical direction VD, forming the bottom surface of the pack-side shutter 103. The nozzle 102 has the protruded portion 102*b* as a first protruding portion, downstream of the end face 103*c* of the pack-side shutter 103 in the mounting direction M, i.e., protruding downward. The protruded portion 102*b* is cylindrical (a portion having a cylindrical shape) having the rotation axis A in the center, as shown in FIG. 11A. The protruded portion 102*b* has a protruded end face 102*b*2, which is a lower end face. The protruded end face 102*b*2 is formed with a hole having an inner circumferential surface 102*b*1 around the rotation axis A. The protruded portion 102*b* protrudes downward more than a lower end face 102*j* of the nozzle 102 as shown in FIG. 10. While the end face 103*c* of the pack-side shutter 103 and the end face 102*j* of the nozzle 102 are perpendicular to the rotation axis A in this embodiment, the direction of these end faces is not limited to this. These surfaces may extend in any direction intersecting the rotation axis A when viewed from a direction perpendicular to the rotation axis A. The protruded portion 102*b* need not necessarily be provided to the nozzle 102.

Figure 15A:
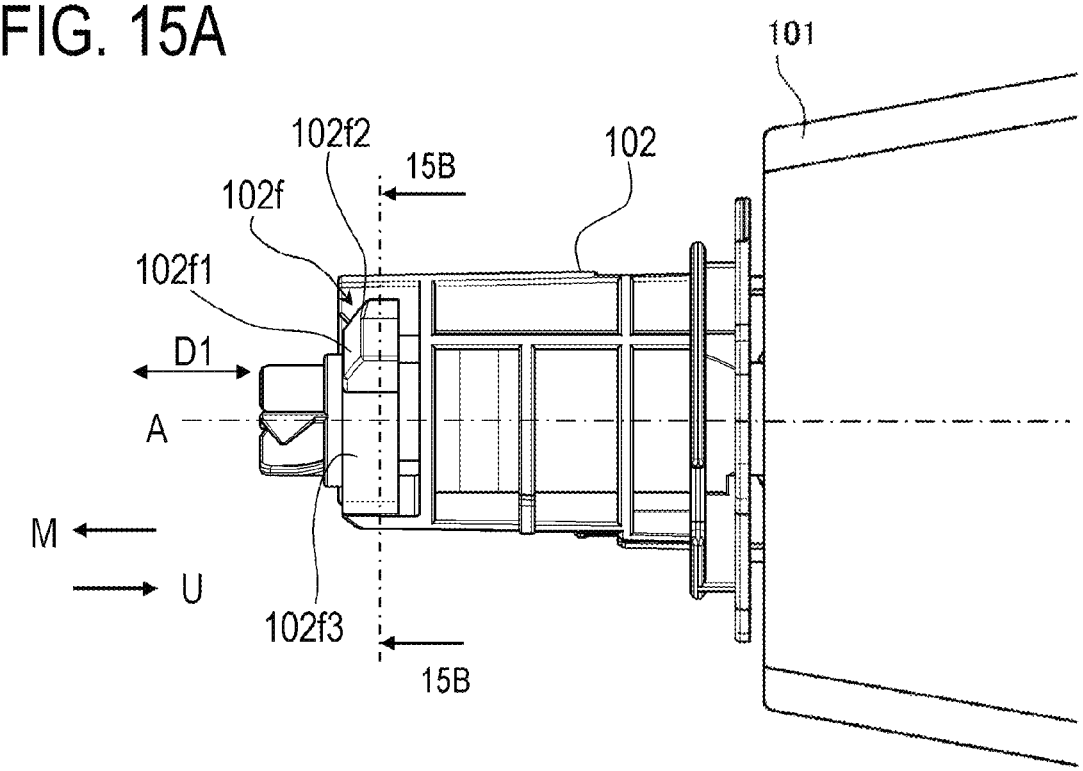
FIG. 15A is a front view illustrating a pawl.

Referring now to FIG. 15A, the nozzle 102 of the toner pack 100 is provided with a pawl 102*f* as a lock mechanism for preventing rotation of the pack-side shutter 103 relative to the nozzle 102 during transportation or when the user handles the toner pack 100 alone. The pack-side shutter 103 is retained in the covering position by the pawl 102*f*, so that leakage of the toner, or the content of the toner pack 100, can be prevented.

Figure 15B:
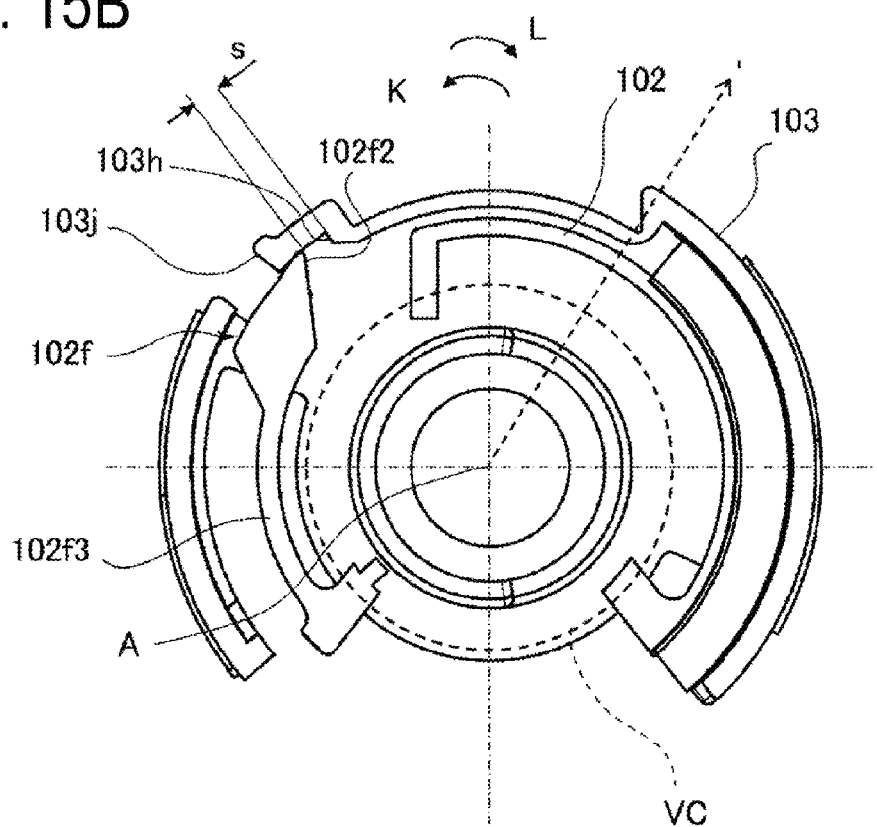
FIG. 15B is a cross-sectional view illustrating section 15B-15B of FIG. 15A.
Figure 16A:
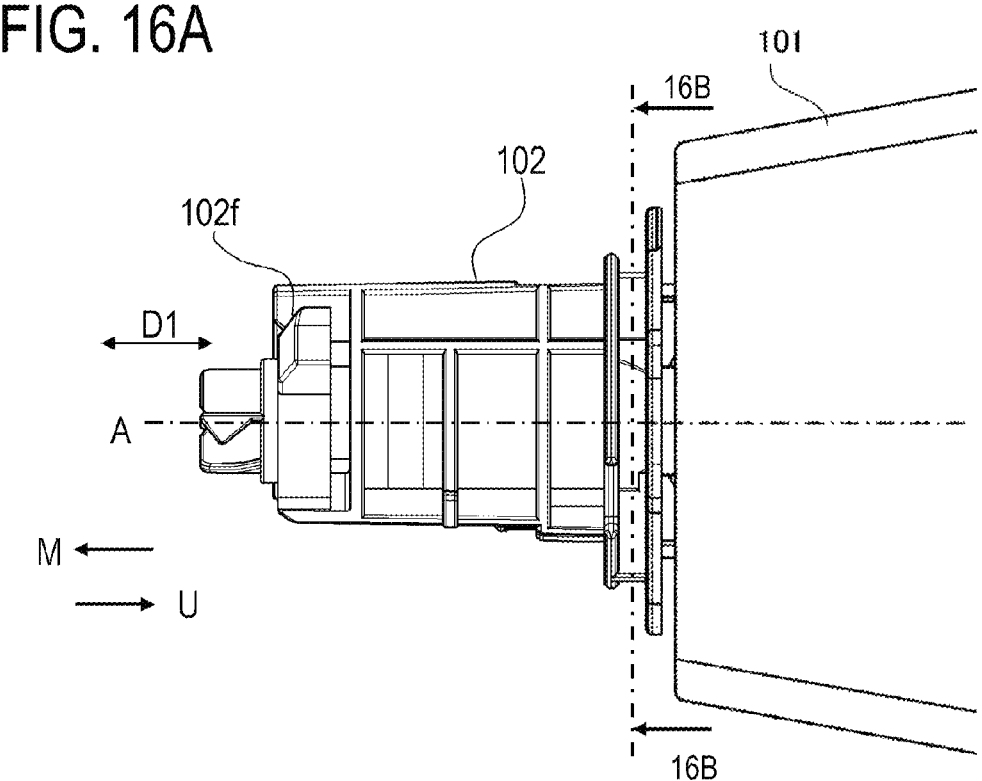
FIG. 16A is a front view illustrating the pawl.
Figure 16B:
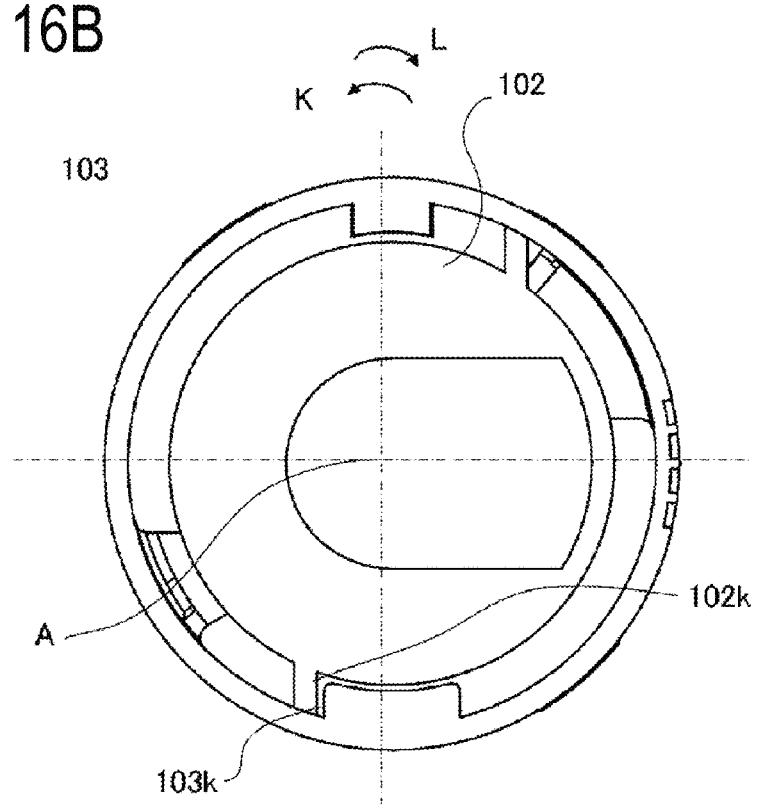
FIG. 16B is a cross-sectional view illustrating section 16B-16B of FIG. 16A.

FIG. 15A is a front view illustrating the pawl 102*f*. FIG. 15B is a cross-sectional view illustrating section 15B-15B of FIG. 15A. FIG. 16A is a front view illustrating the pawl 102*f*. FIG. 16B is a cross-sectional view illustrating section 16B-16B of FIG. 16A.

The pawl 102*f* as a second restricting portion includes an arm 102*f*3, an unlocking inclined surface 102*f*1, and an abutting portion 102*f*2, as shown in FIG. 15A and FIG. 15B. The pawl 102*f* is movable in the radial direction r of the virtual circle VC around the rotation axis A by elastic deformation of the arm 102*f*3. Specifically, the pawl 102*f* can move between a restricting position shown in FIG. 15B, and a non-restricting position shown in FIG. 21B that is more inside than the restricting position in the radial direction r.

When the pawl 102*f* is located in the restricting position as shown in FIG. 15B, the pack-side shutter 103 is located in the covering position, and the abutting portion 102f2 is positioned opposite the restricting portion 103h in the circumferential direction around the rotation axis A. At this time, there is a gap s between the abutting portion 102f2 and the restricting portion 103h. The rotation in the direction of arrow K of the pack-side shutter 103 is restricted by the restricting portion 103h abutting the abutting portion 102f2. The gap s may be set as suited. The pack-side shutter 103 is deemed to be in the covering position when it is in the rotatable range in which it is allowed to rotate by the gap s. Namely, the pawl 102f located in the restricting position restricts the rotation of the pack-side shutter 103 from the covering position in the direction of arrow K.

When the pawl 102f is located in the non-restricting position, the abutting portion 102f2 is located more inside than the restricting portion 103h of the pack-side shutter 103 in the radial direction r of the virtual circle VC around the rotation axis A. Therefore, the pack-side shutter 103 can rotate about the rotation axis A without interfering with the abutting portion 102f2.

Figure 21A:
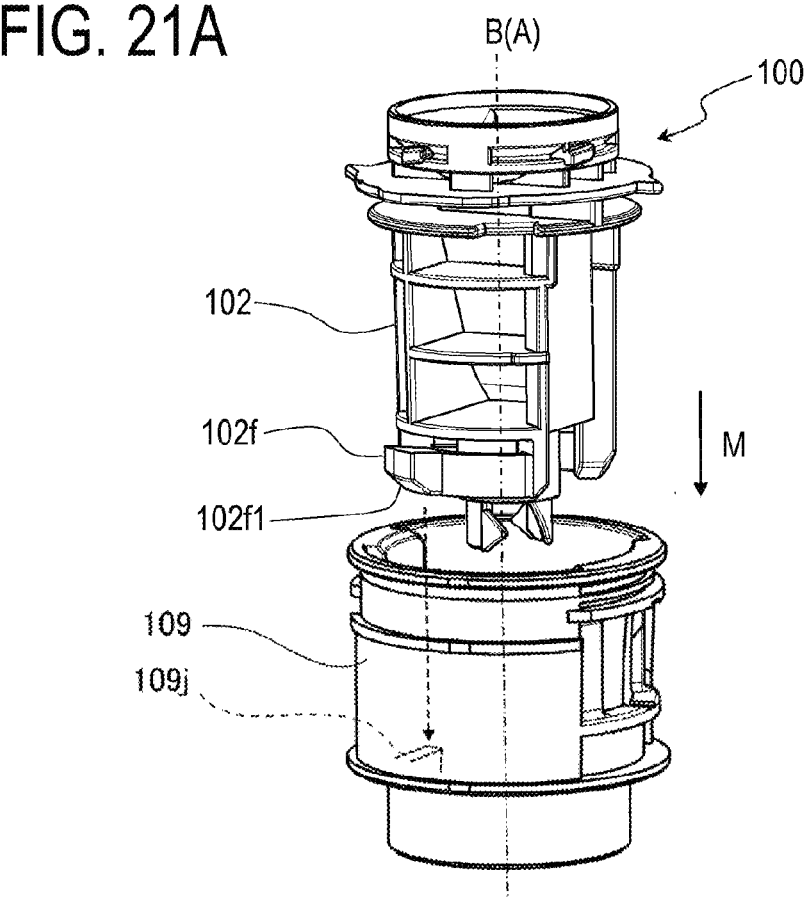
FIG. 21A is a perspective view illustrating the toner pack in the process of being attached to the apparatus-side shutter.
Figure 21B:
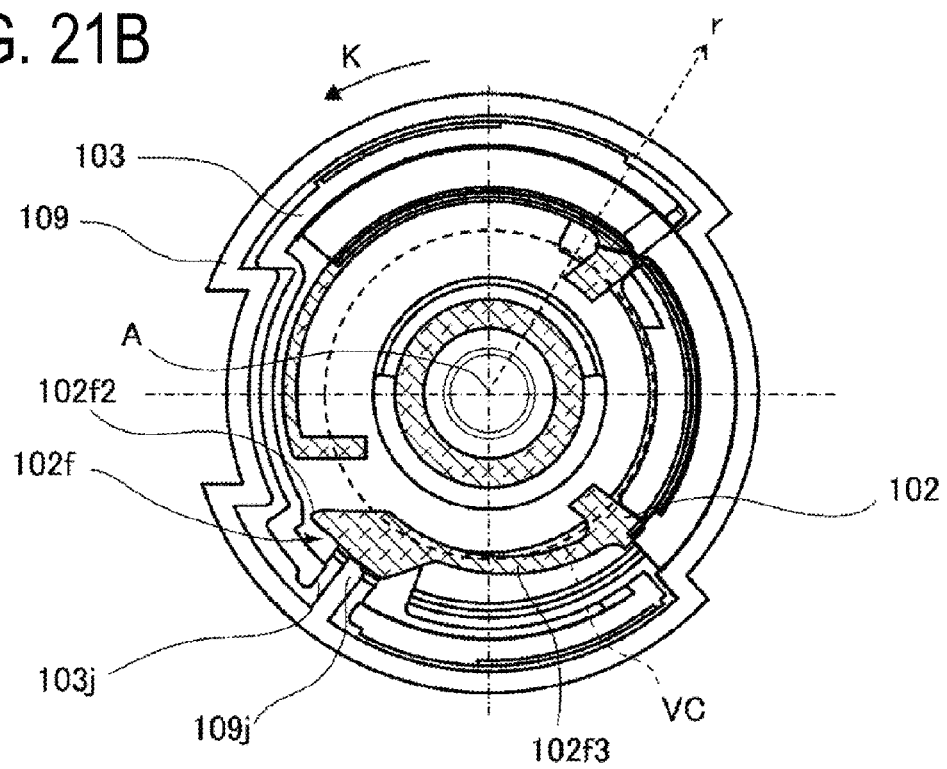
FIG. 21B is a cross-sectional view of section 16B-16B of FIG. 16A illustrating the toner pack when the attachment to the mounting portion is completed.

As shown in FIG. 6A and FIG. 21B, the apparatus-side shutter 109 is provided with an unlocking rib 109j extending in the axial direction D1. The unlocking rib 109j can make contact with the unlocking inclined surface 102f1 of the pawl 102f when the toner pack 100 is attached to the mounting portion 106. As shown in FIG. 11B, FIG. 15B, FIG. 17B, and FIG. 21B, the pack-side shutter 103 is provided with an opening 103j, which extends from the end face (bottom surface) 103c to the side face 103d of the pack-side shutter 103. The unlocking rib 109j provided to the apparatus-side shutter 109 extends through the opening 103j and can make contact with the unlocking inclined surface 102f1 of the pawl 102f that is disposed inside the pack-side shutter 103.

The unlocking inclined surface 102f1 is inclined relative to the mounting direction M (axial direction D1) such as to extend inward in the radial direction r toward downstream in the mounting direction M. When the toner pack 100 is attached to the mounting portion 106, the unlocking inclined surface 102f1 directs the force the pawl 102f receives from the unlocking rib 109j inward in the radial direction r. With the unlocking inclined surface 102f1 being pressed by the unlocking rib 109j, the pawl 102f moves inward in the radial direction r from the restricting position toward the non-restricting position. In other words, the pawl 102f moves from the restricting position toward the non-restricting position by being pressed by the mounting portion 106 when the toner pack 100 is attached to the mounting portion 106.

The abutting portion 102f2 of the pawl 102f described above restricts the rotation of the pack-side shutter 103 in the direction of arrow K by abutting on the restricting portion 103h of the pack-side shutter 103. Next, the configuration that restricts the rotation of the pack-side shutter 103 in the direction of arrow L, i.e., opposite from the direction of arrow K, is described.

As shown in FIG. 16B, the pack-side shutter 103 has a rotation restricting rib 103k, while the nozzle 102 has a rotation restricting surface 102k that faces the rotation restricting rib 103k in the circumferential direction around the rotation axis A. When the pack-side shutter 103 is located in the covering position, the rotation restricting rib 103k is opposite the rotation restricting surface 102k with a slight gap therebetween. An attempt to rotate the pack-side shutter 103 located in the covering position in the direction of arrow L results in the rotation restricting rib 103k abutting the rotation restricting surface 102k, thereby stopping the rotation of the pack-side shutter 103 in the direction of arrow L.

As shown in FIG. 16A and FIG. 16B, the pawl 102f is disposed downstream of the rotation restricting surface 102k and rotation restricting rib 103k in the mounting direction M. This is because of the pawl 102f provided at a position where it can readily be pressed by the unlocking rib 109j of the apparatus-side shutter 109 when the toner pack 100 is attached to the mounting portion 106. This allows the opening 103j of the pack-side shutter 103 to be reduced in size, which ensures rigidity of the pack-side shutter 103, as well as deters user's access to the pawl 102f. The arrangement of the pawl 102f, rotation restricting surface 102k and rotation restricting rib 103k is not limited to this example and may be changed as suited.

As described above, when the toner pack 100 is not attached to the mounting portion 106, the pack-side shutter 103 is restricted from rotating in the direction of arrow K and in the direction of arrow L, and readily retained in the covering position. After the toner pack 100 is attached to the mounting portion 106, with the pawl 102f in the non-restricting position, when the pack-side shutter 103 is rotated in the direction of arrow K, the pack-side shutter 103 exposes the discharge port 102a of the nozzle 102 as shown in FIG. 12A.

As shown in FIG. 11A and FIG. 13, the pack-side shutter 103 is provided with three radial positioning portions 103f. These radial positioning portions 103f protrude outward in the radial direction r more than the side face 103d. The radial positioning portions 103f are each disposed on the upstream side of the pack-side shutter 103 in the mounting direction M.

[Attachment of Toner Pack to Mounting Portion]

Figure 17A:
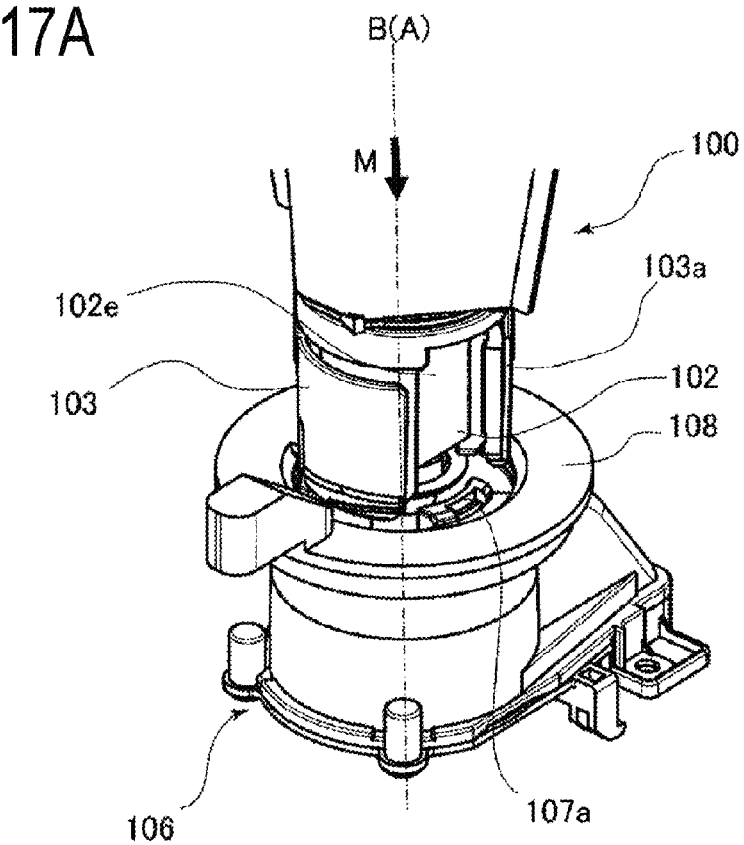
FIG. 17A is a perspective view illustrating the toner pack at one point during the process of being attached to the mounting portion.
Figure 17B:
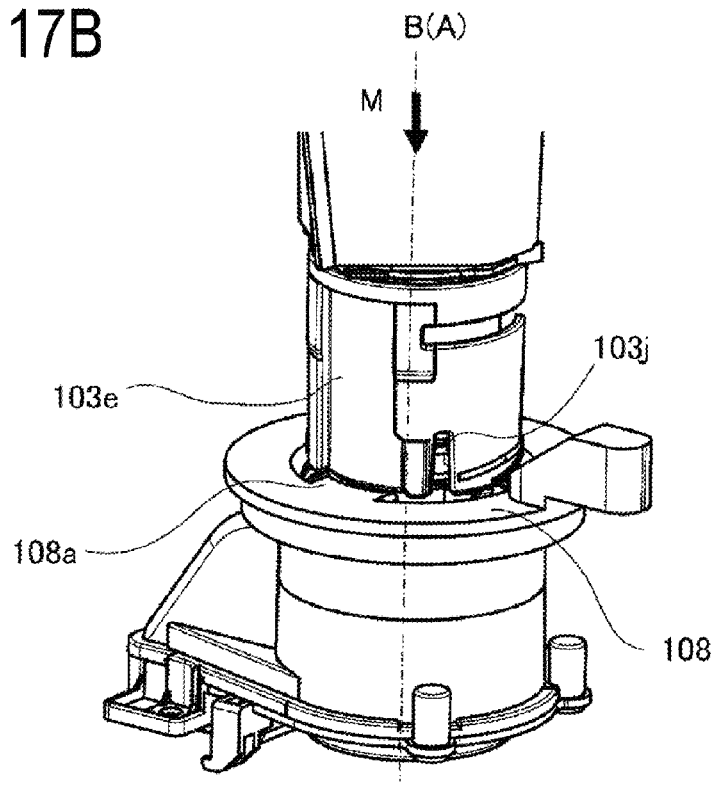
FIG. 17B is a perspective view from a different angle of the toner pack at one point during the process of being attached to the mounting portion.
Figure 18A:
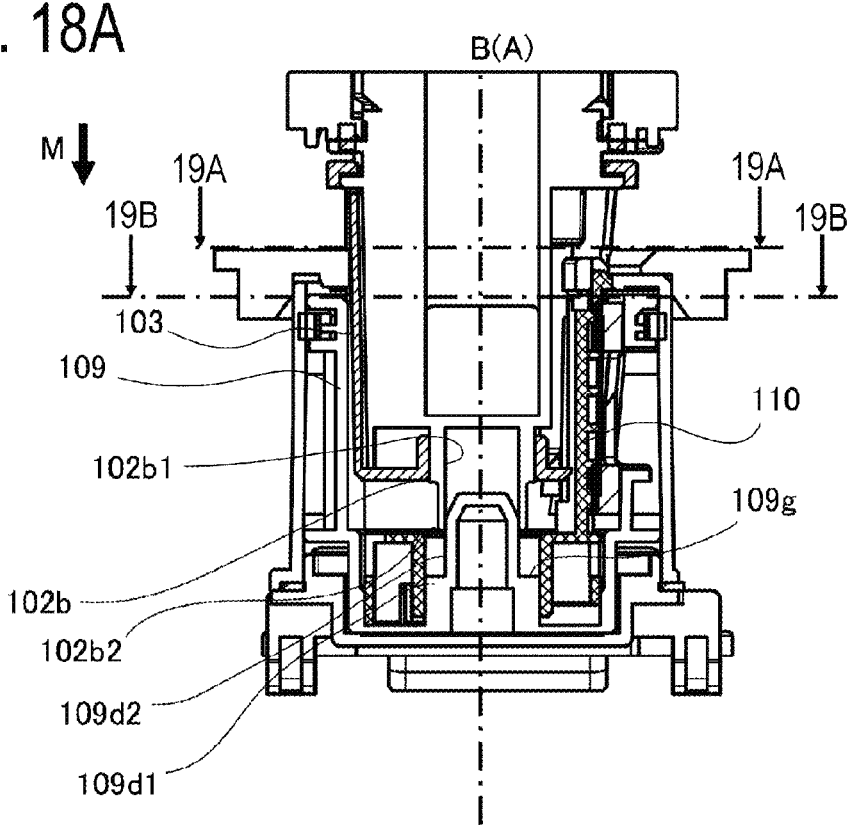
FIG. 18A is a cross-sectional view illustrating the toner pack in the process of being attached to the mounting portion.
Figure 18B:
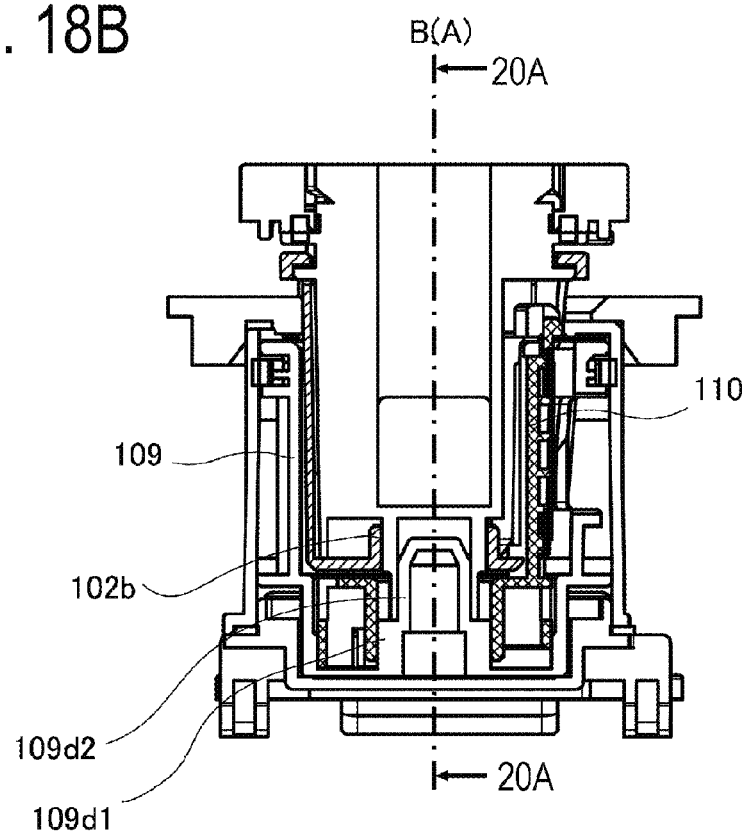
FIG. 18B is a cross-sectional view illustrating the toner pack when the attachment to the mounting portion is completed.

Next, the conditions when the toner pack 100 is attached to the mounting portion 106 are described with reference to FIG. 17A to FIG. 21B. FIG. 17A and FIG. 17B are perspective views from different angles illustrating a condition at one point during the process of attaching the toner pack 100 to the mounting portion 106. FIG. 18A is a cross-sectional view illustrating a condition in the process of attaching the toner pack 100 to the mounting portion 106. FIG. 18B is a cross-sectional view illustrating a condition when the attachment of the toner pack 100 to the mounting portion 106 is completed.

Figure 19A:
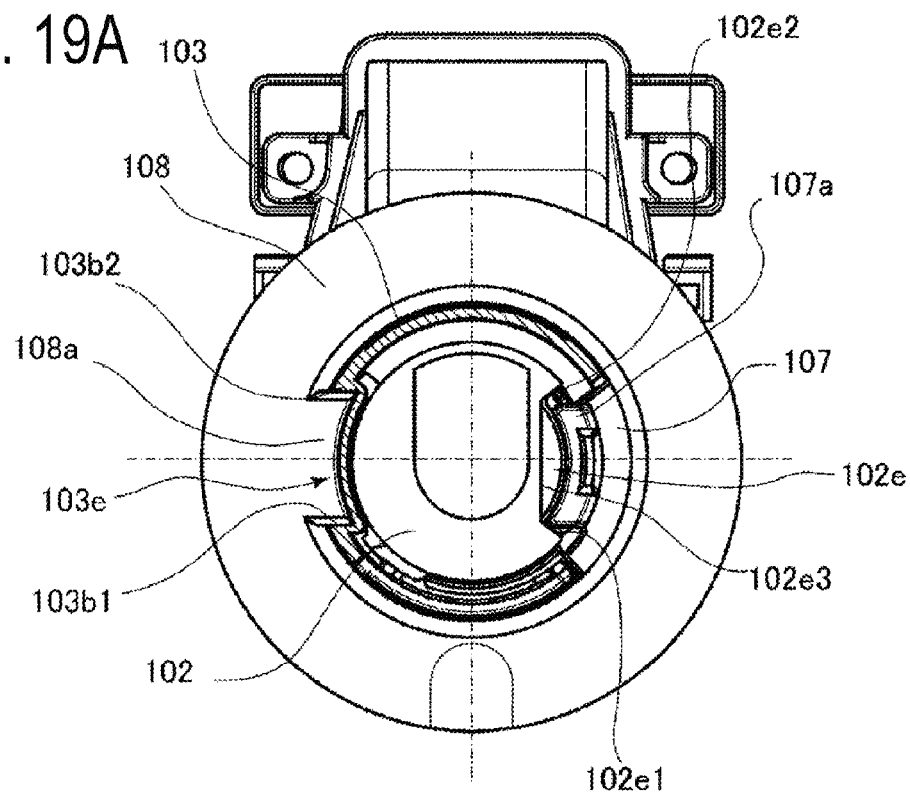
FIG. 19A is a cross-sectional view illustrating section 19A-19A of FIG. 18A.
Figure 19B:
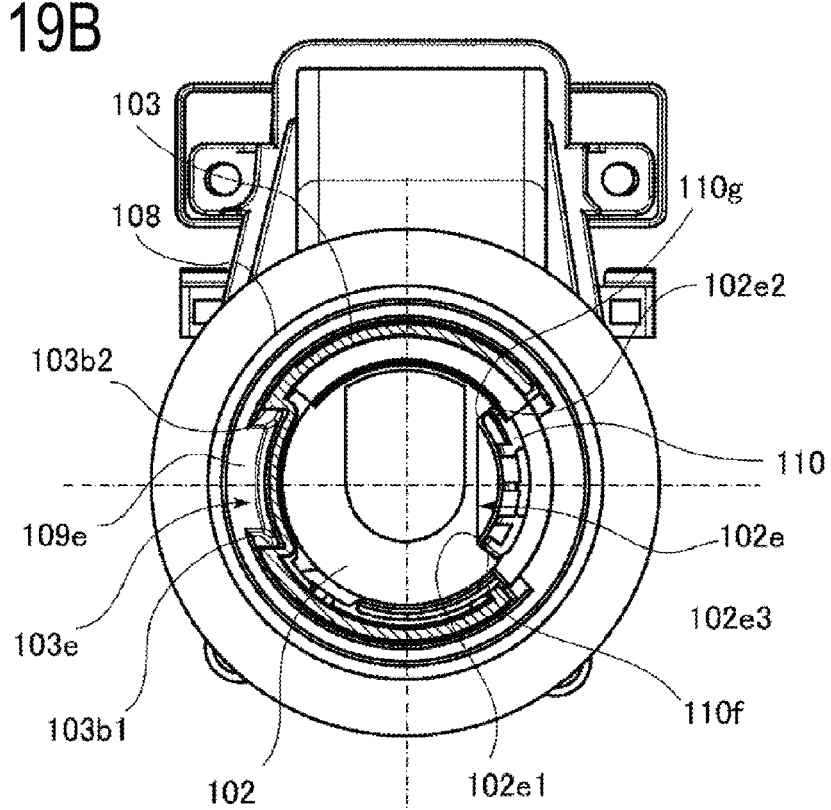
FIG. 19B is a cross-sectional view illustrating section 19B-19B of FIG. 18A.
Figure 20A:
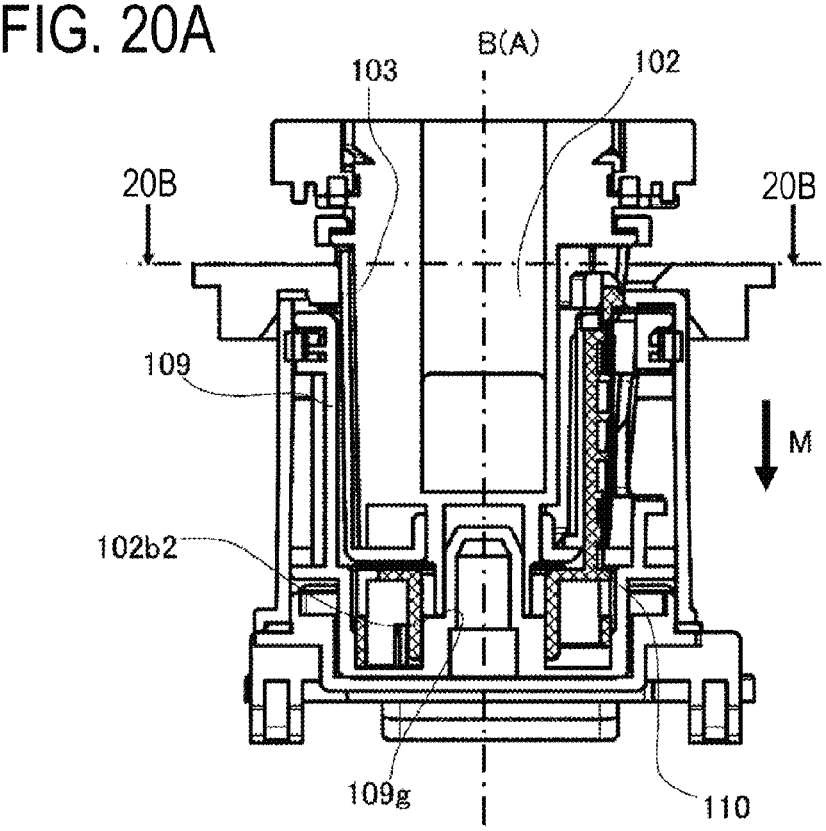
FIG. 20A is a cross-sectional view illustrating section 20A-20A of FIG. 18B.
Figure 20B:
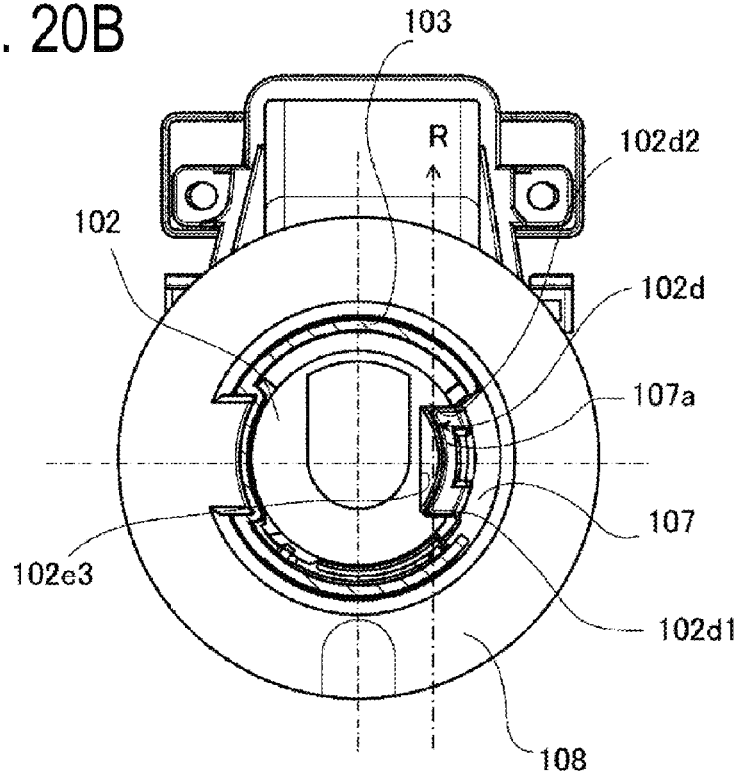
FIG. 20B is a cross-sectional view illustrating section 20B-20B of FIG. 20A.

FIG. 19A is a cross-sectional view illustrating section 19A-19A of FIG. 18A. FIG. 19B is a cross-sectional view illustrating section 19B-19B of FIG. 18A. FIG. 20A is a cross-sectional view illustrating section 20A-20A of FIG. 18B. FIG. 20B is a cross-sectional view illustrating section 20B-20B of FIG. 20A. FIG. 21A is a perspective view illustrating a condition in the process of attaching the toner pack 100 to the apparatus-side shutter 109. FIG. 21A shows only the nozzle 102; the pouch 101 and the pack-side shutter 103 of the toner pack 100 are omitted. FIG. 21B is a cross-sectional view of section 16B-16B of FIG. 16A illustrating a condition when the attachment of the toner pack 100 to the mounting portion 106 is completed. For better visibility, the cut sections of the pack-side shutter 103 and cover 110 are shown with hatching in FIG. 18A to FIG. 20B, and the cut sections of the nozzle 102 are shown with hatching in FIG. 21B.

To attach the toner pack 100, the user moves the toner pack 100 toward the mounting portion 106 in the mounting direction M, with the apparatus-side shutter 109 being in the covering position, and with the pack-side shutter 103 in the covering position, as shown in FIG. 17A and FIG. 17B. In doing this, the user aligns the recessed portion 102e of the nozzle 102, the opening 103a of the pack-side shutter 103, and the positioning portion 107a of the first frame 107. At the same time, the user aligns the drive transmitted portion 103e of the pack-side shutter 103 and the drive-transmitting portion 108a of the operation lever 108.

After aligning the toner pack 100 and mounting portion 106 in this way, the user moves the toner pack 100 in the mounting direction M toward the mounting portion 106. Shortly, a small-diameter portion 109d2 of the center boss 109d of the apparatus-side shutter 109 fits with the inner circumferential surface 102b1 of the protruded portion 102b of the nozzle 102 as shown in FIG. 18A. This determines the position of the nozzle 102 in the radial direction r relative to the apparatus-side shutter 109.

At this time, the drive-transmitting portion 108a of the operation lever 108 engages with the drive transmitted portion 103e of the pack-side shutter 103 as shown in FIG. 19A. At the same time, a side face 110f and a side face 110g of the cover 110 come to close proximity to or contact with the surface 102e1 and the surface 102e2 that form the recessed portion 102e of the nozzle 102 as shown in FIG. 19B. The drive transmitted portion 103e of the pack-side shutter 103 engages with the drive transmitted portion 109e of the apparatus-side shutter 109 and the drive-transmitting portion 108a of the operation lever 108 as shown in FIG. 19A and FIG. 19B. This makes the rotation axis A of the pack-side shutter 103 and the rotation axis B of the apparatus-side shutter 109 substantially coaxial.

Since the surfaces 102e1 and 102e2 of the recessed portion 102e of the nozzle 102 engage respectively with the side faces 110f and 110g of the cover 110, the nozzle 102 of the toner pack 100 does not rotate relative to the body base portion 2 including the cover 110. In other words, the recessed portion 102e restricts the rotation of the nozzle 102 relative to the image forming apparatus 1 by engaging with the cover 110 of the image forming apparatus 1, when the toner pack 100 is attached to the image forming apparatus 1. Thus the operation lever 108, pack-side shutter 103, and apparatus-side shutter 109 are able to rotate substantially integrally about the rotation axis B relative to the body base portion 2 and the nozzle 102.

Specifically, when the operation lever 108 is rotated, the drive-transmitting portion 108a of the operation lever 108 presses the surface 103b1 or 103b2 of the pack-side shutter 103, thereby rotating the pack-side shutter 103. After that, the surface 103b1 or 103b2 that forms the drive transmitted portion 103e of the pack-side shutter 103 presses the drive transmitted portion 109e of the apparatus-side shutter 109, thereby rotating the apparatus-side shutter 109.

When the attachment of the toner pack 100 to the mounting portion 106 is completed, the three radial positioning portions 103f (see FIG. 11A and FIG. 13) of the pack-side shutter 103 are in contact with the inner circumferential surface 109h of the apparatus-side shutter 109 (see FIG. 6A). This determines the position of the toner pack 100 in the radial direction r on the upstream side in the mounting direction M.

The protruded end face 102b2 of the protruded portion 102b of the nozzle 102 coming to abut on the pack contact surface 109g of the apparatus-side shutter 109 as shown in FIG. 20A determines the position of the toner pack 100 in the mounting direction M. Alternatively, the positioning of the protruded portion 102b of the nozzle 102 may be achieved by a configuration in which an outer circumferential surface of the protruded portion 102b fits with the cylindrical portion 110j of the cover 110 (see FIG. 6A and FIG. 6B).

The positioned portion 102d of the nozzle 102 engages with the positioning portion 107a of the first frame 107 as shown in FIG. 20B. This restricts the rotation of the nozzle 102 of the toner pack 100 relative to the first frame 107 (body base portion 2).

As described in the foregoing, when the toner pack 100 is attached to the mounting portion 106, as shown in FIG. 21A and FIG. 21B, the pawl 102f of the nozzle 102 moves from the restricting position to the non-restricting position (position shown in FIG. 21B). More specifically, with the unlocking inclined surface 102f1 being pressed by the unlocking rib 109j, the pawl 102f moves inward in the radial direction r from the restricting position toward the non-restricting position. This unlocks the rotation restriction of the pack-side shutter 103 in the direction of arrow K.

[Operation of Operation Lever]

Figure 22A:
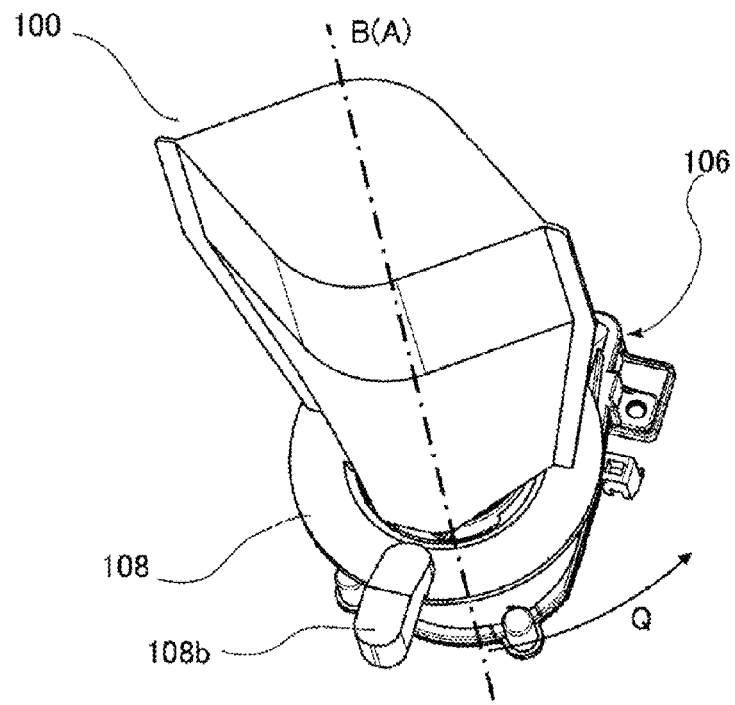
FIG. 22A is a perspective view illustrating the operation lever in the closed position and the toner pack.
Figure 22B:
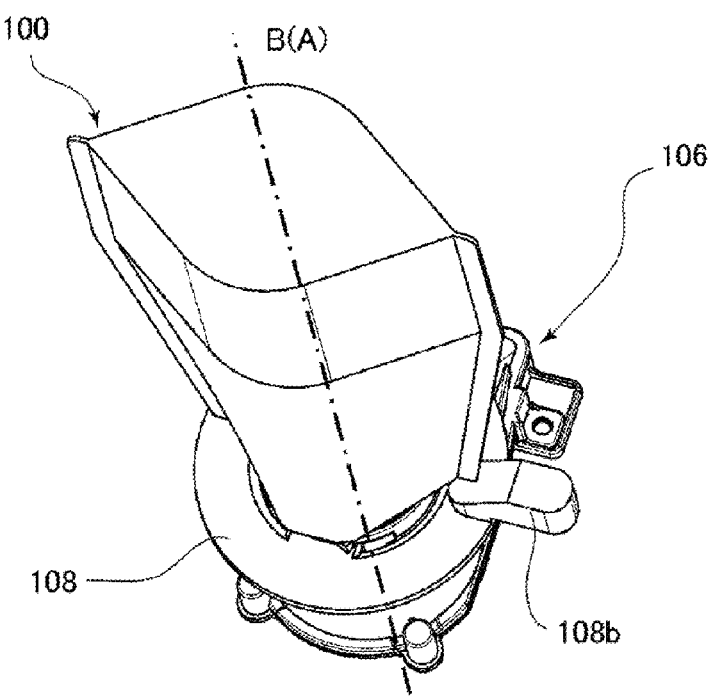
FIG. 22B is a perspective view illustrating the operation lever in the open position and the toner pack.
Figure 23A:
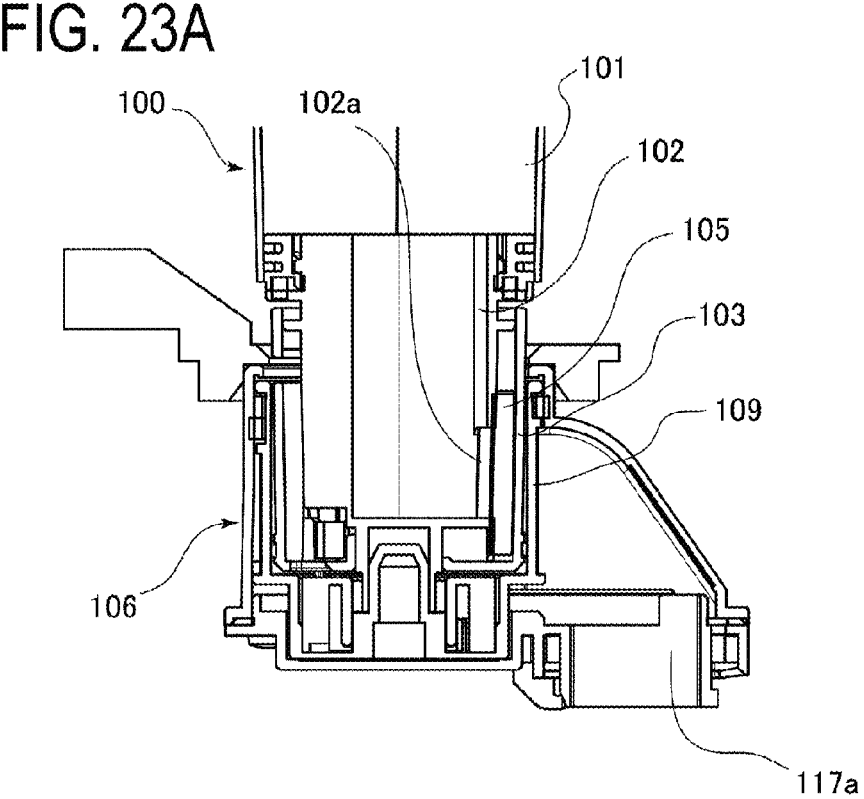
FIG. 23A is a cross-sectional view illustrating the toner pack and mounting portion when the apparatus-side shutter and pack-side shutter are both in a covering position.
Figure 23B:
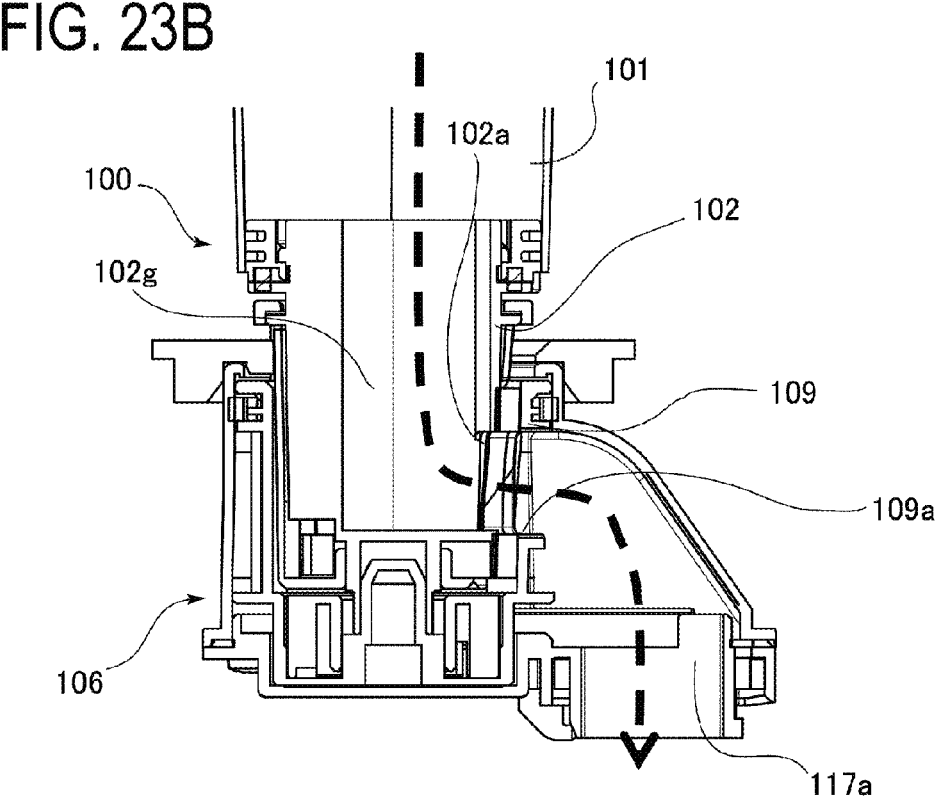
FIG. 23B is a cross-sectional view illustrating the toner pack and mounting portion when the apparatus-side shutter and pack-side shutter are both in an open position.

FIG. 22A is a perspective view illustrating the operation lever 108 in the closed position and the toner pack 100. FIG. 22B is a perspective view illustrating the operation lever 108 in the open position and the toner pack 100. FIG. 23A is a cross-sectional view of the toner pack 100 and mounting portion 106 when the apparatus-side shutter 109 and pack-side shutter 103 are both in the covering position. FIG. 23B is a cross-sectional view of the toner pack 100 and mounting portion 106 when the apparatus-side shutter 109 and pack-side shutter 103 are both in the open position.

As described in the foregoing, with the toner pack 100 attached to the mounting portion 106, the operation lever 108, pack-side shutter 103, and apparatus-side shutter 109 are able to rotate integrally about the rotation axis B relative to the body base portion 2 and the nozzle 102. With the toner pack 100 attached to the mounting portion 106, and with the operation lever 108 in the closed position, the discharge port 102a is covered by the pack-side shutter 103, pack-side seal 105, and apparatus-side shutter 109, as shown in FIG. 23A. This configuration prevents the toner inside the pouch 101 from reaching the apparatus-side opening 117a of the second frame 117.

With the toner pack 100 attached to the mounting portion 106, when the operation lever 108 is rotated in the direction of arrow Q from the closed position to the open position as shown in FIG. 22A and FIG. 22B, the pack-side shutter 103 and apparatus-side shutter 109 are rotated from the covering position to the open position.

More specifically, the drive-transmitting portion 108a of the operation lever 108 presses the surface 103b1 of the pack-side shutter 103. This rotates the pack-side shutter 103 with the operation lever 108 from the covering position to the open position. In other words, the pack-side shutter 103 rotates from the covering position to the open position with the rotation of the operation lever 108 by the engagement between the drive-transmitting portion 108a and the surface 103b1. The surface 103b2 of the pack-side shutter 103 being rotated from the covering position to the open position presses the drive transmitted portion 109e of the apparatus-side shutter 109. This rotates the apparatus-side shutter 109 with the pack-side shutter 103 from the covering position to the open position. In other words, the apparatus-side shutter 109 rotates integrally with the pack-side shutter 103 with the rotation of the operation lever 108 by the engagement between the surface 103b2 and the drive transmitted portion 109e.

The pack-side shutter 103, pack-side seal 105, and apparatus-side shutter 109 moving together opens the discharge port 102a of the nozzle 102 as shown in FIG. 23B. Namely, the pouch 101 of the toner pack 100 is communicated with the container portion 36 through the discharge port 102a, inlet port 109a, and apparatus-side opening 117a. As the user compresses the pouch 101, the toner inside the pouch 101 is supplied into the container portion 36 of the developer container 32 with air through the discharge port 102a, inlet port 109a, and apparatus-side opening 117a.

When the toner supply from the toner pack 100 to the developer container 32 is complete, the user rotates the operation lever 108 from the open position to the closed position. When the operation lever 108 is rotated from the open position to the closed position, the drive-transmitting portion 108a of the operation lever 108 presses the surface 103b2 of the pack-side shutter 103. This rotates the pack-side shutter 103 with the operation lever 108 from the open position to the covering position. The surface 103b1 of the pack-side shutter 103 being rotated from the open position to the covering position presses the drive transmitted portion 109e of the apparatus-side shutter 109. This rotates the apparatus-side shutter 109 with the pack-side shutter 103 from the open position to the covering position. In this way, when the operation lever 108 is rotated from the open position to the closed position, the surface 103b2 configures an engaging portion, and the surface 103b1 configures a second engaging portion.

In this state, the user pulls out the toner pack 100 from the mounting portion 106 to complete the toner supply operation.

[Toner Pack Detail]

A manufacturing method for the toner pack 100 according to this embodiment, and the configuration details of the joint between the nozzle body and the connector member are described with reference to FIG. 24A to FIG. 34B.

[Toner Pack Manufacturing Process]

First, a manufacturing process of the toner pack according to this embodiment is described with reference to FIG. 27A to FIG. 28B.

Figure 28A:
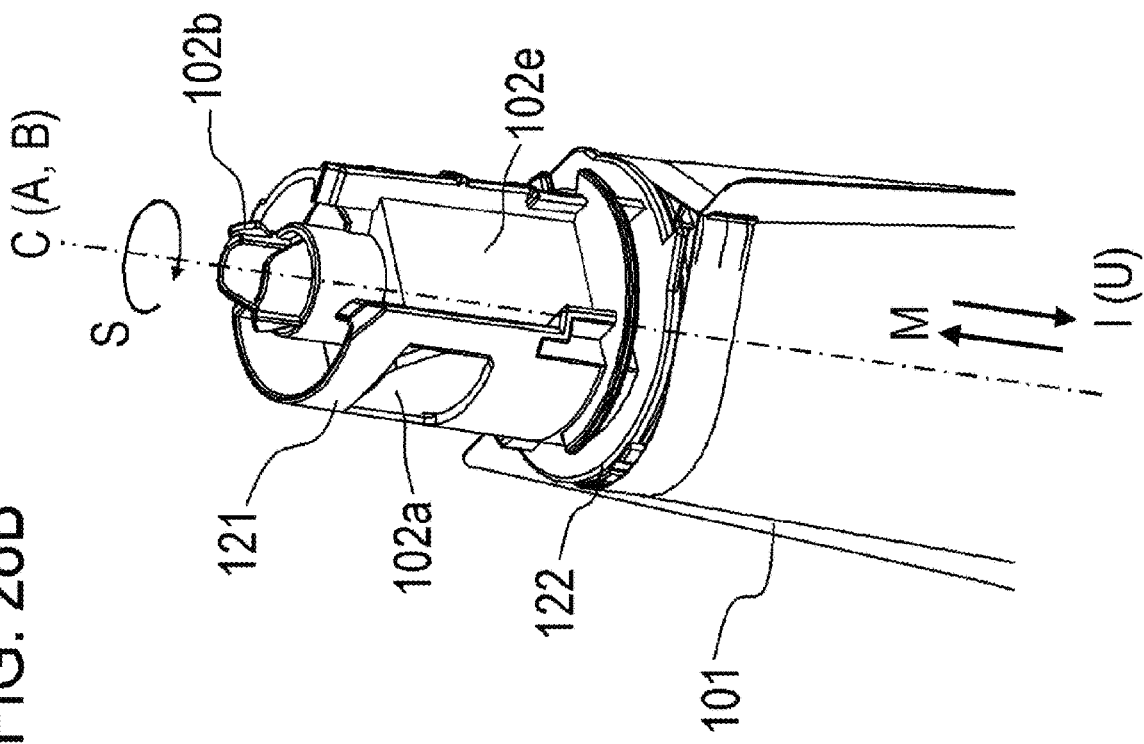
FIG. 28A is an enlarged perspective view of the pouch and nozzle in a state in which the nozzle body is in a fully inserted position relative to the connector member.
Figure 28B:
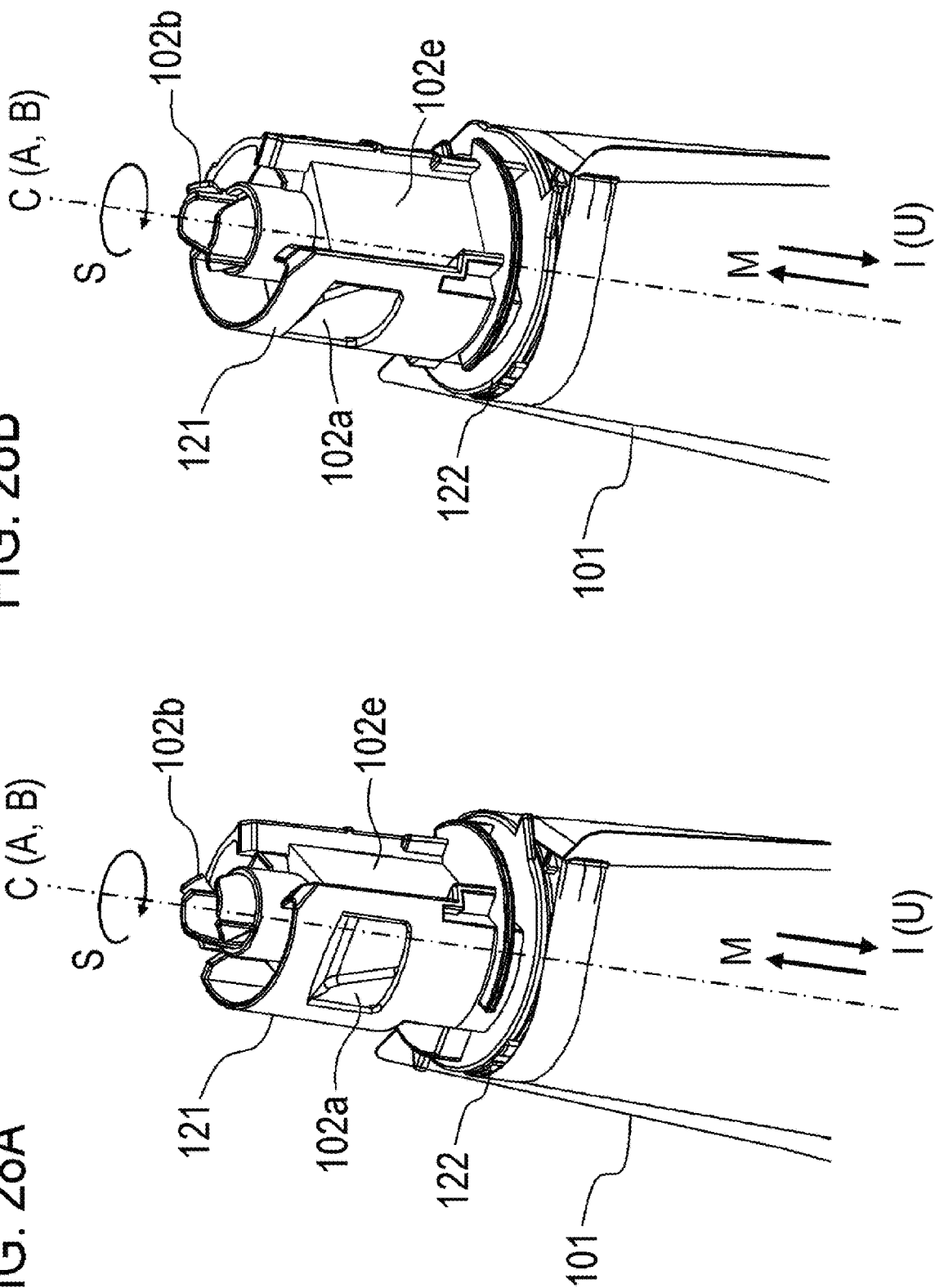
FIG. 28B is an enlarged perspective view of the pouch and nozzle assembly in a state in which the nozzle body is rotated from the fully inserted position shown in FIG. 28A to a fully engaged position.

FIG. 27A is a perspective view of a pouch and a connector member separate from each other before the connector member is joined to the pouch. FIG. 27B is a perspective view after the connector member has been joined to the pouch. FIG. 27C is a perspective view illustrating a state of the pouch ready to be filled with the toner, with the connector member joined thereto. FIG. 28A is an enlarged perspective view of the pouch and nozzle in a state in which the nozzle body is in a fully inserted position relative to the connector member. FIG. 28B is an enlarged perspective view of the pouch and nozzle assembly in a state in which the nozzle body is rotated from the fully inserted position shown in FIG. 28A to a fully engaged position.

As described above, the toner pack 100 according to this embodiment includes the pouch 101 as a container member for containing toner, the nozzle 102 joined to the pouch 101, and the pack-side shutter 103. In this embodiment, the nozzle 102 is composed of the nozzle body 121 and the connector member 122. In the manufacture of the toner pack 100, the components mentioned above are assembled, as well as the pouch 101 is filled with the toner.

Specifically, the connector member 122 is first attached to the pouch 101 (first assembling step) as shown in FIG. 27A and FIG. 27B. The attachment method is as described above. Next, the pouch 101, in the state ready to be filled with the toner with the connector member 122 alone being joined to the pouch 101 as shown in FIG. 27B, is filled with the toner through the opening in the connector member 122 (filling step). The nozzle body 121 is then engaged with the connector member 122 to join the nozzle 102 to the pouch 101 (form a pouch and nozzle assembly) as shown in FIG. 27A to FIG. 28B (second assembling step).

More specifically, in assembling the nozzle body 121 to the connector member 122, an insertion portion 121a is first inserted into the through hole 122b in the insertion direction I as shown in FIG. 27A, and the nozzle body 121 is moved in the insertion direction I relative to the connector member 122. The insertion direction I is parallel to the mounting direction M and opposite from the mounting direction M (parallel to and the same as the removal direction U). As shown in FIG. 28A, the nozzle body 121 is inserted to the connector member 122 as far as to a fully inserted position where a flange 121c abuts on an opposite portion 122c as an abutted portion of the connector member 122 (insertion step). As shown in FIG. 28B, with the flange 121c being maintained in contact with the opposite portion 122c, the nozzle body 121 is rotated relative to the connector member 122 in a rotating direction S around a rotation axis C that is parallel to the insertion direction I (rotation step). The rotation axis C is substantially the same as the rotation axes A and B.

Lastly, the pack-side shutter 103 is attached. Thus the toner pack 100 shown in FIG. 9, FIG. 10 and other drawings is complete (third assembling step).

[Toner Filling]

As described above, in this embodiment, the pouch 101 is filled with the toner in the state in which the connector member 122 is attached to the pouch 101 before the nozzle body 121 is attached (FIG. 27B). Namely, the toner filling step is performed after the first assembling step and before the second assembling step.

The toner filling step could be performed before the attachment of the connector member 122, for example, through the opening portion 101b in the pouch 101. However, the pouch 101 is a flexible member, and some means would be required to maintain the shape of the opening portion 101b during the toner filling. According to this embodiment, the connector member 122, which is a resin component, is attached, and the opening in the connector member 122 is used as the toner fill port. Therefore, no means for maintaining the shape of the fill port is necessary.

Another possibility would be to attach the nozzle to the pouch and to fill the pouch with the toner using the discharge port of the nozzle, for example. However, it may not be easy to fill the toner in some cases depending on the shape of the discharge port, and the filling operation may not be performed efficiently. In particular, with a configuration in which the discharge port 102a opens on one side relative to the longitudinal direction of the toner pack 100, as in the nozzle 102 of this embodiment, efficient toner filling through the discharge port 102a may be difficult. This embodiment adopts a configuration in which the opening in the connector member 122, which has a wider opening area than the discharge port 102a, and opens straight to the container portion 101a of the pouch 101 along the longitudinal direction of the toner pack 100, is used for the toner filling. This enables easy toner filling and allows for efficient filling operation.

[Engagement Structure between Nozzle Body and Connecting Member]

The engagement structure between the nozzle body 121 and the connector member 122 of the toner pack 100 according to the embodiment is described with reference to FIG. 24A to FIG. 34B.

Figure 24A:
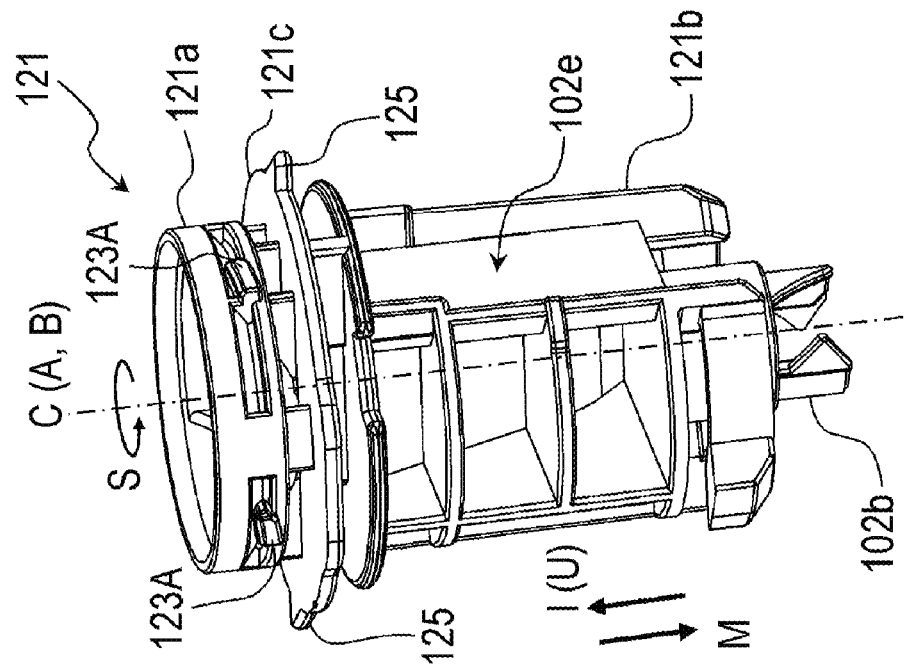
FIG. 24A is a perspective view of a nozzle body of the toner pack according to the embodiment.
Figure 24B:
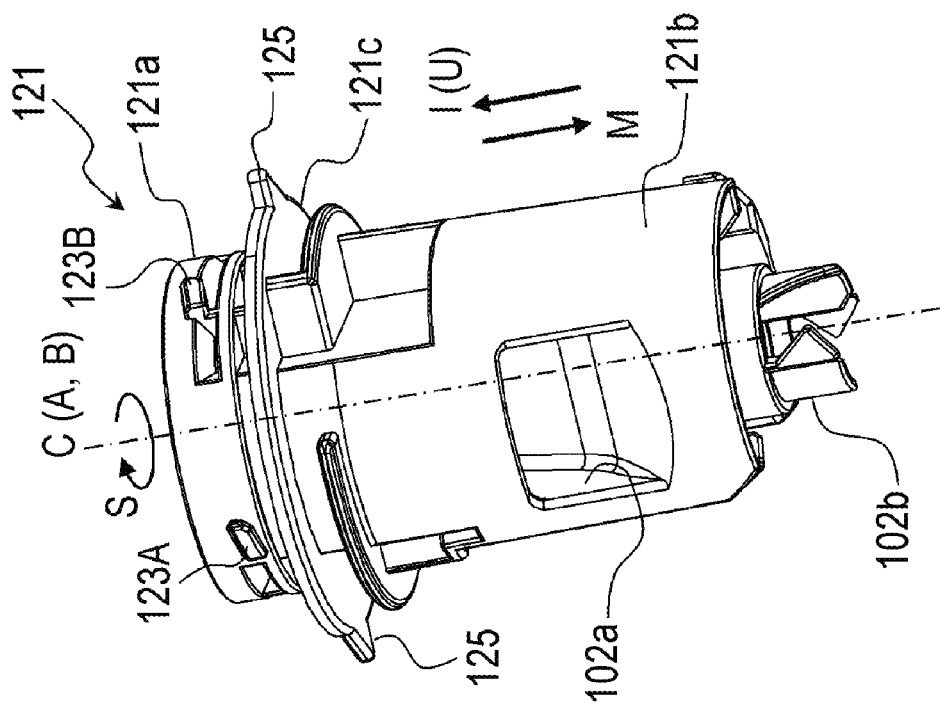
FIG. 24B is a perspective view of the nozzle body of the toner pack according to the embodiment seen from a different point of view than in FIG. 24A.
Figure 25A:
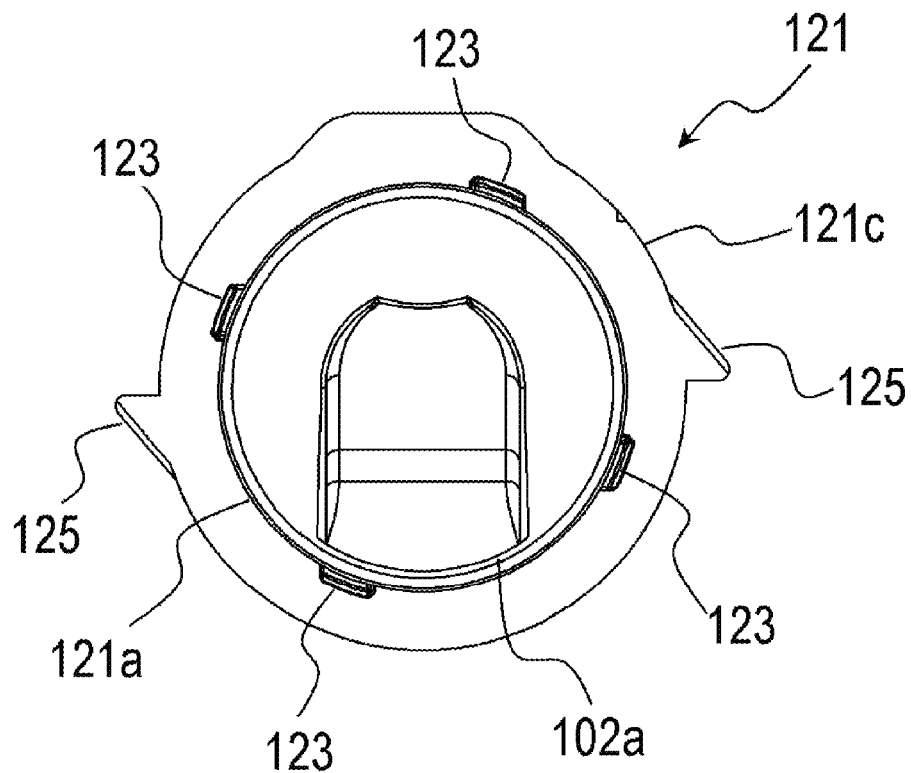
FIG. 25A is a view (plan view) of the nozzle body of the toner pack according to the embodiment seen from the opposite side from the side on which the nozzle body is inserted to and removed from a connector member.
Figure 25B:
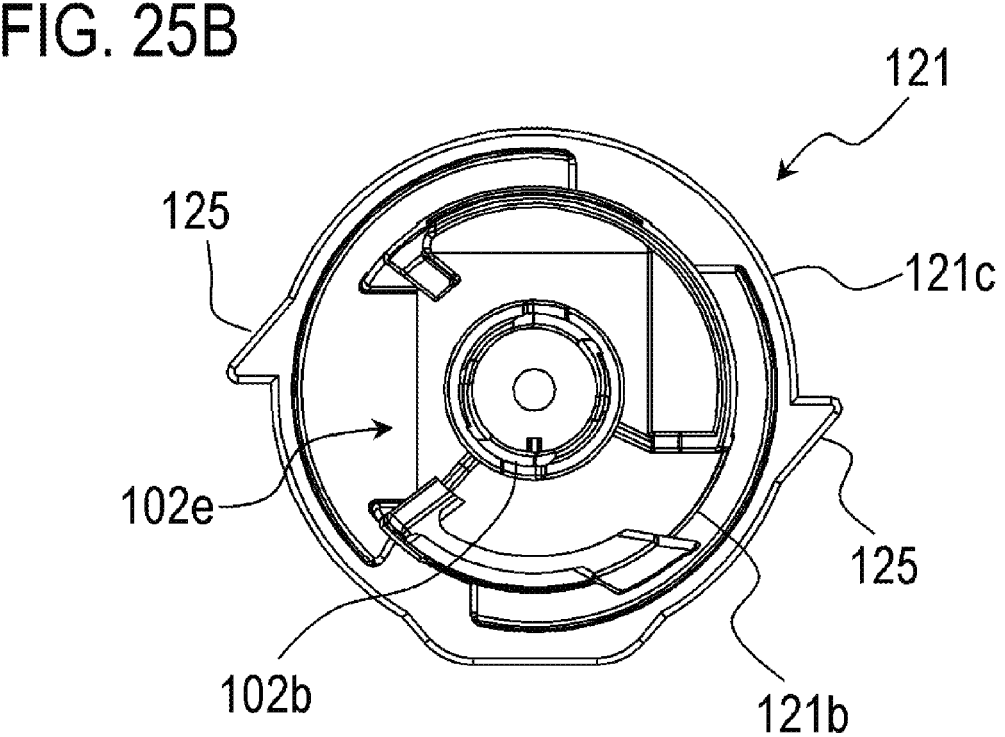
FIG. 25B is a view (bottom view) of the nozzle body of the toner pack according to the embodiment seen from the side on which the nozzle body is inserted to and removed from the connector member.
Figure 26A:
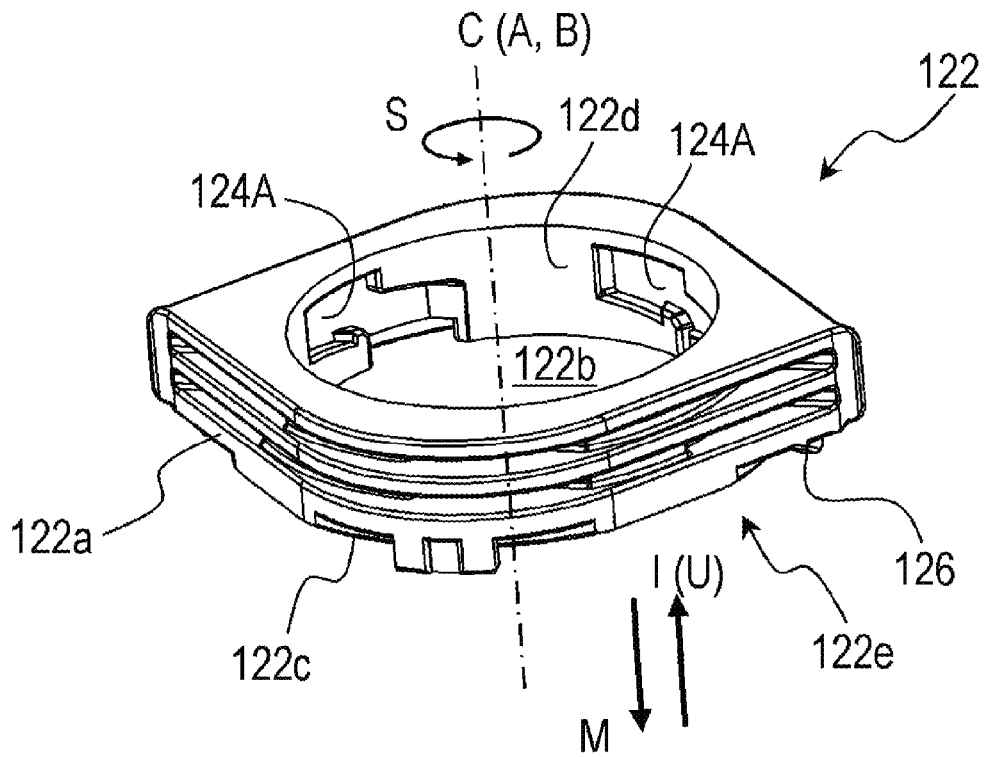
FIG. 26A is a perspective view of the connector member of the toner pack according to the embodiment.
Figure 26B:
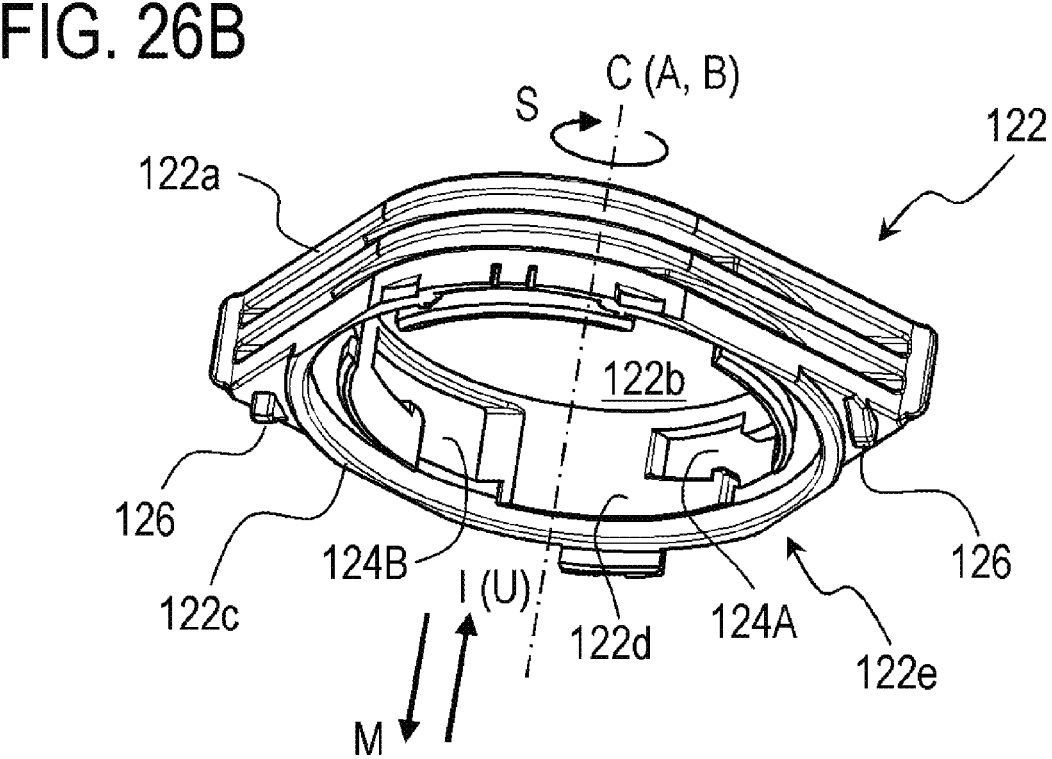
FIG. 26B is a perspective view of the connector member of the toner pack according to the embodiment seen from a different point of view than in FIG. 26A.

FIG. 24A is a perspective view of the nozzle body of the toner pack according to the embodiment. FIG. 24B is a perspective view of the nozzle body of the toner pack according to the embodiment from a different point of view than in FIG. 24A. FIG. 25A is a view (plan view) of the nozzle body of the toner pack according to the embodiment seen from the opposite side from the side on which the nozzle body is inserted to and removed from the connector member. FIG. 25B is a view (bottom view) of the nozzle body of the toner pack according to the embodiment seen from the side on which the nozzle body is inserted to and removed from the connector member. FIG. 26A is a perspective view of the connector member of the toner pack according to the embodiment. FIG. 26B is a perspective view of the connector member of the toner pack according to the embodiment from a different point of view than in FIG. 26A. FIG. 29A is a side view illustrating one side of the nozzle body where the discharge port is provided. FIG. 29B is a cross-sectional view of the connector member including the rotation axis of relative rotation between the nozzle body and connector member. FIG. 29C is a side view illustrating the opposite side from the side shown in FIG. 29A of the nozzle body. FIG. 29D is a cross-sectional view of the connector member including the rotation axis of relative rotation between the nozzle body and connector member.

As shown in FIG. 26A, FIG. 26B, FIG. 27A, FIG. 27B, FIG. 29B, and FIG. 29D, the connector member 122 is a substantially annular member attached along the inner periphery of the opening portion 101b of the pouch 101. The connector member 122 includes an insertion portion 122a having a shape conforming to the shape of the opening portion 101b of the pouch 101, and a through hole 122b for communicating the container portion 101a of the pouch 101 with the outside when the connector member 122 is joined to the opening portion 101b of the pouch 101. The connector member 122 includes the opposite portion 122c that is exposed to the outside of the pouch 101 in the mounting direction M when the connector member 122 is joined to the opening portion 101b of the pouch 101, and that comes opposite the nozzle body 121 in the mounting direction M when the nozzle body 121 is joined to the connector member 122.

The opening portion 101b of the pouch 101 opens toward the mounting direction M, and with the connector member 122 joined to the opening portion 101b, the through hole 122b extends through the connector member 122 along the mounting direction M. This through hole 122b serves as the fill port to allow the container portion 101a of the pouch 101 to be filled with the toner in the toner filling step described above. The through hole 122b is formed by an inner circumferential surface 122d of the connector member 122 having a center axis parallel to the mounting direction M, and an engaged groove 124 to be described later. These constituent parts form an inserted portion 122e to which the insertion portion 121a of the nozzle body 121 is inserted during the assembly of the nozzle body 121 (second assembling step).

As shown in FIG. 24A, FIG. 24B, FIG. 25A, FIG. 25B, FIG. 29A, and FIG. 29C, the nozzle body 121 includes the insertion portion 121a, a mounted portion 121b, and the flange 121c. The insertion portion 121a is a part of the nozzle body 121 that is inserted into the through hole 122b of the connector member 122. The mounted portion 121b is a part formed on the opposite side of the flange 121c from the insertion portion 121a, which is a part of the nozzle body 121 attached to the mounting portion 106 of the image forming apparatus 1 when the toner pack 100 is attached to the image forming apparatus 1. The mounted portion 121b is a part exposed to the outside of the pouch 101 when the nozzle body 121 is joined to the connector member 122 during the assembly of the toner pack 100, where the discharge port 102a and the protruded portion 102b are provided.

The flange 121c is provided between the insertion portion 121a and the mounted portion 121b, i.e., upstream of the insertion portion 121a in the insertion direction I in which the insertion portion 121a is inserted into the through hole 122b, and extends in a direction perpendicular to the insertion direction I. The flange 121c has, as an abutting portion, a surface facing the opposite portion 122c of the connector member 122 in the insertion direction I when the insertion portion 121a is inserted into the through hole 122b. When the insertion portion 121a is inserted into the through hole 122b, the flange 121c abuts on the opposite portion 122c in the insertion direction I, thereby defining the fully inserted position of the nozzle body 121 relative to the connector member 122.

Figure 34A:
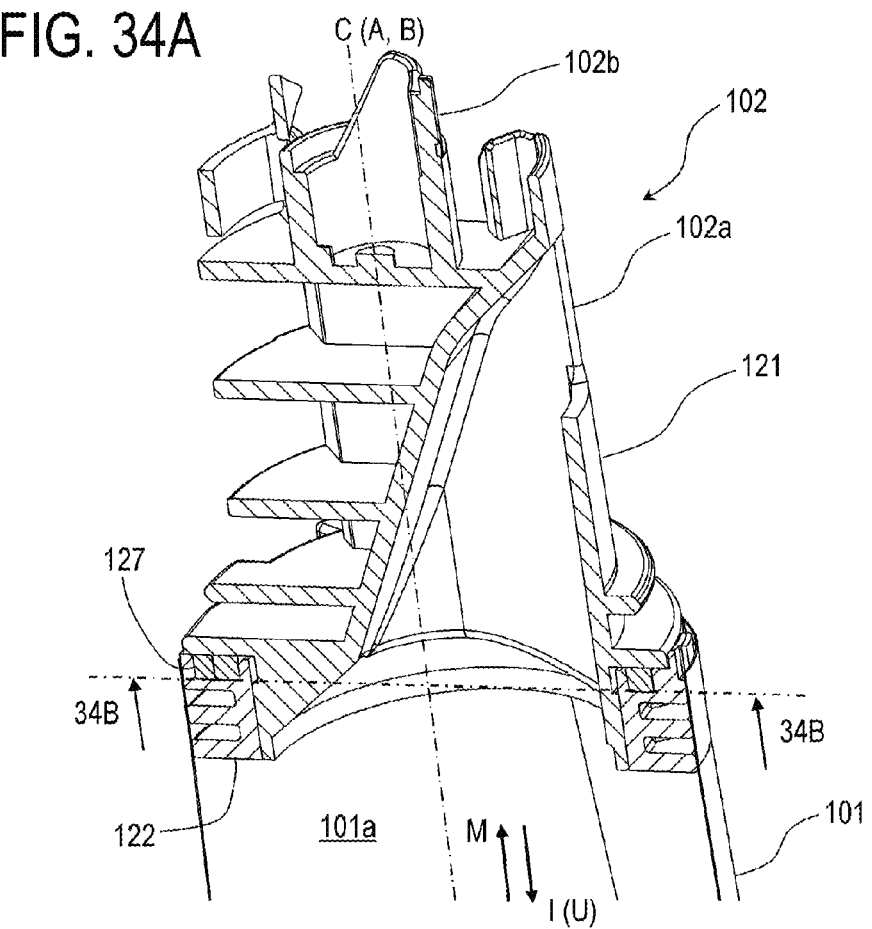
FIG. 34A is a cross-sectional perspective view of the pouch and nozzle assembly in the vicinity of the nozzle, showing section 34A-34A of FIG. 34B.
Figure 34B:
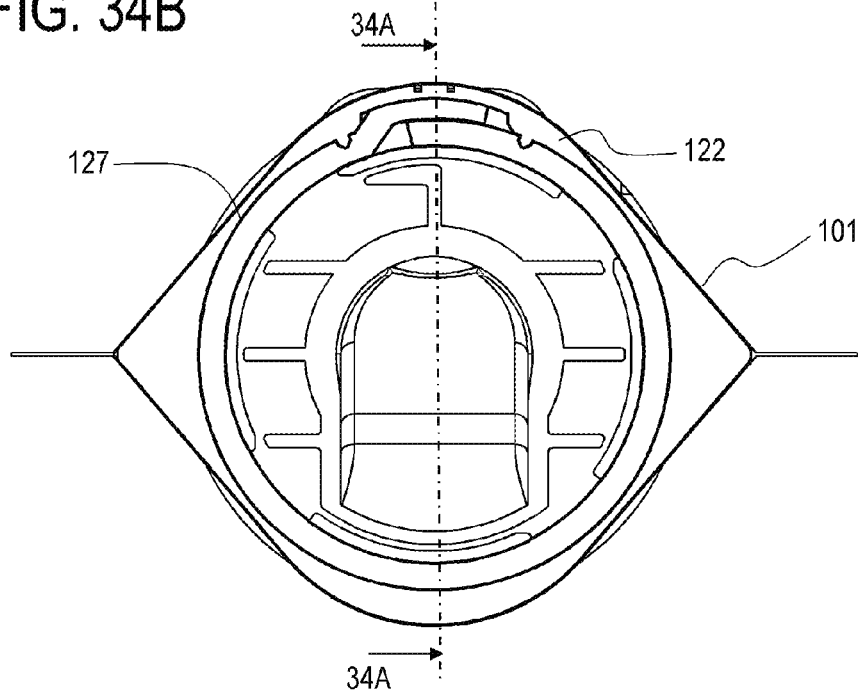
FIG. 34B is a cross-sectional view of the configuration of a seal member, illustrating section 34B-34B of FIG. 34A.

FIG. 34A is a cross-sectional perspective view of the pouch and nozzle assembly in the vicinity of the nozzle, showing section 34A-34A of FIG. 34B. FIG. 34B is a cross-sectional view of the configuration of a seal member, illustrating section 34B-34B of FIG. 34A. As shown in FIG. 34B, an annular seal member 127 is arranged between the flange 121c of the nozzle body 121 and the opposite portion 122c of the connector member 122 such as to surround the outer periphery of the through hole 122b. The seal member 127 is compressed between the flange 121c and the opposite portion 122c in the insertion direction I, thereby sealing the gap between the flange 121c and the opposite portion 122c and preventing toner leakage.

The engagement structure between the nozzle body 121 and the connector member 122 is described in more detail with reference to FIG. 24A to FIG. 26B and FIG. 29A to FIG. 33B.

Figure 30A:
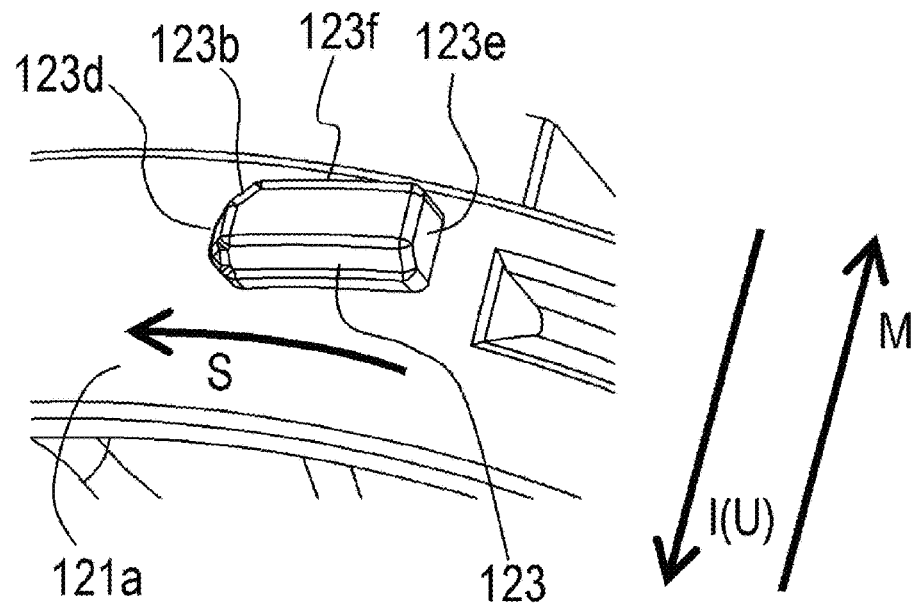
FIG. 30A is an enlarged perspective view illustrating a configuration of an inner engagement protrusion.
Figure 30B:
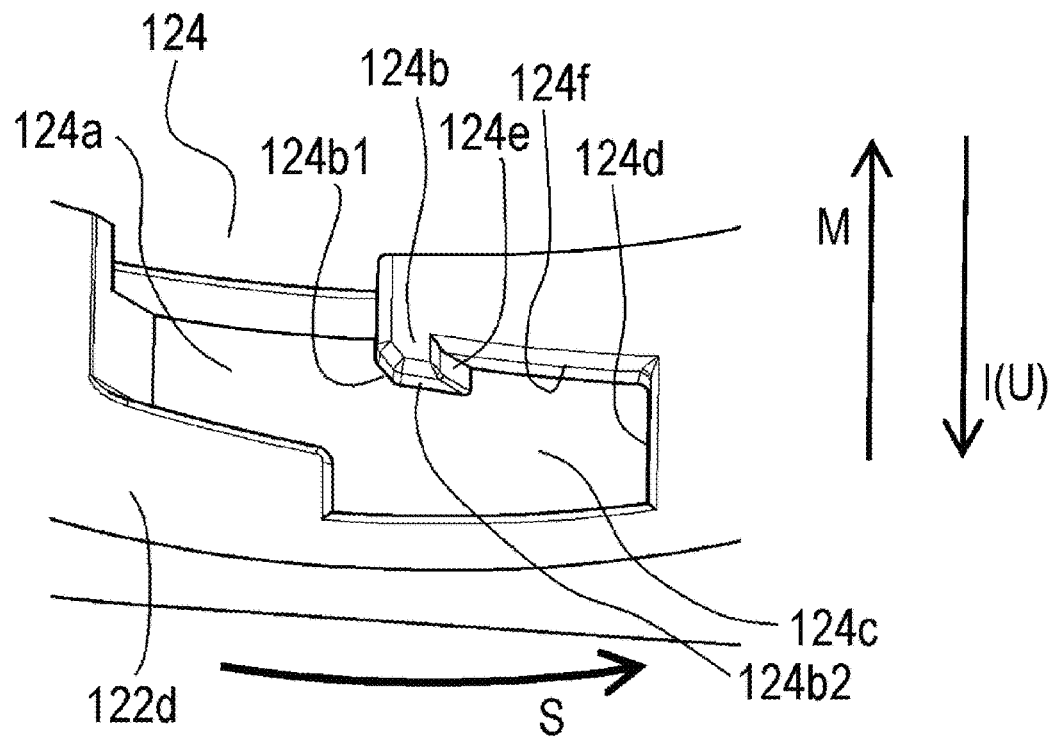
FIG. 30B is an enlarged perspective view illustrating a configuration of an engaged groove.
Figure 31A:
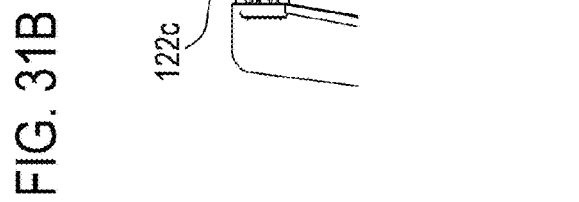
FIG. 31A is a schematic enlarged perspective view illustrating the inside of an opening in the connector member that is attached to the pouch, with only the inner engaging protrusion of the nozzle body being shown, when the nozzle body is in the fully inserted position relative to the connector member.
Figure 31B:
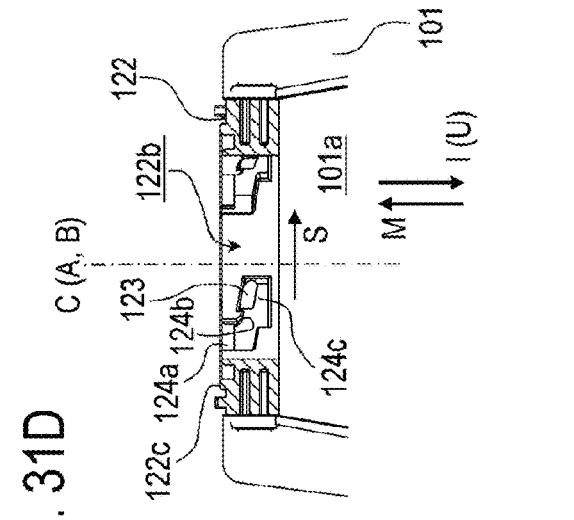
FIG. 31B is a cross-sectional view of section 31B-31B of FIG. 31A.
Figure 31C:
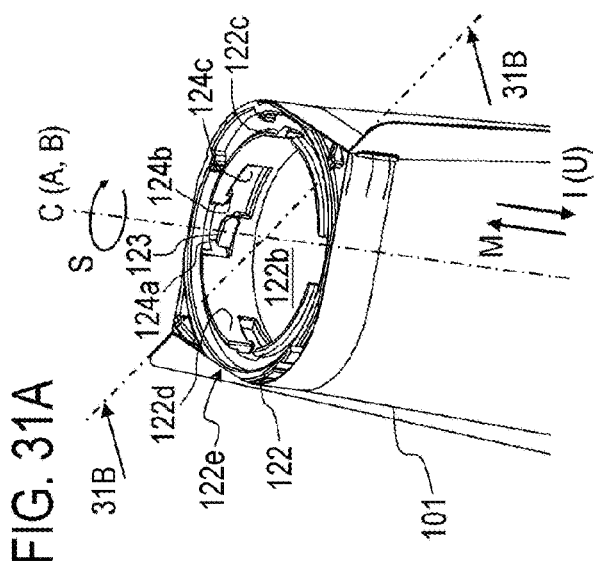
FIG. 31C is a schematic enlarged perspective view illustrating the inside of the opening in the connector member that is attached to the pouch, with only the inner engaging protrusion of the nozzle body being shown, when the nozzle body is in the fully engaged position relative to the connector member.
Figure 31D:
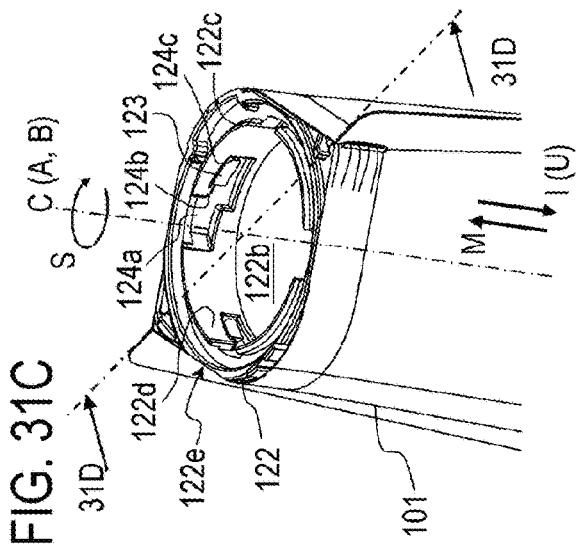
FIG. 31D is a cross-sectional view of section 31D-31D of FIG. 31C.
Figure 33A:
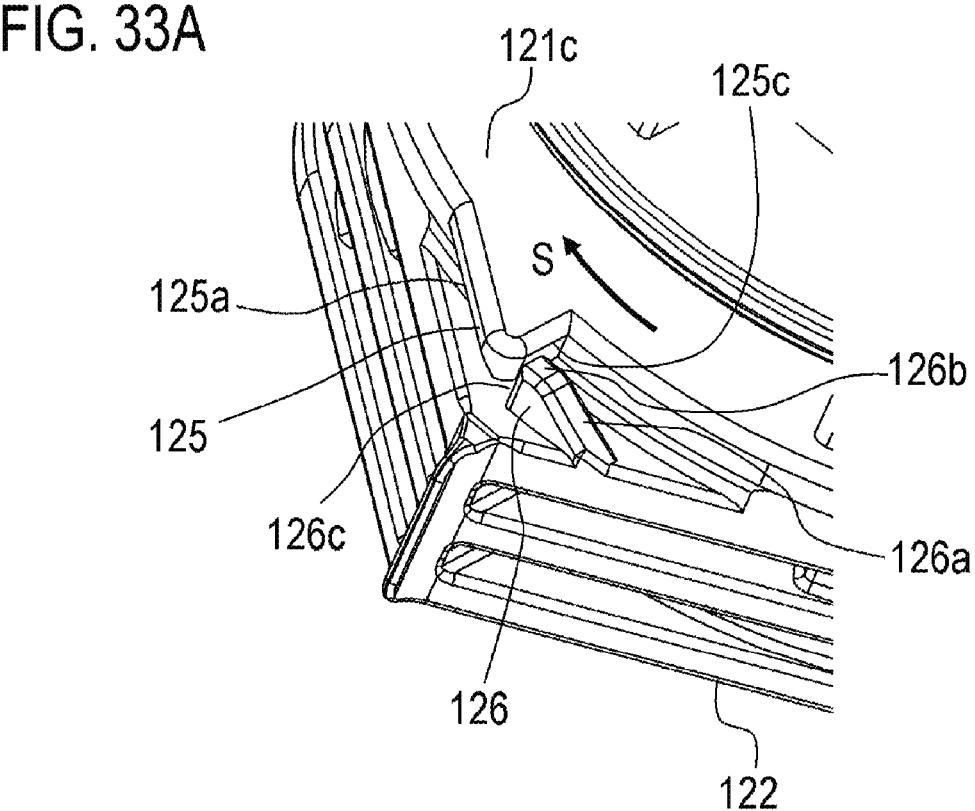
FIG. 33A is an enlarged perspective view illustrating a state of the second engagement structure (outer engaging protrusion of the nozzle body and engaged protrusion of the connector member) when the nozzle body is in the fully engaged position.
Figure 33B:
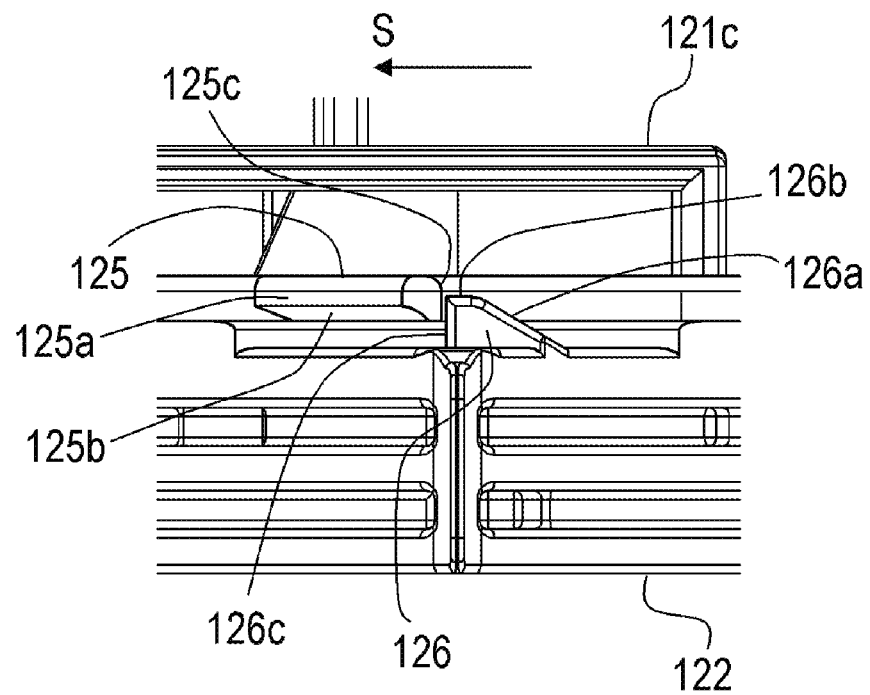
FIG. 33B is an enlarged side view illustrating a state of the second engagement structure (outer engaging protrusion of the nozzle body and engaged protrusion of the connector member) when the nozzle body is in the fully engaged position.

FIG. 30A is an enlarged perspective view illustrating a configuration of an inner engaging protrusion. FIG. 30B is an enlarged perspective view illustrating a configuration of an engaged groove. FIG. 31A is a schematic enlarged perspective view illustrating the inside of the opening in the connector member that is attached to the pouch, with only the inner engaging protrusion of the nozzle body being shown, when the nozzle body is in a fully inserted position relative to the connector member. FIG. 31B is a cross-sectional view of section 31B-31B of FIG. 31A. FIG. 31C is a schematic enlarged perspective view illustrating the inside of the opening in the connector member that is attached to the pouch, with only the inner engaging protrusion of the nozzle body being shown, when the nozzle body is in a fully engaged position relative to the connector member. FIG. 31D is a cross-sectional view of section 31D-31D of FIG. 31C. FIG. 32A is an enlarged side view of the pouch and nozzle illustrating a state of a second engagement structure (an outer engaging protrusion of the nozzle body and an engaged protrusion of the connector member) when the nozzle body is in the fully inserted position. FIG. 32B is a view (bottom view) of the pouch and nozzle shown in FIG. 32A in the insertion direction. FIG. 32C is an enlarged side view of the pouch and nozzle assembly illustrating a state of the second engagement structure (outer engaging protrusion of the nozzle body and engaged protrusion of the connector member) when the nozzle body is in the fully engaged position. FIG. 32D is a view (bottom view) of the pouch and nozzle assembly shown in FIG. 32C in the insertion direction. FIG. 33A is an enlarged perspective view illustrating a state of the second engagement structure (outer engaging protrusion of the nozzle body and engaged protrusion of the connector member) when the nozzle body is in the fully engaged position. FIG. 33B is an enlarged side view illustrating a state of the second engagement structure (outer engaging protrusion of the nozzle body and engaged protrusion of the connector member) when the nozzle body is in the fully engaged position.

As described above, when assembling the nozzle body 121 to the connector member 122, the nozzle body 121 is inserted to the connector member 122 as far as to the fully inserted position, after which the nozzle body 121 is rotated relative to the connector member 122 in the rotating direction S around the rotation axis C. Between the nozzle body 121 and the connector member 122 is provided an engagement structure designed to come into engagement with each other by this rotation, i.e., the nozzle body 121 is joined to the connector member 122 by this engagement structure. Between the nozzle body 121 and the connector member 122 are provided at least two types of engagement structure at different radial distances from the rotation axis C, as the engagement structure for forming this joint.

As shown in FIG. 24A to FIG. 26B and FIG. 29A to FIG. 29D, the nozzle body 121 includes the inner engaging protrusion 123 as a first engaging portion provided on a radially inner side, and an outer engaging protrusion 125 as a second engaging portion provided on a radially outer side, in the radial direction with respect to the rotation axis C. Corresponding to these parts, the connector member 122 includes the engaged groove 124 as a first engaged portion, and an engaged protrusion 126 as a second engaged portion. The inner engaging protrusion 123 engages with the engaged groove 124, and the outer engaging protrusion 125 engages with the engaged protrusion 126. Namely, the inner engaging protrusion 123 and the engaged groove 124 form a radially inner side engagement structure (first engagement structure), and the outer engaging protrusion 125 and the engaged protrusion 126 form a radially outer side engagement structure (second engagement structure). Both engagement structures are designed to come to a mutually engaged state after going through a process of elastic deformation during the relative rotation between the nozzle body 121 and the connector member 122 about the predetermined rotation axis C as the center axis. In the engaged state, the nozzle body 121 and the connector member 122 are restricted from moving relative to each other in the direction of the rotation axis.

[First Engagement Structure]

The engagement structure (first engagement structure) formed by the inner engaging protrusion 123 and the engaged groove 124 is configured to keep them permanently fixed together. After the nozzle body 121 has reached the fully inserted position relative to the connector member 122, as they are rotated relative to each other, the inner engaging protrusion 123 and the engaged groove 124 can take various relative rotation phases including a disengagement phase, deformation phase, and engagement phase.

In the state in which the nozzle body 121 has reached the fully inserted position, the inner engaging protrusion 123 and the engaged groove 124 are in the disengagement phase. When the nozzle body 121 is rotated relative to the connector member 122 in the rotating direction S, the inner engaging protrusion 123 and the engaged groove 124 transition from the disengagement phase to the engagement phase, via the deformation phase. The inner engaging protrusion 123 and the engaged groove 124 are configured to reach the engagement phase by some elastic deformation occurring at least in one of the inner engaging protrusion 123 and the engaged groove 124 in the deformation phase.

In the state in which the inner engaging protrusion 123 and the engaged groove 124 are in the engagement phase, the nozzle body 121 is restricted from moving relative to the connector member 122 in the circumferential direction and in the axial direction of the rotation center. Once having reached the engagement phase, the inner engaging protrusion 123 and the engaged groove 124 never return to the deformation phase or disengagement phase even when the nozzle body 121 is rotated in the opposite direction (second direction) from the rotating direction S (first direction) relative to the connector member 122.

The inner engaging protrusion 123 protrudes radially from an outer circumferential surface of the insertion portion 121a of the nozzle body 121, as shown in FIG. 24A to FIG. 25B. On the outer circumferential surface of the insertion portion 121a, the inner engaging protrusions 123 extend in a spiral line so that they extend downstream in the insertion direction I in which the insertion portion 121a is inserted into the through hole 122b as well as downstream in the rotating direction S in which the nozzle body 121 is rotated when the nozzle body 121 is joined to the connector member 122.

The inner engaging protrusion 123 includes a first side face 123d and a second side face 123e at the leading end and trailing end of the rotating direction S, respectively, and a third side face 123f at the rear end in the insertion direction I, as shown in FIG. 29A, FIG. 29C, and FIG. 30A. The first side face 123d and the second side face 123e are side faces extending in the insertion direction I. The third side face 123f is a side face inclined to both of the insertion direction I and rotating direction S; it extends downstream in the insertion direction I as well as downstream in the rotating direction S.

Between the first side face 123c and the third side face 123f, the inner engaging protrusion 123 further includes a force-receiving surface 123b (first guided inclined surface) that is a side face inclined to both of the first and third side faces. The force-receiving surface 123b is a surface for receiving a pressing force from the engaged groove 124. This pressing force can cause a deformation in at least one of the inner engaging protrusion 123 and the engaged groove 124 in the deformation phase for allowing a relative movement of the inner engaging protrusion 123 and the engaged groove 124 to reach the engagement phase.

The engaged groove 124 is a groove provided inside the through hole 122b of the connector member 122, i.e., in the inner circumferential surface 122d that forms the through hole 122b, as shown in FIG. 26A and FIG. 26B. The engaged groove 124 is recessed radially outward from the inner circumferential surface 122d in the radial direction with respect to the center axis of the inner circumferential surface 122d, which is parallel to the insertion direction I.

The engaged groove 124 is configured to generally include an insertion guide portion 124a, a deformation guide portion 124b, and an engagement retaining portion 124c as shown in FIG. 29B, FIG. 29D, and FIG. 30B. As shown in FIG. 31A to FIG. 31D, the inner engaging protrusion 123 led into the engaged groove 124 is guided from the insertion guide portion 124a toward the engagement retaining portion 124c by the relative rotation of the nozzle body 121 relative to the connector member 122 in the rotating direction S, via a contact with a force-applying surface of the deformation guide portion 124b.

Namely, when the insertion portion 121a is inserted into the through hole 122b in the insertion direction I, and the nozzle body 121 is moved in the insertion direction I relative to the connector member 122, the inner engaging protrusion 123 and engaged groove 124 come to a relative position (first position) shown in FIG. 31A and FIG. 31B. In this position, the inner engaging protrusion 123 and the engaged groove 124 are fitted with each other such as to allow relative movement of the nozzle body 121 and the connector member (coupling member) 122 in a direction along the mounting direction M (third direction, predetermined direction). This direction (third direction, predetermined direction) is also a direction in which the pouch 101 (container portion 101a) of the toner pack 100 and the nozzle 102 (nozzle body 121 and inner engaging protrusion 123) align. By moving the nozzle body 121 relative to the connector member 122 in the rotating direction S (first direction in the circumferential direction, which is a fourth direction intersecting the third direction, or intersecting direction) from this relative position (first position), the inner engaging protrusion 123 and engaged groove 124 come to a relative position (second position) shown in FIG. 31C and FIG. 31D. In this position, the inner engaging protrusion 123 and the engaged groove 124 are fitted with each other such as to restrict relative movement of the nozzle body 121 and connector member 122. Specifically, a third groove side face 124f restricts the relative movement of the nozzle body 121 and the connector member 122 in a direction along the mounting direction M (third direction, predetermined direction). A second groove side face 124e restricts the relative movement of the nozzle body 121 and the connector member 122 in the rotating direction S (second direction in the circumferential direction, which is the fourth direction or intersecting direction).

The insertion guide portion 124a includes an insertion hole open to a direction parallel to the insertion direction I in the end face of the opposite portion 122c on the opposite side from the insertion direction I of the connector member 122. The insertion guide portion 124a extends from this insertion hole in the insertion direction I, to draw in and guide the inner engaging protrusion 123 in the insertion direction I, when the insertion portion 121a of the nozzle body 121 is inserted into the through hole 122b.

The engaged groove 124 has a portion extending in the rotating direction S beyond the insertion guide portion 124a (downstream side in the insertion direction I), with the deformation guide portion 124b right before the engagement retaining portion 124c. The deformation guide portion 124b is configured to protrude downstream in the insertion direction I into the engagement retaining portion 124c, and includes a first inclined surface 124b1 and a second inclined surface 124b2, which form part of the groove side face of the engaged groove 124, as the force-applying surface (first guide inclined surface).

The first inclined surface 124b1 and second inclined surface 124b2 extending in the direction in which they guide the inner engaging protrusion 123 have respective inclination angles that are reduced stepwise relative to the circumferential direction. The first inclined surface 124b1 and second inclined surface 124b2 are groove side faces inclined to both of the insertion direction I and rotating direction S, extending downstream in the insertion direction I as well as downstream in the rotating direction S. The first inclined surface 124b1 and the second inclined surface 124b2 face the force-receiving surface 123b of the inner engaging protrusion 123 in the deformation phase from the opposite directions from the insertion direction I and rotating direction S, respectively. The inner engaging protrusion 123 is first guided by the first inclined surface 124b1, and then by the second inclined surface 124b2. The second inclined surface 124b2 has a smaller inclination angle than the first inclined surface 124b1 relative to the circumferential direction.

When the inner engaging protrusion 123 moves in the rotating direction S with the relative rotation between the nozzle body 121 and the connector member 122, the force-receiving surface 123b comes into contact with the first inclined surface 124b1. The pressing force generated between the force-receiving surface 123b and the first inclined surface 124b1 brings about an elastic deformation at least in one of the inner engaging protrusion 123 and the engaged groove 124. This deformation causes the inner engaging protrusion 123 to shift downstream in the insertion direction I relative to the deformation guide portion 124b of the engaged groove 124.

As the relative rotation between the nozzle body 121 and the connector member 122 progresses, with the force-receiving surface 123b and the first inclined surface 124b1 sliding against each other, the inner engaging protrusion 123 rides onto the deformation guide portion 124b downstream in the insertion direction I. Namely, the third side face 123f of the inner engaging protrusion 123 comes into contact with and slides against the second inclined surface 124b2 of the deformation guide portion 124b of the engaged groove 124. The deformation of at least one of the inner engaging protrusion 123 and the engaged groove 124, caused by the pressing force generated between the force-receiving surface 123b and the second inclined surface 124b2, causes the inner engaging protrusion 123 to shift further downstream in the insertion direction I relative to the deformation guide portion 124b of the engaged groove 124.

As the relative rotation between the nozzle body 121 and the connector member 122 progresses from this state, the inner engaging protrusion 123 moves further downstream in the rotating direction S beyond the deformation guide portion 124b, whereupon the pressing force is released. The inner engaging protrusion 123, freed from the deformed state, shifts in the opposite direction from the insertion direction I relative to the engaged groove 124. Namely, the inner engaging protrusion 123 moves in the rotating direction S relative to the engaged groove 124 by the deformation of at least one of the inner engaging protrusion 123 and the engaged groove 124 such as to ride over the deformation guide portion 124b, and fits into the engagement retaining portion 124c. The relative rotation phase of the inner engaging protrusion 123 and the engaged groove 124 thus transitions from the deformation phase to the engagement phase.

The engagement retaining portion 124c is formed to increase in width, which is the groove width of the engaged groove 124 in the insertion direction I, in the opposite direction from the insertion direction I relative to the deformation guide portion 124b. The elastic deformation of the inner engaging protrusion 123 or engaged groove 124 that occurred in the deformation phase is released by the transition of their relative rotation phase to the engagement phase, whereby the inner engaging protrusion 123 comes to fit into the engagement retaining portion 124c.

The engagement retaining portion 124c includes a first groove side face 124d and a second groove side face 124e arranged along the circumferential direction of the inner circumferential surface 122d. The first groove side face 124d and the second groove side face 124e face the inner engaging protrusion 123 in the engagement phase in the opposite direction (first direction) from the rotating direction S, and in the rotating direction S (second direction), respectively. The first groove side face 124d is a groove side face extending along the insertion direction I, and faces the first side face 123*d* of the inner engaging protrusion 123 in the opposite direction from the rotating direction S, serving as a first circumferential restricting portion. The second groove side face 124*e* is also a groove side face extending along the insertion direction I, and faces the second side face 123*e* of the inner engaging protrusion 123 in the rotating direction S, serving as a second circumferential restricting portion (second restricting portion).

These surfaces facing each other in the circumferential direction between the inner engaging protrusion 123 and the engagement retaining portion 124*c* restrict relative rotational movement in the circumferential direction of the inner engaging protrusion 123 and engaged groove 124 in the engagement phase. While the circumferentially opposite surfaces between the inner engaging protrusion 123 and the engagement retaining portion 124*c* should ideally face each other without a gap, they may be configured to face each other with a slight gap. Namely, these parts may be configured to loosely fit to each other as long as the range of relative rotation allowed to the nozzle body 121 and connector member 122 after they have engaged does not adversely affect the function of the toner pack 100.

The engagement retaining portion 124*c* has a third groove side face 124*f* that faces the inner engaging protrusion 123 in the engagement phase in the insertion direction I. The third groove side face 124*f* is a groove side face inclined to both of the insertion direction I and rotating direction S, conforming to the third side face 123*f* of the inner engaging protrusion 123, i.e., the third groove side face extends downstream in the insertion direction I as well as downstream in the rotating direction S.

The third groove side face 124*f*, serving as a counter-insertion direction restricting portion (first restricting portion), abuts on the third side face 123*f* of the inner engaging protrusion 123 in the engagement phase in the insertion direction I. This restricts the relative movement of the nozzle body 121 in the counter-insertion direction, which is the opposite direction from the insertion direction I, away from the connector member 122. Meanwhile, the relative movement of the nozzle body 121 relative to the connector member 122 in the insertion direction I is restricted, as described above, by the opposite portion 122*c* of the connector member 122 serving as an insertion direction restricting portion, abutting on the flange 121*c* of the nozzle body 121, in the counter-insertion direction. Thus the movement of the nozzle body 121 relative to the connector member 122 is restricted in both the insertion I and the counter-insertion direction.

The third groove side face 124*f* is inclined such as to press the inner engaging protrusion 123 downstream in the insertion direction I as well as downstream in the rotating direction S. The wedge effect of this inclined configuration further ensures the restriction of the relative movement between the inner engaging protrusion 123 and the engaged groove 124, and enhances the air tightness between the nozzle body 121 and connector member 122 in the insertion direction I. Namely, any dimensional errors can be absorbed so that a reliable tight contact can be achieved between the nozzle body 121 and connector member 122.

The inner engaging protrusion 123 is provided in plural different positions in the circumferential direction on the outer circumferential surface of the insertion portion 121*a* (at different phase positions about the center axis of the insertion portion 121*a*). In this embodiment, the inner engaging protrusion is provided at four circumferentially equidistant positions. Likewise, the engaged groove 124 is provided at four circumferentially equidistant positions corresponding to the inner engaging protrusions (first engaging protrusions) 123. The number of engagement structures composed of the inner engaging protrusion 123 and engaged groove 124 is not limited to four; it may be three or less, or five or more.

In this embodiment, the position in the insertion direction I of one of the four sets of engagement structure is made different than those of the other sets, as a configuration for preventing incorrect attachment of the nozzle body 121 to the connector member 122. Namely, one (123B) of the four inner engaging protrusions 123 in the insertion direction is displaced downstream in the insertion direction I relative to the other three inner engaging protrusions 123A. Accordingly, the position in the insertion direction I of the engagement retaining portion 124*c* in the engaged groove 124B corresponding to the inner engaging protrusion 123B is displaced downstream in the insertion direction I relative to the positions of the engagement retaining portions 124*c* in the other three engaged grooves 124A. Therefore, the nozzle body 121 cannot be assembled to the connector member 122 unless the nozzle body 121 and connector member 122 are positioned in a relative phase around the insertion direction I where the inner engaging protrusion 123B and the engaged groove 124B are aligned. The phase (orientation) around the insertion direction I of the nozzle body 121 relative to the connector member 122 when the nozzle body is engaged with the connector member 122, i.e., the phase around the insertion direction I of the nozzle body 121 relative to the pouch 101, is thus made constant (is determined to one orientation).

The configuration for preventing incorrect attachment is not limited to the one described above. For example, for displacing the inner engaging protrusions 123A and inner engaging protrusion 123B in the insertion direction I, the inner engaging protrusions 123A and inner engaging protrusion 123B may be arranged such that the inner engaging protrusion 123B is displaced upstream in the insertion direction I relative to the inner engaging protrusions 123A. Alternatively, two adjacent inner engaging protrusions 123 may be positioned in the insertion direction I differently from the other two inner engaging protrusions, for example. Three or less, or five or more inner engaging protrusions 123 may be provided. In this case, the inner engaging protrusions 123A and inner engaging protrusion 123B may be combined in any way as long as the function of preventing incorrect attachment is achieved. The positions of the inner engaging protrusions 123 may be displaced in the insertion direction I in three or more steps instead of two steps as in this embodiment.

Instead of providing the engaging protrusions on the nozzle body 121 and forming the engaged grooves in the connector member 122 as in this embodiment, the engaging protrusions may be provided to the connector member 122, and the engaged grooves may be formed in the nozzle body 121. In the latter case, however, the engaged grooves formed in the nozzle body 121 will be in communication with the container portion 101*a* of the pouch 101. Therefore, it may be necessary to consider providing a sealing structure to prevent the engagement structure from becoming a leakage path of toner.

[Second Engagement Structure]

The engagement structure (second engagement structure) formed by the outer engaging protrusion 125 (third protrusion) and the engaged protrusion 126 (second protrusion) is also configured to keep them permanently fixed together. After the nozzle body 121 has reached the fully inserted position relative to the connector member 122, as they are rotated relative to each other, the outer engaging protrusion 125 and the engaged protrusion 126 can take various relative rotation phases including a disengagement phase, deformation phase, and engagement phase.

In the state in which the nozzle body 121 has reached the fully inserted position, the outer engaging protrusion 125 and the engaged protrusion 126 are in the disengagement phase. When the nozzle body 121 is rotated relative to the connector member 122 in the rotating direction S, the outer engaging protrusion 125 and the engaged protrusion 126 transition from the disengagement phase to the engagement phase, via the deformation phase. The outer engaging protrusion 125 and the engaged protrusion 126 are configured to reach the engagement phase by some elastic deformation occurring at least in one of the outer engaging protrusion 125 and the engaged protrusion 126 in the deformation phase.

In the state in which the outer engaging protrusion 125 and the engaged protrusion 126 are in the engagement phase, the nozzle body 121 is restricted from moving relative to the connector member 122 in the circumferential direction and in the axial direction of the rotation center. Once having reached the engagement phase, the outer engaging protrusion 125 and the engaged protrusion 126 never return to the deformation phase or disengagement phase even when the nozzle body 121 is rotated in the opposite direction from the rotating direction S relative to the connector member 122, unless some external force that can cause deformation of the outer engaging protrusion 125 or engaged protrusion 126 is applied.

The outer engaging protrusion 125 is a protrusion in a substantially delta wing form projecting radially outward from an outer peripheral edge of the flange 121c of the nozzle body 121, as shown in FIG. 24A to FIG. 25B and FIG. 32A to FIG. 32D. Specifically, the outer engaging protrusion 125 protrudes radially more toward the opposite direction from the rotating direction S, which is the direction of relative rotation of the nozzle body 121 relative to the connector member 122.

The outer engaging protrusion 125 includes a force-receiving surface 125a, a sliding surface 125b, and an engaging surface 125c as shown in FIG. 33A and FIG. 33B. The force-receiving surface 125a (second guided inclined surface) is an end face of the outer engaging protrusion 125 at the distal end in the rotating direction S; it is an inclined surface inclined radially outward as it extends upstream in the rotating direction S, and extending along the insertion direction I. The sliding surface 125b is an end face of the outer engaging protrusion 125 downstream in the insertion direction I, extending in a direction perpendicular to the insertion direction I. The engaging surface 125c is an end face of the outer engaging protrusion 125 at the rear end in the rotating direction S, extending in the insertion direction I and in the radial direction.

The engaged protrusion 126 is a substantially triangular rib-like protrusion projecting from the opposite portion 122c of the connector member 122 in the opposite direction from the insertion direction I, as shown in FIG. 24A to FIG. 25B and FIG. 32A to FIG. 32D. Specifically, the engaged protrusion is located radially more outside than the outer circumference of the flange 121c of the nozzle body 121, and protrudes more in the counter-insertion direction opposite from the insertion direction I as it extends in the rotating direction S, which is the direction of relative rotation of the nozzle body 121 relative to the connector member 122.

The engaged protrusion 126 includes a force-applying surface 126a, a slid surface 126b, and an engaged surface 126c as shown in FIG. 33A and FIG. 33B. The force-applying surface 126a (second guide inclined surface) is an inclined surface of the engaged protrusion 126 upstream in the rotating direction S; it is an inclined surface inclined to protrude in the counter-insertion direction more from the opposite portion 122c as it extends downstream in the rotating direction S, and extending along the radial direction. The slid surface 126b is an end face of the engaged protrusion 126 upstream in the insertion direction I, extending in a direction perpendicular to the insertion direction I. The engaged surface 126c is an end face of the engaged protrusion 126 downstream in the rotating direction S, extending in the insertion direction I and in the radial direction.

When the outer engaging protrusion 125 moves in the rotating direction S with the relative rotation between the nozzle body 121 and the connector member 122, the force-receiving surface 125a comes into contact with the force-applying surface 126a. The deformation of at least one of the outer engaging protrusion 125 and the engaged protrusion 126, caused by the pressing force generated between the force-receiving surface 125a and the force-applying surface 126a, causes the outer engaging protrusion 125 to shift downstream in the insertion direction I relative to the engaged protrusion 126.

As the relative rotation between the nozzle body 121 and the connector member 122 progresses, with the force-receiving surface 125a and the force-applying surface 126a sliding against each other, the outer engaging protrusion 125 rides onto the engaged protrusion 126 downstream in the insertion direction I. Namely, the sliding surface 125b of the outer engaging protrusion 125 comes to face in the insertion direction I, makes contact with, and slides against the slid surface 126b of the engaged protrusion 126.

As the relative rotation between the nozzle body 121 and the connector member 122 progresses from this state, the outer engaging protrusion 125 moves further downstream in the rotating direction S beyond the engaged protrusion 126, whereupon the pressing force is released. The outer engaging protrusion 125, freed from the deformed state, shifts in the insertion direction I relative to the engaged protrusion 126. Namely, the outer engaging protrusion 125 moves downstream in the rotating direction S relative to the engaged protrusion 126 by the deformation of at least one of the outer engaging protrusion 125 and the engaged protrusion 126 such as to ride over the engaged protrusion 126. The engaging surface 125c of the outer engaging protrusion 125 serving as a fourth circumferential restricting portion comes to face the engaged surface 126c of the engaged protrusion 126 serving as a third circumferential restricting portion in the opposite direction from the rotating direction S. Thus the relative rotation of the nozzle body 121 relative to the connector member 122 is restricted in the opposite direction from the rotating direction S. Namely, the relative rotation phase of the outer engaging protrusion 125 and the engaged protrusion 126 transitions from the deformation phase to the engagement phase.

The second engagement structure made up of the outer engaging protrusion 125 and engaged protrusion 126 is provided at plural different positions in the circumferential direction of the relative rotation between the nozzle body 121 and the connector member 122 about the rotation axis C (at different phases about the center axis of the insertion portion 121a). In this embodiment, the engagement structure is provided at two circumferential locations. The number of locations where the second engagement structure is provided is not limited to two; it may be one, or three or more.

The first engagement structure described above is able to restrict the relative movement of the nozzle body 121 relative to the connector member 122 both in the insertion direction I and in the opposite or counter-insertion direction (release direction). Relative rotational movement about the rotation axis extending along the insertion direction I between the nozzle body 121 and the connector member 122 is also restricted. Restriction of relative rotation can be achieved by the second engagement structure, too, and this restriction of relative rotation consequently restricts the relative movement in insertion and release directions of the nozzle body 121 relative to the connector member 122.

The first engagement structure that restricts both the relative movement in insertion and release directions and the relative rotational movement is positioned radially inner than the second engagement structure in the radial direction with respect to the rotation axis of the relative rotation. This arrangement allows the rotational torque required for achieving the engaged state to be relatively smaller than in other arrangements (e.g., where the radial positions of the first and second engagement structures are reversed). In particular, the force required to cause deformation for allowing the inner engaging protrusion 123 to ride over the deformation guide portion 124b of the engaged groove 124 can be reduced, which facilitates the assembling operation.

The first engagement structure made up of the inner engaging protrusion 123 and the engaged groove 124 is designed such as not to be exposed to the outside after the nozzle body 121 is assembled. That is, the first engagement structure is positioned inside the through hole 122b of the inserted portion 122e of the connector member 122. Moreover, the outer peripheral portion of the connector member 122 and the flange 121c of the nozzle body 121 function as a cover portion that covers the engagement portion between the inner engaging protrusion 123 and engaged groove 124 from outside. This prevents access from outside to the first engagement structure, so that the first engagement structure can be permanently maintained unless it is broken up. As long as access to the first engagement structure can be prevented, it does not matter whether the first engagement structure is visible from outside. Namely, even if the engagement portion of the first engagement structure is visible through a small gap, for example, such a configuration does not affect the effects of the present invention as long as the gap is of such a size that it can prevent the user from accessing the first engagement structure.

In this embodiment, the first engagement structure and second engagement structure are configured such that the inner engaging protrusion 123 and the engaged groove 124 come to engage with each other at the same time as when the outer engaging protrusion 125 and the engaged protrusion 126 come to engage with each other. While the first engagement structure is not exposed to the outside, the second engagement structure is provided outside the inserted portion 122e of the connector member 122, i.e., exposed to the outside. This makes it possible to check, indirectly, the engaged state of the first engagement structure that is not visible from outside, by checking the engaged state of the second engagement structure.

Variation Examples

Some variation examples of the first engagement structure are described with reference to FIG. 35A to FIG. 36D. Features similar to those of the embodiment described above are given the same reference numerals in the variation examples.

Figure 36A:
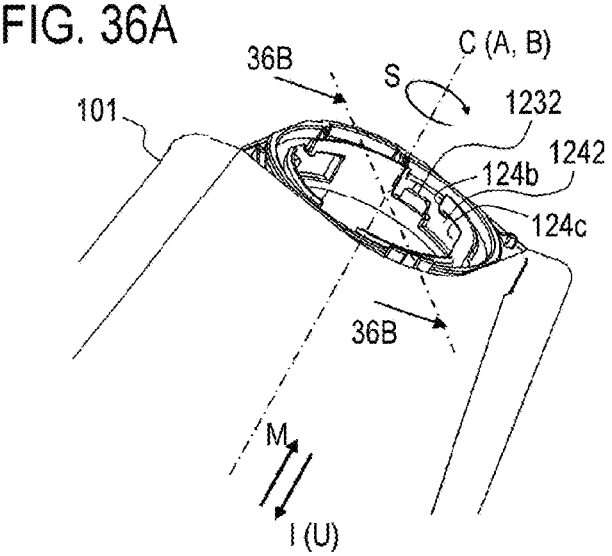
FIG. 36A is a schematic enlarged perspective view illustrating the inside of the opening in the connector member that is attached to the pouch, with only the inner engaging protrusion of the nozzle body being shown, when the nozzle body is in the fully inserted position relative to the connector member in the variation example.
Figure 36B:
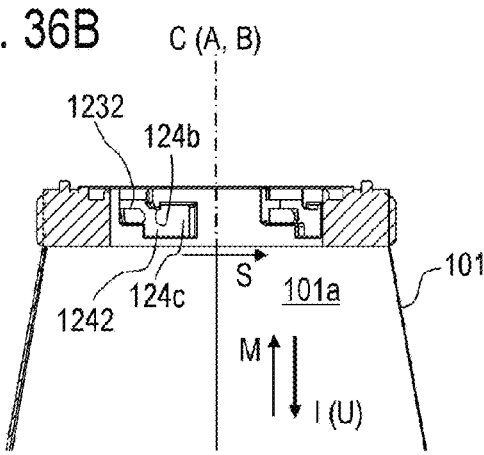
FIG. 36B is a cross-sectional view of section 36B-36B of FIG. 36A.
Figure 36C:
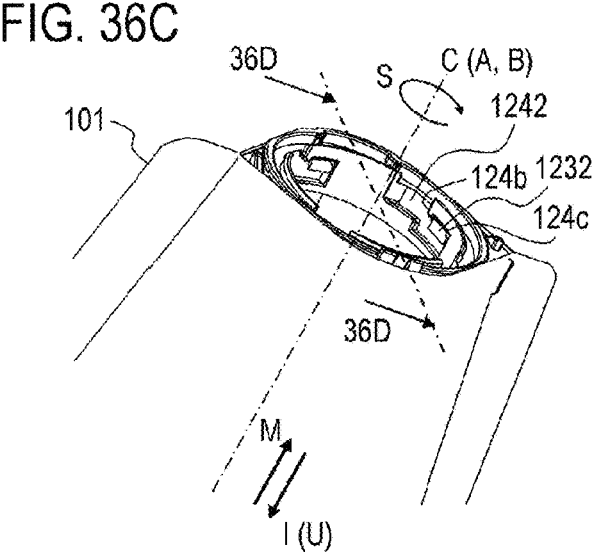
FIG. 36C is a schematic enlarged perspective view illustrating the inside of the opening in the connector member that is attached to the pouch, with only the inner engaging protrusion of the nozzle body being shown, when the nozzle body is in the fully engaged position relative to the connector member in the variation example.
Figure 36D:
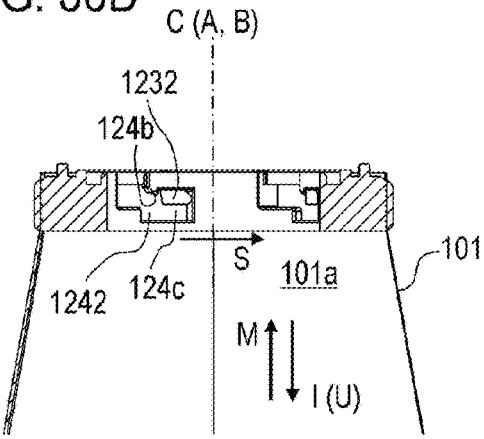
FIG. 36D is a cross-sectional view of section 36D-36D of FIG. 36C.

FIG. 35A is a side view illustrating one side of the nozzle body where the discharge port is provided in a variation example. FIG. 35B is a cross-sectional view of the connector member including the rotation axis of relative rotation between the nozzle body and connector member. FIG. 35C is a side view illustrating the opposite side from the side shown in FIG. 35A of the nozzle body in the variation example. FIG. 35D is a cross-sectional view of the connector member including the rotation axis of relative rotation between the nozzle body and connector member. FIG. 36A is a schematic enlarged perspective view illustrating the inside of the opening in the connector member that is attached to the pouch, with only the inner engaging protrusion of the nozzle body being shown, when the nozzle body is in a fully inserted position relative to the connector member, in the variation example. FIG. 36B is a cross-sectional view of section 36B-36B of FIG. 36A. FIG. 36C is a schematic enlarged perspective view illustrating the inside of the opening in the connector member that is attached to the pouch, with only the inner engaging protrusion of the nozzle body being shown, when the nozzle body is in a fully engaged position relative to the connector member, in the variation example. FIG. 36D is a cross-sectional view of section 36D-36D of FIG. 36C.

While the inner engaging protrusion 123 is an inclined protrusion along a spiral line in the above embodiment, the form of the inner engaging protrusion 123 is not limited to this configuration. For example, the third side face 123f2 may be a surface extending perpendicularly to the rotation axis of the rotating direction S, instead of an inclined surface inclined to both of the insertion direction I and rotating direction S like the third side face 123f in the above embodiment. Namely, the inner engaging protrusion 1232 may have a shape generally extending in the circumferential direction. In this case, the third groove side face 124f2 of the engagement retaining portion 124c of the engaged groove 1242, which faces the third side face 123f2, may be a surface extending perpendicularly to the rotation axis of the rotating direction S, corresponding to the third side face 123f2.

Other Embodiments

While the pouch 101 of the toner pack 100 contains toner in all of the embodiments and examples described above, this may not be necessarily so. For example, the pouch 101 may contain other contents than toner such as ink, powder, or other fluids. The powder that can be contained in the pouch 101 is not limited to toner. In the case where the pouch 101 contains ink, the toner pack 100 may be attached to an inkjet type image forming apparatus.

While the pack-side shutter 103 and the apparatus-side shutter 109 are configured to be rotatable between a covering position and an open position about the rotation axis A or B in all of the forms described above, this configuration is not limiting. For example, the pack-side shutter 103 and the apparatus-side shutter 109 can be configured to be movable between a covering position and an open position straight in parallel with the mounting direction M.

While the pack-side shutter 103 is configured to open the discharge port 102a of the nozzle 102 only in the open position in all of the forms described above, this configuration is not limiting. For example, the pack-side shutter 103 can be a rotating member that opens the discharge port 102a of the nozzle 102 irrespective of its rotating position. In this case, the discharge port 102a of the nozzle 102 may be closed with a seal when the toner pack 100 is not attached to the mounting portion 106, and the seal may be removed by the operation of attaching the toner pack to the mounting portion 106, or after the attachment. Alternatively, the toner pack 100 can be configured without the pack-side shutter 103.

The present invention is not limited to the embodiments described above and can be changed and modified in various ways without departing from the spirit and scope of the present invention. Accordingly, the following claims are appended to make the scope of the present invention known.

The present invention can improve the ease of assembly of developer containers while preventing developer leakage from the container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A developer container comprising:
    a container member including a container portion containing developer, and an opening portion that opens the container portion;
    a connector member attached to the opening portion; and
    a discharge path forming member connected to the container member via the connector member and forming a discharge path for discharging the developer from the container portion,
    the connector member including an inserted portion having a through hole extending therethrough, and an engaged portion,
    the discharge path forming member including an insertion portion inserted into the through hole of the inserted portion, and an engaging portion provided correspondingly to the engaged portion,
    the engaged portion and the engaging portion being configured
        to come to a mutually engaged state through a process in which at least one of the connector member and the discharge path forming member is elastically deformed by a relative rotation between the connector member and the discharge path forming member about a predetermined rotation axis as a center axis, in a state where the insertion portion is inserted into the inserted portion, and
        to restrict, in the engaged state, a relative movement of the connector member and the discharge path forming member in a direction of the rotation axis.

2. The developer container according to claim 1, wherein the engaged portion includes
    a first engaged portion provided inside the through hole of the inserted portion, and
    a second engaged portion provided outside the inserted portion, and
    the engaging portion includes
    a first engaging portion provided correspondingly to the first engaged portion, and
    a second engaging portion provided correspondingly to the second engaged portion.

3. The developer container according to claim 2, wherein a relative movement between the connector member and the discharge path forming member in a case of causing the engaged portion and the engaging portion to engage with each other is a relative rotation about an axial line as the center axis, the axial line extending along an insertion direction in which the discharge path forming member is inserted into the connector member, and the engaged state is achieved by the discharge path forming member being rotated relative to the connector member in a first direction, and the engaged portion and the engaging portion in the mutually engaged state restrict a relative rotation between the connector member and the discharge path forming member in which the discharge path forming member rotates relative to the connector member in an opposite direction from the first direction.

4. The developer container according to claim 3, wherein the connector member includes an abutted portion that faces the discharge path forming member in an opposite direction from an insertion direction in which the insertion portion is inserted into the inserted portion,
    the discharge path forming member includes an abutting portion that faces the abutted portion in the insertion direction,
    the abutted portion and the abutting portion are in a state of abutting each other in the insertion direction at least in a state where the engaged portion and the engaging portion are engaged, and
    at least the first engaged portion and the first engaging portion, in a state of mutual engagement, restrict a relative movement of the discharge path forming member from being away from the connector member in a counter-insertion direction that is opposite from the insertion direction.

5. The developer container according to claim 4, further comprising a seal member sealing a gap between the abutted portion and the abutting portion by being compressed between the abutted portion and the abutting portion in the insertion direction.

6. The developer container according to claim 3, wherein
    The second engaged portion is positioned farther away from the center axis than the first engaged portion in a direction perpendicular to the center axis, and
    the second engaging portion is positioned farther away from the center axis than the first engaging portion in a direction perpendicular to the center axis.

7. The developer container according to claim 3, wherein the engaged portion and the engaging portion can implement a relative rotation phase during the relative rotation between the connector member and the discharge path forming member, the relative rotation phase including:
    a disengagement phase in which the inserting portion is in a state of being inserted in the inserted portion, and the engaged portion is not engaged with the engaging portion;
    a deformation phase in which the engaged portion is in a phase of not being engaged with the engaging portion, and at least one of the connector member and the discharge path forming member undergoes an elastic deformation; and
    an engagement phase in which the elastic deformation is released and the engaged portion engages with the engaging portion, and wherein
    the connector member includes a first guide inclined surface positioned upstream in the insertion direction relative to the first engaging portion and making contact with the first engaging portion in a case where the relative rotation phase is the deformation phase, the first guide inclined surface extending in a direction inclined relative to both of the insertion direction and a circumferential direction around the center axis to guide the first engaging portion in the insertion direction as the relative rotation phase transitions gradually to the engagement phase, and the first guide inclined surface makes contact with the first engaging portion, in a case where the relative rotation phase is the deformation phase, such that a pressing force that causes the elastic deformation is generated between the first guide inclined surface and the first engaging portion, while guiding the first engaging portion to the engagement phase.

8. The developer container according to claim 7, wherein
the first engaging portion includes a first guided inclined surface that makes contact with the first guide inclined surface in a case where the relative rotation phase is the deformation phase, the first guided inclined surface extending in a direction inclined relative to both of the insertion direction and a circumferential direction around the center axis to guide the first engaging portion in the insertion direction as the relative rotation phase transitions gradually to the engagement phase.

9. The developer container according to claim 7, wherein
the insertion portion includes an outer circumferential surface that faces an inner circumferential surface of the through hole of the inserted portion,
the first engaged portion is a groove portion provided to be recessed from the inner circumferential surface in a radial direction around the center axis,
the first engaging portion is a protrusion provided on the outer circumferential surface protruding in the radial direction,
the groove portion including:
  an insertion guide portion including an insertion hole open in an end face on an opposite side from the insertion direction of the connector member for allowing insertion of the protrusion in a case where the insertion portion is inserted into the inserted portion, and extending from the insertion hole in the insertion direction to guide the protrusion in the insertion direction;
  a deformation guide portion including the first guide inclined surface and extending in the circumferential direction from downstream in the insertion direction of the insertion guide portion to guide a movement of the protrusion, in a case where the relative rotation phase is the deformation phase; and
  an engagement retaining portion provided downstream of the deformation guide portion and including: a first circumferential restricting portion and a second circumferential restricting portion, which face the protrusion in the engagement phase respectively in a first direction and a second direction, which is opposite from the first direction, along the circumferential direction; and a counter-insertion direction restricting portion facing the protrusion in the insertion direction.

10. The developer container according to claim 7, wherein
a set of the first engaging portion and the first engaged portion is provided at a plurality of positions spaced apart in a circumferential direction around the center axis, and
at least one of the plurality of sets is positioned differently from other sets in the insertion direction.

11. The developer container according to claim 7, wherein
the connector member includes a second guide inclined surface positioned downstream in the insertion direction relative to the second engaging portion and making contact with the first engaging portion in a case where the relative rotation phase is the deformation phase, the second guide inclined surface extending in a direction inclined relative to both of the insertion direction and the circumferential direction to guide the second engaging portion in a counter-insertion direction opposite from the insertion direction as the relative rotation phase transitions gradually to the engagement phase, and the second guide inclined surface makes contact with the second engaging portion, in a case where the relative rotation phase is the deformation phase, such that a pressing force that causes the elastic deformation is generated between the second guide inclined surface and the second engaging portion, while guiding the second engaging portion to the engagement phase.

12. The developer container according to claim 11, wherein
the discharge path forming member includes a second guided inclined surface that is positioned closer to the center axis than the second engaged portion in a direction perpendicular to the center axis in a case where the relative rotation phase is the deformation phase, the second guided inclined surface extending in a direction perpendicular to the insertion direction and inclined relative to both of a radial direction around the center axis and the circumferential direction to guide the second engaged portion away from the center axis as the relative rotation phase transitions gradually to the engagement phase, and
the second guided inclined surface makes contact with the second engaged portion, in a case where the relative rotation phase is the deformation phase, such that a pressing force that causes the elastic deformation is generated between the second guided inclined surface and the second engaged portion, while guiding the second engaged portion to the engagement phase.

13. The developer container according to claim 12, wherein
the second engaged portion is a second protrusion protruding in a counter-insertion direction opposite from the insertion direction in which the insertion portion is inserted into the inserted portion,
the second engaging portion is a third protrusion protruding in a direction intersecting the center axis and away from the center axis,
the second protrusion includes:
  the second guide inclined surface; and
  a third circumferential restricting portion facing the third protrusion in the engagement phase in a first direction along the circumferential direction, and
the third protrusion includes:
  the second guided inclined surface; and
  a fourth circumferential restricting portion facing the second protrusion in the engagement phase in a second direction opposite from the first direction.

14. The developer container according to claim 1, further comprising a shutter that is provided movably to the discharge path forming member and that is able to open and close a discharge port of the discharge path in the discharge path forming member.

15. A method of manufacturing a developer container that contains developer to be supplied to a main body of an image forming apparatus,
The developer container including:
  a container member including a container portion containing a developer, and an opening portion that opens the container portion;

a connector member attached to the opening portion; and a discharge path forming member connected to the container member via the connector member and forming a discharge path for discharging the developer from the container portion, the connector member including an inserted portion having a through hole extending therethrough, and an engaged portion, the discharge path forming member including an insertion portion inserted into the through hole of the inserted portion, and an engaging portion provided correspondingly to the engaged portion, the engaged portion and the engaging portion being configured to come to a mutually engaged state through a process in which at least one of the connector member and the discharge path forming member is elastically deformed by a relative rotation between the connector member and the discharge path forming member about a predetermined rotation axis as a center axis, in a state where the insertion portion is inserted into the inserted portion, and to restrict, in the engaged state, a relative movement of the connector member and the discharge path forming member in a direction of the rotation axis, the method comprising:

a first assembling step of attaching the connector member to the container member;

a filling step of filling the container portion with the developer, and a second assembling step of connecting the discharge path forming member to the container member via the connector member.

16. The method of manufacturing a developer container according to claim 15, wherein, in the first assembling step, the connector member attached to the container member forms a fill port for the container portion to be filled with the developer in the filling step, and in the second assembling step, the discharge path forming member forms the discharge path in a case of being attached to the fill port formed by the connector member in the filling step.

17. A developer container comprising:

a container portion having an opening portion at one end thereof and containing developer;

a nozzle having an engaging portion, and a discharge port aligned with the container portion in a predetermined direction for discharging the developer contained in the container portion; and a coupling member having an engaged portion that engages with the engaging portion, and attached to the opening portion, and coupling the nozzle and the container portion, the engaged portion including a first restricting portion and a second restricting portion, the engaging portion being configured to move, in a case where the nozzle is moved in an intersecting direction intersecting the predetermined direction relative to the coupling member, from a first position to a second position in the intersecting direction relative to the engaged portion, the first position being a position where the nozzle is allowed to move in the predetermined direction relative to the coupling member, the second position being a position where the first restricting portion restricts a movement of the nozzle in the predetermined direction relative to the coupling member, and where the second restricting portion restricts a movement of the engaging portion relative to the engaged portion from the second position to the first position in the intersecting direction.

18. The developer container according to claim 17, wherein at least one of the engaging portion and the engaged portion is configured to be able to undergo an elastic deformation that allows the engaging portion to move to the second position by a contact between the engaging portion and the engaged portion in a case where the engaging portion moves from the first position to the second position.

19. The developer container according to claim 18, wherein the engaged portion includes a deformation guide portion that induces the elastic deformation in at least one of the engaging portion and the engaged portion in a case where the engaging portion moves from the first position to the second position, and that makes sliding contact with the engaging portion so as to guide the engaging portion to the second position.

* * * * *